US012387557B2

(12) United States Patent
Nguyen

(10) Patent No.: US 12,387,557 B2
(45) **Date of Patent: *Aug. 12, 2025**

(54) METHOD AND SYSTEM FOR LOCALIZED MOBILE GAMING

(71) Applicant: Aristocrat Technologies, Inc. (ATI), Las Vegas, NV (US)

(72) Inventor: Binh T. Nguyen, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,503

(22) Filed: Aug. 16, 2023

(65) Prior Publication Data

US 2023/0394915 A1 Dec. 7, 2023

Related U.S. Application Data

(63) Continuation of application No. 17/337,393, filed on Jun. 2, 2021, now Pat. No. 11,783,666, which is a (Continued)

(51) Int. Cl.
*G07F 17/32* (2006.01)

(52) U.S. Cl.
CPC ...... *G07F 17/3225* (2013.01); *G07F 17/3223* (2013.01); *G07F 17/3239* (2013.01); *G07F 17/3241* (2013.01)

(58) Field of Classification Search
CPC ............ G07F 17/3225; G07F 17/3223; G07F 17/3239; G07F 17/3241
See application file for complete search history.

(56) References Cited

U.S. PATENT DOCUMENTS 2,033,638 A 3/1936 Koppl
2,062,923 A 12/1936 Nagy
(Continued)

FOREIGN PATENT DOCUMENTS

GB 2033638 A 5/1980
GB 2062923 A 5/1981
(Continued)

OTHER PUBLICATIONS

IAPS, Daily Systems LLC, 2010.
(Continued)

*Primary Examiner* — Dmitry Suhol
*Assistant Examiner* — Ankit B. Doshi
(74) *Attorney, Agent, or Firm* — Weaver Austin Villeneuve & Sampson LLP

(57) ABSTRACT

In one embodiment, a system and method to facilitate playing games of chance on a MGD includes a game zone, having: a) at least one portable transceiver configured to: i) detect the MGD; ii) obtain MGD data from the MGD; and iii) periodically re-detect the MGD within the game zone, the at least one portable transceiver repositionable to form the game zone; b) a portable controller configured to receive MGD data; and c) a gaming server configured to: i) receive the MGD data from the portable controller; ii) determine if the MGD is authorized to place a monetary wager to play games of chance based on the MGD data; iii) periodically receive detection confirmation from the portable controller if the MGD is present in the game zone; iv) transmit and/or receive game of chance data to/from the MGD, wherein the game zone is repositionable and configurable.

20 Claims, 16 Drawing Sheets

Related U.S. Application Data continuation of application No. 14/017,150, filed on Sep. 3, 2013, now Pat. No. 11,030,851.

(60) Provisional application No. 61/799,862, filed on Mar. 15, 2013.

(56) References Cited

U.S. PATENT DOCUMENTS

| | | | |
|---|---|---|---|
| 4,741,539 | A | 5/1988 | Sutton |
| 4,948,138 | A | 8/1990 | Pease |
| 4,969,183 | A | 11/1990 | Reese |
| 5,067,712 | A | 11/1991 | Georgilas |
| 5,275,400 | A | 1/1994 | Weingardt |
| 5,429,361 | A | 7/1995 | Raven |
| 5,489,103 | A | 2/1996 | Okamoto |
| 5,618,232 | A | 4/1997 | Martin |
| 5,630,757 | A | 5/1997 | Gagin |
| 5,655,961 | A | 8/1997 | Acres |
| 5,704,835 | A | 1/1998 | Dietz, II |
| 5,727,786 | A | 3/1998 | Weingardt |
| 5,833,537 | A | 11/1998 | Barrie |
| 5,842,921 | A | 12/1998 | Mindes |
| 5,919,091 | A | 7/1999 | Bell |
| 5,947,820 | A | 9/1999 | Morro |
| 5,997,401 | A | 12/1999 | Crawford |
| 6,001,016 | A | 12/1999 | Walker |
| 6,039,648 | A | 3/2000 | Guinn |
| 6,059,289 | A | 5/2000 | Vancura |
| 6,089,977 | A | 7/2000 | Bennett |
| 6,095,920 | A | 8/2000 | Sadahiro |
| 6,110,041 | A | 8/2000 | Walker |
| 6,142,872 | A | 11/2000 | Walker |
| 6,146,271 | A | 11/2000 | Kadlic |
| 6,146,273 | A | 11/2000 | Olsen |
| 6,165,071 | A | 12/2000 | Weiss |
| 6,231,445 | B1 | 5/2001 | Acres |
| 6,244,958 | B1 | 6/2001 | Acres |
| 6,270,412 | B1 | 8/2001 | Crawford |
| 6,290,600 | B1 | 9/2001 | Glasson |
| 6,293,866 | B1 | 9/2001 | Walker |
| 6,353,390 | B1 | 3/2002 | Beri |
| 6,364,768 | B1 | 4/2002 | Acres |
| 6,404,884 | B1 | 6/2002 | Marwell |
| 6,416,406 | B1 | 7/2002 | Duhamel |
| 6,416,409 | B1 | 7/2002 | Jordan |
| 6,443,452 | B1 | 9/2002 | Brune |
| 6,491,584 | B2 | 12/2002 | Graham |
| 6,500,067 | B1 | 12/2002 | Luciano |
| 6,505,095 | B1 | 1/2003 | Kolls |
| 6,508,710 | B1 | 1/2003 | Paravia |
| 6,561,900 | B1 | 5/2003 | Baerlocher |
| 6,592,457 | B1 | 7/2003 | Frohm |
| 6,612,574 | B1 | 9/2003 | Cole |
| 6,620,046 | B2 | 9/2003 | Rowe |
| 6,641,477 | B1 | 11/2003 | Dietz, II |
| 6,645,078 | B1 | 11/2003 | Mattice |
| 6,675,152 | B1 | 1/2004 | Prasad |
| 6,699,128 | B1 | 3/2004 | Beadell |
| 6,719,630 | B1 | 4/2004 | Seelig |
| 6,749,510 | B2 | 6/2004 | Giobbi |
| 6,758,757 | B2 | 7/2004 | Luciano, Jr. |
| 6,773,345 | B2 | 8/2004 | Walker |
| 6,778,820 | B2 | 8/2004 | Tendler |
| 6,780,111 | B2 | 8/2004 | Cannon |
| 6,799,032 | B2 | 9/2004 | McDonnell |
| 6,800,027 | B2 | 10/2004 | Giobbi |
| 6,804,763 | B1 | 10/2004 | Stockdale |
| 6,811,486 | B1 | 11/2004 | Luciano, Jr. |
| 6,843,725 | B2 | 1/2005 | Nelson |
| 6,846,238 | B2 | 1/2005 | Wells |
| 6,848,995 | B1 | 2/2005 | Walker |
| 6,852,029 | B2 | 2/2005 | Baltz |
| 6,869,361 | B2 | 3/2005 | Sharpless |
| 6,875,106 | B2 | 4/2005 | Weiss |
| 6,884,170 | B2 | 4/2005 | Rowe |
| 6,884,172 | B1 | 4/2005 | Lloyd |
| 6,902,484 | B2 | 6/2005 | Idaka |
| 6,908,390 | B2 | 6/2005 | Nguyen |
| 6,913,532 | B2 | 7/2005 | Baerlocher |
| 6,923,721 | B2 | 8/2005 | Luciano |
| 6,935,958 | B2 | 8/2005 | Nelson |
| 6,949,022 | B1 | 9/2005 | Showers |
| 6,955,600 | B2 | 10/2005 | Glavich |
| 6,971,956 | B2 | 12/2005 | Rowe |
| 6,984,174 | B2 | 1/2006 | Cannon |
| 6,997,803 | B2 | 2/2006 | Lemay |
| 7,018,292 | B2 | 3/2006 | Tracy |
| 7,032,115 | B2 | 4/2006 | Kashani |
| 7,033,276 | B2 | 4/2006 | Walker |
| 7,035,626 | B1 | 4/2006 | Luciano, Jr. |
| 7,037,195 | B2 | 5/2006 | Schneider |
| 7,048,628 | B2 | 5/2006 | Schneider |
| 7,048,630 | B2 | 5/2006 | Berg |
| 7,063,617 | B2 | 6/2006 | Brosnan |
| 7,076,329 | B1 | 7/2006 | Kolls |
| 7,089,264 | B1 | 8/2006 | Guido |
| 7,094,148 | B2 | 8/2006 | Baerlocher |
| 7,105,736 | B2 | 9/2006 | Laakso |
| 7,111,141 | B2 | 9/2006 | Nelson |
| 7,144,321 | B2 | 12/2006 | Mayeroff |
| 7,152,783 | B2 | 12/2006 | Charrin |
| 7,169,041 | B2 | 1/2007 | Tessmer |
| 7,169,052 | B2 | 1/2007 | Beaulieu |
| 7,175,523 | B2 | 2/2007 | Gilmore |
| 7,181,228 | B2 | 2/2007 | Boesch |
| 7,182,690 | B2 | 2/2007 | Giobbi |
| 7,198,571 | B2 | 4/2007 | Lemay |
| RE39,644 | E | 5/2007 | Alcorn |
| 7,217,191 | B2 | 5/2007 | Cordell |
| 7,243,104 | B2 | 7/2007 | Bill |
| 7,247,098 | B1 | 7/2007 | Bradford |
| 7,259,718 | B2 | 8/2007 | Patterson |
| 7,275,989 | B2 | 10/2007 | Moody |
| 7,285,047 | B2 | 10/2007 | Gelb |
| 7,311,608 | B1 | 12/2007 | Danieli |
| 7,314,408 | B2 | 1/2008 | Cannon |
| 7,316,615 | B2 | 1/2008 | Soltys |
| 7,316,619 | B2 | 1/2008 | Nelson |
| 7,318,775 | B2 | 1/2008 | Brosnan |
| 7,326,116 | B2 | 2/2008 | O'Donovan |
| 7,330,108 | B2 | 2/2008 | Thomas |
| 7,346,358 | B2 | 3/2008 | Wood |
| 7,355,112 | B2 | 4/2008 | Laakso |
| 7,384,338 | B2 | 6/2008 | Rothschild |
| 7,387,571 | B2 | 6/2008 | Walker |
| 7,393,278 | B2 | 7/2008 | Gerson |
| 7,396,990 | B2 | 7/2008 | Lu |
| 7,415,426 | B2 | 8/2008 | Williams |
| 7,425,177 | B2 | 9/2008 | Rodgers |
| 7,427,234 | B2 | 9/2008 | Soltys |
| 7,427,236 | B2 | 9/2008 | Kaminkow |
| 7,427,708 | B2 | 9/2008 | Ohmura |
| 7,431,650 | B2 | 10/2008 | Kessman |
| 7,448,949 | B2 | 11/2008 | Kaminkow |
| 7,500,913 | B2 | 3/2009 | Baerlocher |
| 7,510,474 | B2 | 3/2009 | Carter, Sr. |
| 7,513,828 | B2 | 4/2009 | Nguyen |
| 7,519,838 | B1 | 4/2009 | Suurballe |
| 7,559,838 | B2 | 7/2009 | Walker |
| 7,563,167 | B2 | 7/2009 | Walker |
| 7,572,183 | B2 | 8/2009 | Olivas |
| 7,585,222 | B2 | 9/2009 | Muir |
| 7,602,298 | B2 | 10/2009 | Thomas |
| 7,607,174 | B1 | 10/2009 | Kashchenko |
| 7,611,409 | B2 | 11/2009 | Muir |
| 7,637,810 | B2 | 12/2009 | Amaitis |
| 7,644,861 | B2 | 1/2010 | Alderucci |
| 7,653,757 | B1 | 1/2010 | Fernald |
| 7,693,306 | B2 | 4/2010 | Huber |
| 7,699,703 | B2 | 4/2010 | Muir |
| 7,722,453 | B2 | 5/2010 | Lark |
| 7,742,996 | B1 | 6/2010 | Kwan |
| 7,758,423 | B2 | 7/2010 | Foster |
| 7,771,271 | B2 | 8/2010 | Walker |

(56) References Cited

U.S. PATENT DOCUMENTS

| | | | |
|---|---|---|---|
| 7,780,529 | B2 | 8/2010 | Rowe |
| 7,780,531 | B2 | 8/2010 | Englman |
| 7,785,192 | B2 | 8/2010 | Canterbury |
| 7,811,172 | B2 | 10/2010 | Asher |
| 7,819,749 | B1 | 10/2010 | Fish |
| 7,822,688 | B2 | 10/2010 | Labrou |
| 7,828,652 | B2 | 11/2010 | Nguyen |
| 7,828,654 | B2 | 11/2010 | Carter, Sr. |
| 7,828,661 | B1 | 11/2010 | Fish |
| 7,850,528 | B2 | 12/2010 | Wells |
| 7,874,919 | B2 | 1/2011 | Paulsen |
| 7,877,798 | B2 | 1/2011 | Saunders |
| 7,883,413 | B2 | 2/2011 | Paulsen |
| 7,892,097 | B2 | 2/2011 | Muir |
| 7,909,692 | B2 | 3/2011 | Nguyen |
| 7,909,699 | B2 | 3/2011 | Parrott |
| 7,918,728 | B2 | 4/2011 | Nguyen |
| 7,927,211 | B2 | 4/2011 | Rowe |
| 7,927,212 | B2 | 4/2011 | Hedrick |
| 7,951,008 | B2 | 5/2011 | Wolf |
| 8,057,298 | B2 | 11/2011 | Nguyen |
| 8,057,303 | B2 | 11/2011 | Rasmussen |
| 8,087,988 | B2 | 1/2012 | Nguyen |
| 8,117,608 | B1 | 2/2012 | Slettehaugh |
| 8,133,113 | B2 | 3/2012 | Nguyen |
| 8,182,326 | B2 | 5/2012 | Speer, II |
| 8,210,927 | B2 | 7/2012 | Hedrick |
| 8,221,245 | B2 | 7/2012 | Walker |
| 8,226,459 | B2 | 7/2012 | Barrett |
| 8,226,474 | B2 | 7/2012 | Nguyen |
| 8,231,456 | B2 | 7/2012 | Zielinski |
| 8,235,803 | B2 | 8/2012 | Loose |
| 8,276,010 | B2 | 9/2012 | Vavilala |
| 8,282,475 | B2 | 10/2012 | Nguyen |
| 8,323,099 | B2 | 12/2012 | Durham |
| 8,337,290 | B2 | 12/2012 | Nguyen |
| 8,342,946 | B2 | 1/2013 | Amaitis |
| 8,393,948 | B2 | 3/2013 | Allen |
| 8,403,758 | B2 | 3/2013 | Hornik |
| 8,430,745 | B2 | 4/2013 | Agarwal |
| 8,461,958 | B2 | 6/2013 | Saenz |
| 8,465,368 | B2 | 6/2013 | Hardy |
| 8,469,813 | B2 | 6/2013 | Joshi |
| 8,529,345 | B2 | 9/2013 | Nguyen |
| 8,597,108 | B2 | 12/2013 | Nguyen |
| 8,602,875 | B2 | 12/2013 | Nguyen |
| 8,613,655 | B2 | 12/2013 | Kisenwether |
| 8,613,659 | B2 | 12/2013 | Nelson |
| 8,678,901 | B1 | 3/2014 | Kelly |
| 8,696,470 | B2 | 4/2014 | Nguyen |
| 8,745,417 | B2 | 6/2014 | Huang |
| 8,821,255 | B1 | 9/2014 | Friedman |
| 8,834,254 | B2 | 9/2014 | Buchholz |
| 8,858,323 | B2 | 10/2014 | Nguyen |
| 8,864,586 | B2 | 10/2014 | Nguyen |
| 8,942,995 | B1 | 1/2015 | Kerr |
| 9,039,507 | B2 | 5/2015 | Allen |
| 9,165,422 | B2 | 10/2015 | Barclay |
| 9,235,952 | B2 | 1/2016 | Nguyen |
| 9,292,996 | B2 | 3/2016 | Davis |
| 9,325,203 | B2 | 4/2016 | Nguyen |
| 9,466,171 | B2 | 10/2016 | Hornik |
| 9,483,901 | B2 | 11/2016 | Nguyen |
| 9,486,697 | B2 | 11/2016 | Nguyen |
| 9,486,704 | B2 | 11/2016 | Nguyen |
| 9,530,277 | B2 | 12/2016 | Nelson |
| 9,576,425 | B2 | 2/2017 | Nguyen |
| 9,626,826 | B2 | 4/2017 | Nguyen |
| 9,666,015 | B2 | 5/2017 | Acres |
| 9,666,021 | B2 | 5/2017 | Nguyen |
| 9,672,686 | B2 | 6/2017 | Nguyen |
| 9,741,205 | B2 | 8/2017 | Nguyen |
| 9,811,973 | B2 | 11/2017 | Nguyen |
| 9,814,970 | B2 | 11/2017 | Nguyen |
| 9,842,462 | B2 | 12/2017 | Nguyen |
| 9,875,606 | B2 | 1/2018 | Nguyen |
| 9,875,609 | B2 | 1/2018 | Nguyen |
| 9,981,180 | B2 | 5/2018 | Koyanagi |
| 10,068,429 | B2 | 9/2018 | Gagner |
| 10,115,270 | B2 | 10/2018 | Gagner |
| 10,140,816 | B2 | 11/2018 | Nguyen |
| 10,325,447 | B2 | 6/2019 | Malek |
| 10,421,010 | B2 | 9/2019 | Nguyen |
| 10,438,446 | B2 | 10/2019 | Nguyen |
| 10,445,978 | B2 | 10/2019 | Nguyen |
| 10,796,679 | B1 | 10/2020 | Powell |
| 10,818,133 | B2 | 10/2020 | Nguyen |
| 2001/0004607 | A1 | 6/2001 | Olsen |
| 2001/0016516 | A1 | 8/2001 | Takatsuka |
| 2001/0024971 | A1 | 9/2001 | Brossard |
| 2001/0025272 | A1 | 9/2001 | Mori |
| 2001/0031659 | A1 | 10/2001 | Perrie |
| 2001/0037211 | A1 | 11/2001 | McNutt |
| 2001/0047291 | A1 | 11/2001 | Garahi |
| 2002/0006822 | A1 | 1/2002 | Krintzman |
| 2002/0042295 | A1 | 4/2002 | Walker |
| 2002/0043759 | A1 | 4/2002 | Vancura |
| 2002/0045474 | A1 | 4/2002 | Singer |
| 2002/0107065 | A1 | 8/2002 | Rowe |
| 2002/0107799 | A1 | 8/2002 | Hoshino |
| 2002/0111210 | A1 | 8/2002 | Anthony |
| 2002/0111213 | A1 | 8/2002 | McEntee |
| 2002/0113369 | A1 | 8/2002 | Weingardt |
| 2002/0116615 | A1 | 8/2002 | Nguyen |
| 2002/0133418 | A1 | 9/2002 | Hammond |
| 2002/0137217 | A1 | 9/2002 | Rowe |
| 2002/0142825 | A1 | 10/2002 | Lark |
| 2002/0145051 | A1 | 10/2002 | Charrin |
| 2002/0147047 | A1 | 10/2002 | Letovsky |
| 2002/0147049 | A1 | 10/2002 | Carter |
| 2002/0151366 | A1 | 10/2002 | Walker |
| 2002/0152120 | A1 | 10/2002 | Howington |
| 2002/0167536 | A1 | 11/2002 | Valdes |
| 2002/0177483 | A1 | 11/2002 | Cannon |
| 2002/0183105 | A1 | 12/2002 | Cannon |
| 2003/0001338 | A1 | 1/2003 | Bennett |
| 2003/0003988 | A1 | 1/2003 | Walker |
| 2003/0003996 | A1 | 1/2003 | Nguyen |
| 2003/0004871 | A1 | 1/2003 | Rowe |
| 2003/0008696 | A1 | 1/2003 | Abecassis |
| 2003/0013531 | A1 | 1/2003 | Rowe |
| 2003/0027635 | A1 | 2/2003 | Walker |
| 2003/0064805 | A1 | 4/2003 | Wells |
| 2003/0064807 | A1 | 4/2003 | Walker |
| 2003/0078094 | A1 | 4/2003 | Gatto |
| 2003/0092480 | A1 | 5/2003 | White |
| 2003/0100361 | A1 | 5/2003 | Sharpless |
| 2003/0103965 | A1 | 6/2003 | Jung |
| 2003/0104860 | A1 | 6/2003 | Cannon |
| 2003/0104865 | A1 | 6/2003 | Itkis |
| 2003/0148809 | A1 | 8/2003 | Nelson |
| 2003/0162588 | A1 | 8/2003 | Brosnan |
| 2003/0176218 | A1 | 9/2003 | Lemay |
| 2003/0195024 | A1 | 10/2003 | Slattery |
| 2003/0195043 | A1 | 10/2003 | Shinners |
| 2003/0199295 | A1 | 10/2003 | Vancura |
| 2003/0224852 | A1 | 12/2003 | Walker |
| 2003/0224854 | A1 | 12/2003 | Joao |
| 2004/0002386 | A1 | 1/2004 | Wolfe |
| 2004/0005919 | A1 | 1/2004 | Walker |
| 2004/0015619 | A1 | 1/2004 | Brown |
| 2004/0023709 | A1 | 2/2004 | Beaulieu |
| 2004/0023716 | A1 | 2/2004 | Gauselmann |
| 2004/0038736 | A1 | 2/2004 | Bryant |
| 2004/0048650 | A1 | 3/2004 | Mierau |
| 2004/0068460 | A1 | 4/2004 | Feeley |
| 2004/0082384 | A1 | 4/2004 | Walker |
| 2004/0082385 | A1 | 4/2004 | Silva |
| 2004/0094624 | A1 | 5/2004 | Fernandes |
| 2004/0106449 | A1 | 6/2004 | Walker |
| 2004/0127277 | A1 | 7/2004 | Walker |
| 2004/0127290 | A1 | 7/2004 | Walker |
| 2004/0137987 | A1 | 7/2004 | Nguyen |
| 2004/0142744 | A1 | 7/2004 | Atkinson |

(56) References Cited

U.S. PATENT DOCUMENTS

2004/0147308 A1 7/2004 Walker
2004/0152508 A1 8/2004 Lind
2004/0199631 A1 10/2004 Natsume
2004/0214622 A1 10/2004 Atkinson
2004/0224753 A1 11/2004 O'Donovan
2004/0229671 A1 11/2004 Stronach
2004/0256803 A1 12/2004 Ko
2004/0259633 A1 12/2004 Gentles
2005/0003890 A1 1/2005 Hedrick
2005/0004980 A1 1/2005 Vadjinia
2005/0026696 A1 2/2005 Hashimoto
2005/0033651 A1 2/2005 Kogan
2005/0043996 A1 2/2005 Silver
2005/0054446 A1 3/2005 Kammler
2005/0101376 A1 5/2005 Walker
2005/0101383 A1 5/2005 Wells
2005/0130728 A1 6/2005 Nguyen
2005/0130731 A1 6/2005 Englman
2005/0137014 A1 6/2005 Vetelainen
2005/0143169 A1 6/2005 Nguyen
2005/0167921 A1 8/2005 Finocchio
2005/0170883 A1 8/2005 Muskin
2005/0181865 A1 8/2005 Luciano
2005/0181870 A1 8/2005 Nguyen
2005/0181875 A1 8/2005 Hoehne
2005/0187020 A1 8/2005 Amaitis
2005/0202865 A1 9/2005 Kim
2005/0202875 A1 9/2005 Murphy
2005/0208993 A1 9/2005 Yoshizawa
2005/0209002 A1 9/2005 Blythe
2005/0221881 A1 10/2005 Lannert
2005/0223219 A1 10/2005 Gatto
2005/0239546 A1 10/2005 Hedrick
2005/0255919 A1 11/2005 Nelson
2005/0273635 A1 12/2005 Wilcox
2005/0277471 A1 12/2005 Russell
2005/0282637 A1 12/2005 Gatto
2006/0009283 A1 1/2006 Englman
2006/0035707 A1 2/2006 Nguyen
2006/0036874 A1 2/2006 Cockerille
2006/0046822 A1 3/2006 Kaminkow
2006/0046830 A1 3/2006 Webb
2006/0046849 A1 3/2006 Kovacs
2006/0068893 A1 3/2006 Jaffe
2006/0068897 A1 3/2006 Sanford
2006/0073869 A1 4/2006 Lemay
2006/0073888 A1 4/2006 Nguyen
2006/0073897 A1 4/2006 Englman
2006/0079317 A1 4/2006 Flemming
2006/0121972 A1 6/2006 Walker
2006/0126529 A1 6/2006 Hardy
2006/0148551 A1 7/2006 Walker
2006/0189382 A1 8/2006 Muir
2006/0217170 A1 9/2006 Roireau
2006/0217193 A1 9/2006 Walker
2006/0247028 A1 11/2006 Brosnan
2006/0247035 A1 11/2006 Rowe
2006/0252530 A1 11/2006 Oberberger
2006/0253481 A1 11/2006 Guido
2006/0256135 A1 11/2006 Aoyama
2006/0281525 A1 12/2006 Borissov
2006/0281541 A1 12/2006 Nguyen
2006/0287106 A1 12/2006 Jensen
2007/0004510 A1 1/2007 Underdahl
2007/0026935 A1 2/2007 Wolf
2007/0026942 A1 2/2007 Kinsley
2007/0054739 A1 3/2007 Amaitis
2007/0060254 A1 3/2007 Muir
2007/0060306 A1 3/2007 Amaitis
2007/0060319 A1 3/2007 Block
2007/0060358 A1 3/2007 Amaitis
2007/0077981 A1 4/2007 Hungate
2007/0087833 A1 4/2007 Feeney
2007/0087834 A1 4/2007 Moser
2007/0093299 A1 4/2007 Bergeron
2007/0111777 A1 5/2007 Amaitis
2007/0129123 A1 6/2007 Eryou
2007/0129148 A1 6/2007 Van Luchene
2007/0149279 A1 6/2007 Norden
2007/0149286 A1 6/2007 Bemmel
2007/0159301 A1 7/2007 Hirt
2007/0161402 A1 7/2007 Ng
2007/0184896 A1 8/2007 Dickerson
2007/0184904 A1 8/2007 Lee
2007/0191109 A1 8/2007 Crowder, Jr.
2007/0207852 A1 9/2007 Nelson
2007/0207854 A1 9/2007 Wolf
2007/0235521 A1 10/2007 Mateen
2007/0238505 A1 10/2007 Okada
2007/0241187 A1 10/2007 Alderucci
2007/0248036 A1 10/2007 Nevalainen
2007/0257430 A1 11/2007 Hardy
2007/0259713 A1 11/2007 Fiden
2007/0259716 A1 11/2007 Mattice
2007/0259717 A1 11/2007 Mattice
2007/0265984 A1 11/2007 Santhana
2007/0270213 A1 11/2007 Nguyen
2007/0275777 A1 11/2007 Walker
2007/0275779 A1 11/2007 Amaitis
2007/0281782 A1 12/2007 Amaitis
2007/0281785 A1 12/2007 Amaitis
2007/0298858 A1 12/2007 Toneguzzo
2007/0298873 A1 12/2007 Nguyen
2008/0013906 A1 1/2008 Matsuo
2008/0015032 A1 1/2008 Bradford
2008/0020824 A1 1/2008 Cuddy
2008/0020845 A1 1/2008 Low
2008/0032787 A1 2/2008 Low
2008/0070652 A1 3/2008 Nguyen
2008/0070681 A1 3/2008 Marks
2008/0076505 A1 3/2008 Nguyen
2008/0076506 A1 3/2008 Nguyen
2008/0076527 A1 3/2008 Low
2008/0076548 A1 3/2008 Paulsen
2008/0076572 A1 3/2008 Nguyen
2008/0096650 A1 4/2008 Baerlocher
2008/0102916 A1 5/2008 Kovacs
2008/0102935 A1 5/2008 Finnimore
2008/0102956 A1 5/2008 Burman
2008/0102957 A1 5/2008 Burman
2008/0108401 A1 5/2008 Baerlocher
2008/0113772 A1 5/2008 Burrill
2008/0119267 A1 5/2008 Denlay
2008/0126529 A1 5/2008 Kim
2008/0139274 A1 6/2008 Baerlocher
2008/0139306 A1 6/2008 Lutnick
2008/0146321 A1 6/2008 Parente
2008/0146344 A1 6/2008 Rowe
2008/0150902 A1 6/2008 Edpalm
2008/0153583 A1 6/2008 Huntley
2008/0161110 A1 7/2008 Campbell
2008/0167106 A1 7/2008 Lutnick
2008/0167118 A1 7/2008 Kroeckel
2008/0167130 A1 7/2008 Kroeckel
2008/0182667 A1 7/2008 Davis
2008/0200251 A1 8/2008 Alderucci
2008/0207307 A1 8/2008 Cunningham, II
2008/0214258 A1 9/2008 Brosnan
2008/0214310 A1 9/2008 Brunet De Courssou
2008/0215319 A1 9/2008 Lu
2008/0234047 A1 9/2008 Nguyen
2008/0238610 A1 10/2008 Rosenberg
2008/0248849 A1 10/2008 Lutnick
2008/0248865 A1 10/2008 Tedesco
2008/0252419 A1 10/2008 Batchelor
2008/0254878 A1 10/2008 Saunders
2008/0254881 A1 10/2008 Lutnick
2008/0254883 A1 10/2008 Patel
2008/0254891 A1 10/2008 Saunders
2008/0254892 A1 10/2008 Saunders
2008/0254897 A1 10/2008 Saunders
2008/0263173 A1 10/2008 Weber
2008/0268959 A1 10/2008 Bryson
2008/0274783 A1 11/2008 Walker

(56) References Cited

U.S. PATENT DOCUMENTS

| | | | |
|---|---|---|---|
| 2008/0300058 A1 | 12/2008 | Sum | |
| 2008/0305864 A1 | 12/2008 | Kelly | |
| 2008/0305865 A1 | 12/2008 | Kelly | |
| 2008/0305866 A1 | 12/2008 | Kelly | |
| 2008/0311994 A1* | 12/2008 | Amaitis | G07F 17/3239 463/42 |
| 2008/0318669 A1 | 12/2008 | Buchholz | |
| 2008/0318686 A1 | 12/2008 | Crowder | |
| 2009/0005165 A1 | 1/2009 | Arezina | |
| 2009/0011822 A1 | 1/2009 | Englman | |
| 2009/0017906 A1 | 1/2009 | Jackson | |
| 2009/0021381 A1 | 1/2009 | Kondo | |
| 2009/0029766 A1 | 1/2009 | Lutnick | |
| 2009/0054149 A1 | 2/2009 | Brosnan | |
| 2009/0061990 A1 | 3/2009 | Schwartz | |
| 2009/0069063 A1 | 3/2009 | Thomas | |
| 2009/0077396 A1 | 3/2009 | Tsai | |
| 2009/0088258 A1 | 4/2009 | Saunders | |
| 2009/0098925 A1 | 4/2009 | Gagner | |
| 2009/0104977 A1 | 4/2009 | Zielinski | |
| 2009/0104983 A1 | 4/2009 | Okada | |
| 2009/0118002 A1 | 5/2009 | Lyons | |
| 2009/0118013 A1 | 5/2009 | Finnimore | |
| 2009/0118022 A1 | 5/2009 | Lyons | |
| 2009/0124366 A1 | 5/2009 | Aoki | |
| 2009/0124390 A1 | 5/2009 | Seelig | |
| 2009/0131146 A1 | 5/2009 | Arezina | |
| 2009/0131151 A1 | 5/2009 | Harris | |
| 2009/0131155 A1 | 5/2009 | Hollibaugh | |
| 2009/0132163 A1 | 5/2009 | Ashley, Jr. | |
| 2009/0137255 A1 | 5/2009 | Ashley, Jr. | |
| 2009/0138133 A1 | 5/2009 | Buchholz | |
| 2009/0143141 A1 | 6/2009 | Wells | |
| 2009/0149245 A1 | 6/2009 | Fabbri | |
| 2009/0149261 A1 | 6/2009 | Chen | |
| 2009/0153342 A1 | 6/2009 | Thorn | |
| 2009/0156303 A1 | 6/2009 | Kiely | |
| 2009/0163272 A1 | 6/2009 | Baker | |
| 2009/0176578 A1 | 7/2009 | Herrmann | |
| 2009/0191962 A1 | 7/2009 | Hardy | |
| 2009/0197684 A1 | 8/2009 | Arezina | |
| 2009/0216547 A1 | 8/2009 | Canora | |
| 2009/0219901 A1 | 9/2009 | Bull | |
| 2009/0221342 A1 | 9/2009 | Katz | |
| 2009/0227302 A1 | 9/2009 | Abe | |
| 2009/0239666 A1 | 9/2009 | Hall | |
| 2009/0264190 A1 | 10/2009 | Davis | |
| 2009/0270166 A1 | 10/2009 | Thukral | |
| 2009/0270170 A1 | 10/2009 | Patton | |
| 2009/0271287 A1 | 10/2009 | Halpern | |
| 2009/0275402 A1 | 11/2009 | Backover | |
| 2009/0275410 A1 | 11/2009 | Kisenwether | |
| 2009/0275411 A1 | 11/2009 | Kisenwether | |
| 2009/0280910 A1 | 11/2009 | Gagner | |
| 2009/0282469 A1 | 11/2009 | Lynch | |
| 2009/0298468 A1 | 12/2009 | Hsu | |
| 2009/0318219 A1 | 12/2009 | Koustas | |
| 2010/0002897 A1 | 1/2010 | Keady | |
| 2010/0004058 A1 | 1/2010 | Acres | |
| 2010/0016069 A1 | 1/2010 | Herrmann | |
| 2010/0049738 A1 | 2/2010 | Mathur | |
| 2010/0056248 A1 | 3/2010 | Acres | |
| 2010/0062833 A1 | 3/2010 | Mattice | |
| 2010/0062840 A1 | 3/2010 | Herrmann | |
| 2010/0069160 A1 | 3/2010 | Barrett | |
| 2010/0079237 A1 | 4/2010 | Falk | |
| 2010/0081501 A1 | 4/2010 | Carpenter | |
| 2010/0081509 A1 | 4/2010 | Burke | |
| 2010/0099499 A1 | 4/2010 | Amaitis | |
| 2010/0105454 A1 | 4/2010 | Weber | |
| 2010/0106612 A1 | 4/2010 | Gupta | |
| 2010/0115591 A1 | 5/2010 | Kane-Esrig | |
| 2010/0120486 A1 | 5/2010 | Dewaal | |
| 2010/0124967 A1 | 5/2010 | Lutnick | |
| 2010/0130276 A1 | 5/2010 | Fiden | |
| 2010/0160035 A1 | 6/2010 | Herrmann | |
| 2010/0160043 A1 | 6/2010 | Fujimoto | |
| 2010/0178977 A1 | 7/2010 | Kim | |
| 2010/0184509 A1 | 7/2010 | Sylla | |
| 2010/0197383 A1 | 8/2010 | Rader | |
| 2010/0197385 A1 | 8/2010 | Aoki | |
| 2010/0203955 A1 | 8/2010 | Sylla | |
| 2010/0203957 A1 | 8/2010 | Enzminger | |
| 2010/0203963 A1 | 8/2010 | Allen | |
| 2010/0224681 A1 | 9/2010 | Triplett | |
| 2010/0227662 A1 | 9/2010 | Speer, II | |
| 2010/0227670 A1 | 9/2010 | Arezina | |
| 2010/0227671 A1 | 9/2010 | Laaroussi | |
| 2010/0227687 A1 | 9/2010 | Speer, II | |
| 2010/0234091 A1 | 9/2010 | Baerlocher | |
| 2010/0279764 A1 | 11/2010 | Allen | |
| 2010/0323780 A1 | 12/2010 | Acres | |
| 2010/0325703 A1 | 12/2010 | Etchegoyen | |
| 2011/0009181 A1 | 1/2011 | Speer, II | |
| 2011/0034252 A1 | 2/2011 | Morrison | |
| 2011/0039615 A1 | 2/2011 | Acres | |
| 2011/0053679 A1 | 3/2011 | Canterbury | |
| 2011/0065492 A1 | 3/2011 | Acres | |
| 2011/0076941 A1 | 3/2011 | Taveau | |
| 2011/0086696 A1 | 4/2011 | Macewan | |
| 2011/0105216 A1 | 5/2011 | Cohen | |
| 2011/0111827 A1 | 5/2011 | Nicely | |
| 2011/0111843 A1 | 5/2011 | Nicely | |
| 2011/0111860 A1 | 5/2011 | Nguyen | |
| 2011/0118010 A1 | 5/2011 | Brune | |
| 2011/0159966 A1 | 6/2011 | Gura | |
| 2011/0183732 A1 | 7/2011 | Block | |
| 2011/0183749 A1 | 7/2011 | Allen | |
| 2011/0207525 A1 | 8/2011 | Allen | |
| 2011/0212711 A1 | 9/2011 | Scott | |
| 2011/0212767 A1 | 9/2011 | Barclay | |
| 2011/0223993 A1 | 9/2011 | Allen | |
| 2011/0244952 A1 | 10/2011 | Schueller | |
| 2011/0263318 A1 | 10/2011 | Agarwal | |
| 2011/0269548 A1 | 11/2011 | Barclay | |
| 2011/0306400 A1 | 12/2011 | Nguyen | |
| 2011/0306426 A1 | 12/2011 | Novak | |
| 2012/0015709 A1 | 1/2012 | Bennett | |
| 2012/0028703 A1 | 2/2012 | Anderson | |
| 2012/0028718 A1 | 2/2012 | Barclay | |
| 2012/0034968 A1 | 2/2012 | Watkins | |
| 2012/0046096 A1 | 2/2012 | Morrison | |
| 2012/0046110 A1 | 2/2012 | Amaitis | |
| 2012/0094769 A1 | 4/2012 | Nguyen | |
| 2012/0100908 A1 | 4/2012 | Wells | |
| 2012/0108319 A1 | 5/2012 | Caputo | |
| 2012/0115591 A1 | 5/2012 | Palermo | |
| 2012/0122561 A1 | 5/2012 | Hedrick | |
| 2012/0122567 A1 | 5/2012 | Gangadharan | |
| 2012/0122584 A1 | 5/2012 | Nguyen | |
| 2012/0122590 A1 | 5/2012 | Nguyen | |
| 2012/0172130 A1 | 7/2012 | Acres | |
| 2012/0184362 A1 | 7/2012 | Barclay | |
| 2012/0184363 A1 | 7/2012 | Barclay | |
| 2012/0185398 A1 | 7/2012 | Weis | |
| 2012/0190426 A1 | 7/2012 | Acres | |
| 2012/0194448 A1 | 8/2012 | Rothkopf | |
| 2012/0208618 A1 | 8/2012 | Frerking | |
| 2012/0231885 A1 | 9/2012 | Speer, II | |
| 2012/0239566 A1 | 9/2012 | Everett | |
| 2012/0322563 A1 | 12/2012 | Nguyen | |
| 2012/0330740 A1 | 12/2012 | Pennington | |
| 2013/0005433 A1 | 1/2013 | Holch | |
| 2013/0005443 A1 | 1/2013 | Kosta | |
| 2013/0005453 A1 | 1/2013 | Nguyen | |
| 2013/0059650 A1 | 3/2013 | Sylla | |
| 2013/0065668 A1 | 3/2013 | Lemay | |
| 2013/0103965 A1 | 4/2013 | Golembeski, Jr. | |
| 2013/0104193 A1 | 4/2013 | Gatto | |
| 2013/0130766 A1 | 5/2013 | Harris | |
| 2013/0132745 A1 | 5/2013 | Schoening | |
| 2013/0165210 A1 | 6/2013 | Nelson | |
| 2013/0185559 A1 | 7/2013 | Morel | |
| 2013/0196756 A1 | 8/2013 | Nguyen | |

(56) References Cited

U.S. PATENT DOCUMENTS

| | | | |
|---|---|---|---|
| 2013/0196776 | A1 | 8/2013 | Nguyen |
| 2013/0210513 | A1 | 8/2013 | Nguyen |
| 2013/0210514 | A1 | 8/2013 | Nguyen |
| 2013/0210530 | A1 | 8/2013 | Nguyen |
| 2013/0225279 | A1 | 8/2013 | Patceg |
| 2013/0225282 | A1 | 8/2013 | Williams |
| 2013/0252730 | A1 | 9/2013 | Joshi |
| 2013/0281187 | A1 | 10/2013 | Skelton |
| 2013/0281188 | A1 | 10/2013 | Guinn |
| 2013/0316808 | A1 | 11/2013 | Nelson |
| 2013/0337878 | A1 | 12/2013 | Shepherd |
| 2013/0337889 | A1 | 12/2013 | Gagner |
| 2014/0006129 | A1 | 1/2014 | Heath |
| 2014/0057716 | A1 | 2/2014 | Massing |
| 2014/0087862 | A1 | 3/2014 | Burke |
| 2014/0094295 | A1 | 4/2014 | Nguyen |
| 2014/0094316 | A1 | 4/2014 | Nguyen |
| 2014/0120999 | A1 | 5/2014 | Graves |
| 2014/0121005 | A1 | 5/2014 | Nelson |
| 2014/0179431 | A1 | 6/2014 | Nguyen |
| 2014/0221071 | A1 | 8/2014 | Calio |
| 2014/0274306 | A1 | 9/2014 | Crawford, III |
| 2014/0274309 | A1 | 9/2014 | Nguyen |
| 2014/0274319 | A1 | 9/2014 | Nguyen |
| 2014/0274320 | A1 | 9/2014 | Nguyen |
| 2014/0274342 | A1 | 9/2014 | Nguyen |
| 2014/0274357 | A1 | 9/2014 | Nguyen |
| 2014/0274360 | A1 | 9/2014 | Nguyen |
| 2014/0274367 | A1 | 9/2014 | Nguyen |
| 2014/0274388 | A1 | 9/2014 | Nguyen |
| 2015/0089595 | A1 | 3/2015 | Telles |
| 2015/0133223 | A1 | 5/2015 | Carter, Sr. |
| 2015/0143543 | A1 | 5/2015 | Phegade |
| 2015/0287283 | A1 | 10/2015 | Yarbrough |
| 2016/0093154 | A1 | 3/2016 | Bytnar |
| 2016/0125695 | A1 | 5/2016 | Nguyen |
| 2017/0016819 | A1 | 1/2017 | Barwicz |
| 2017/0116819 | A1 | 4/2017 | Nguyen |
| 2017/0116823 | A1 | 4/2017 | Nguyen |
| 2017/0144071 | A1 | 5/2017 | Nguyen |
| 2017/0148259 | A1 | 5/2017 | Nguyen |
| 2017/0148261 | A1 | 5/2017 | Nguyen |
| 2017/0148263 | A1 | 5/2017 | Nguyen |
| 2017/0206734 | A1 | 7/2017 | Nguyen |
| 2017/0228979 | A1 | 8/2017 | Nguyen |
| 2017/0243440 | A1 | 8/2017 | Nguyen |
| 2017/0337770 | A1 | 11/2017 | Nguyen |
| 2018/0144581 | A1 | 5/2018 | Nguyen |
| 2019/0005773 | A1 | 1/2019 | Nguyen |
| 2019/0122490 | A1 | 4/2019 | Nguyen |
| 2019/0122492 | A1 | 4/2019 | Nguyen |
| 2019/0213829 | A1 | 7/2019 | Nguyen |
| 2020/0372753 | A1 | 11/2020 | Nguyen |

FOREIGN PATENT DOCUMENTS

| | | | |
|---|---|---|---|
| GB | 2096376 | A | 10/1982 |
| GB | 2097570 | A | 11/1982 |
| GB | 2335524 | A | 9/1999 |
| JP | 12005000454 | | 5/2007 |
| WO | 2005073933 | | 8/2005 |
| WO | 2008027621 | | 3/2008 |
| WO | 2009026309 | | 2/2009 |
| WO | 2009062148 | | 5/2009 |
| WO | 2010017252 | | 2/2010 |

OTHER PUBLICATIONS

Brochure, 5000 Ft. Inc., 1 page, Nov. 2010.
"Getting Back in the Game: Geolocation Can Ensure Compliance with New IGaming Regulations", White Paper, Quova, Inc., 2010.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Final Office Action for U.S. Appl. No. 12/945,889, dated Feb. 12, 2015.
Final Office Action for U.S. Appl. No. 13/801,171, dated Mar. 16, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Office Action for U.S. Appl. No. 13/843,087, dated Feb. 25, 2016.
Office Action for U.S. Appl. No. 13/800,917, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
U.S. Appl. No. 12/945,888, filed Nov. 14, 2010.
U.S. Appl. No. 13/961,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.

(56) References Cited

OTHER PUBLICATIONS

U.S. Appl. No. 13/633,118, filed Oct. 1, 2012.
U.S. Appl. No. 13/801,256, filed Mar. 13, 2013.
U.S. Appl. No. 13/557,063, filed Jul. 24, 2012.
Final Office Action for U.S. Appl. No. 12/945,888 dated Sep. 21, 2012.
Advisory Action for U.S. Appl. No. 12/945,888 dated Jan. 30, 2013.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Office Action for U.S. Appl. No. 13/296,182 dated Dec. 5, 2012.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Office Action for U.S. Appl. No. 12/617,717, dated Jun. 17, 2013.
Office Action for U.S. Appl. No. 12/945,889, dated Dec. 18, 2013.
Office Action for U.S. Appl. No. 13/632,828, dated Jul. 30, 2013.
Office Action for U.S. Appl. No. 13/801,271, dated Oct. 31, 2014.
Office Action for U.S. Appl. No. 13/833,116, dated Mar. 27, 2015.
Office Action for U.S. Appl. No. 13/843,192, dated Jun. 19, 2015.
Final Office Action for U.S. Appl. No. 13/833,116, dated Sep. 24, 2015.
Office Action for U.S. Appl. No. 13/622,702, dated Mar. 22, 2016.
Final Office Action for U.S. Appl. No. 14/017,150, dated Apr. 26, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 14/963,106, dated Dec. 14, 2018.
Final Office Action for U.S. Appl. No. 14/993,055, dated Dec. 14, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.
Final Office Action for U.S. Appl. No. 15/671,133, dated Oct. 18, 2019.
Office Action for U.S. Appl. No. 15/835,448, dated Oct. 22, 2019.
Notice of Allowance for U.S. Appl. No. 15/495,975, dated Oct. 23, 2019.
Final Office Action for U.S. Appl. No. 15/427,308, dated Nov. 27, 2019.
Office Action for U.S. Appl. No. 15/798,363, dated Jan. 8, 2020.
Final Office Action for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.

(56) References Cited

OTHER PUBLICATIONS

Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Nov. 14, 2016.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Office Action for U.S. Appl. No. 15/495,975, dated Mar. 17, 2020.
Office Action for U.S. Appl. No. 16/248,759, dated Apr. 1, 2020.
Hasan, Ragib, et al., “A Survey of Peer-to-Peer Storage Techniques for Distributed File Systems”, National Center for Supercomputing Applications, Department of Computer Science, University of Illinois at Urbana Champaign, Jun. 27, 2005.
Notice of Allowance for U.S. Appl. No. 13/557,063, dated Dec. 23, 2015.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final Office Action for U.S. Appl. No. 13/801,256, dated Aug. 15, 2014.
Final Office Action for U.S. Appl. No. 13/801,256, dated Feb. 18, 2015.
Advisory Action for U.S. Appl. No. 13/801,256, dated Dec. 5, 2014.
Office Action for U.S. Appl. No. 13/801,256, dated Jan. 12, 2016.
Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
U.S. Appl. No. 13/801,271, filed Mar. 13, 2013.
Office Action fpr U.S. Appl. No. 12/797,610, dated Dec. 15, 2014.
Final Office Action for U.S. Appl. No. 12/797,616, dated Jun. 12, 2016.
U.S. Appl. No. 12/619,672, filed Nov. 16, 2009.
Notice of Allowance for U.S. Appl. No. 12/757,968, dated Dec. 18, 2013.
Final Office Action for U.S. Appl. No. 13/801,121, dated May 11, 2016.
Office Action for U.S. Appl. No. 15/428,922 dated Sep. 17, 2018.
Office Action for U.S. Appl. No. 15/480,295, dated Nov. 7, 2018.
Office Action for U.S. Appl. No. 16/162,358, dated Dec. 31, 2018.
Notice of Allowance for U.S. Appl. No. 14/993,005, dated Nov. 27, 2019.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 16/190,050, dated Jun. 1, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/219,940, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Advisory Action for U.S. Appl. No. 13/632,828, dated Feb. 25, 2016.
Office Action for U.S. Appl. No. 13/622,702, dated Sep. 19, 2012.
Office Action for U.S. Appl. No. 13/801,719, dated Jun. 6, 2016.

(56) References Cited

OTHER PUBLICATIONS

Office Action (Notice of Allowance and Fees Due (PTOL-85)) dated Mar. 22, 2022 for U.S. Appl. No. 16/248,759 (pp. 1-9).
Office Action (Notice of Allowance and Fees Due (PTOL-85)) dated Apr. 11, 2022 for U.S. Appl. No. 16/248,759 (pp. 1-6).
Office Action (Notice of Allowance and Fees Due (PTOL-85)) dated Apr. 7, 2022 for U.S. Appl. No. 14/017,159 (pp. 1-8).
Office Action (Non-Final Rejection) dated Apr. 20, 2022 for U.S. Appl. No. 17/306,946 (pp. 1-6).
Office Action (Non-Final Rejection) dated Jun. 6, 2022 for U.S. Appl. No. 16/248,759 (pp. 1-10).
Office Action (Non-Final Rejection) dated Sep. 8, 2022 for U.S. Appl. No. 17/485,289 (pp. 1-5).
Office Action (Notice of Allowance and Fees Due (PTOL-85)) dated Sep. 29, 2022 for U.S. Appl. No. 17/306,946 (pp. 1-8).
Office Action (Non-Final Rejection) dated Oct. 6, 2022 for U.S. Appl. No. 17/160,343 (pp. 1-15)
Office Action (Notice of Allowance and Fees Due (PTOL-85)) dated Nov. 7, 2022 for U.S. Appl. No. 16/248,759 (pp. 1-9).
Office Action (Notice of Allowance and Fees Due (PTOL-85)) dated Dec. 27, 2022 for U.S. Appl. No. 17/485,289 (pp. 1-8).
Office Action (Non-Final Rejection) dated Jan. 13, 2023 for U.S. Appl. No. 17/337,393 (pp. 1-5).
Office Action (Notice of Allowance and Fees Due (PTOL-85)) dated Feb. 2, 2023 for U.S. Appl. No. 17/306,946 (pp. 1-7).
Office Action (Non-Final Rejection) dated Mar. 22, 2023 for U.S. Appl. No. 16/248,759 (pp. 1-18).
Office Action (Notice of Allowance and Fees Due (PTOL-85)) dated May 25, 2023 for U.S. Appl. No. 17/337,393 (pp. 1-7).
Office Action (Final Rejection) dated Jun. 7, 2023 for U.S. Appl. No. 17/160,343 (pp. 1-19).
Office Action for U.S. Appl. No. 16/449,717, dated Nov. 9, 2020.
Final Office Action for U.S. Appl. No. 13/622,702, dated Nov. 30, 2020.
Final Office Action for U.S. Appl. No. 15/674,480, dated Dec. 7, 2020.
Office Action for U.S. Appl. No. 16/168,813, dated Dec. 8, 2020.
Office Action for U.S. Appl. No. 16/600,395, dated Dec. 22, 2020.
Office Action (Non-Final Rejection) dated Sep. 8, 2023 for U.S. Appl. No. 17/160,343 (pp. 1-24).
Office Action (Non-Final Rejection) dated Mar. 5, 2024 for U.S. Appl. No. 18/328,259 (pp. 1-8).
Office Action (Final Rejection) dated Jul. 11, 2024 for U.S. Appl. No. 17/160,343 (pp. 1-23).
Office Action (Notice of Allowance and Fees Due (PTOL-85)) dated Jul. 31, 2024 for U.S. Appl. No. 18/328,259 (pp. 1-8).
Office Action (Notice of Allowance and Fees Due (PTOL-85)) dated Aug. 14, 2024 for U.S. Appl. No. 18/328,259 (pp. 1-4).
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
"Professional Casino Slot Machine", Posted at www.vbtutor.net/VB. Sample/vbslot2.htm on Oct. 20, 2009.
Final Office Action for U.S. Appl. No. 16/559,553, dated Jan. 21, 2021.
Final Office Action for U.S. Appl. No. 16/449,717, dated Jan. 29, 2021.
Notice of Allowance for U.S. Appl. No. 15/811,654, dated Feb. 3, 2021.
Notice of Allowance for U.S. Appl. No. 14/017,150, dated Feb. 5, 2021.
Final Office Action for U.S. Appl. No. 16/794,212, dated Feb. 17, 2021.
Office Action for U.S. Appl. No. 16/351,416, dated Feb. 23, 2021.
Office Action for U.S. Appl. No. 15/674,480, dated Mar. 25, 2021.
Final Office Action for U.S. Appl. No. 16/219,940, dated Mar. 26, 2021.
Office Action for U.S. Appl. No. 16/183,632, dated May 4, 2021.
Final Office Action for U.S. Appl. No. 13/843,192, dated Oct. 21, 2014.
Non-Final Office Action for U.S. Appl. No. 13/801,121, dated Sep. 15, 2016.
Advisory Action for U.S. Appl. No. 13/632,828, mailed Feb. 25, 2016.
Benston, Liz, "Harrahs Launches iPhone App; Caesars Bypasses Check-in," Las Vegas Sun, Las Vegas, NV. Jan. 8, 2010.
Gaming Today Staff, "Slots showcased at 2009 National Indian Gaming Assoc.", GamingToday.com, Apr. 14, 2009.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
U.S. Appl. No. 13/622,702, filed Sep. 19, 2012.
U.S. Appl. No. 13/800,917, filed Mar. 13, 2013.
U.S. Appl. No. 13/833,953, filed Mar. 15, 2013.
U.S. Appl. No. 12/797,610, filed Jun. 10, 2010.
U.S. Appl. No. 12/757,968, filed Apr. 9, 2010.
U.S. Appl. No. 13/833,116 filed Mar. 15, 2013.
Final Office Action for U.S. Appl. No. 12/619,672 dated Nov. 6, 2012.
Frontier Fortune game, email notification, MGM Resorts Intl., Aug. 9, 2013.
Final Office Action for U.S. Appl. No. 15/798,363, dated Feb. 4, 2019.
Notice of Allowance for U.S. Appl. No. 13/843,192, mailed Aug. 10, 2016.
Final Office Action for U.S. Appl. No. 12/797,616 dated May 8, 2013.
Office Action for U.S. Appl. No. 13/296,182, mailed Feb. 25, 2016.
Office Action for U.S. Appl. No. 16/559,553, mailed Jun. 1, 2021.
Notice of Allowance for U.S. Appl. No. 16/579,754, mailed Jul. 16, 2021.
Office Action for U.S. Appl. No. 13/622,702, mailed Jul. 19, 2021.
Office Action for U.S. Appl. No. 16/357,316, mailed Jul. 20, 2021.
Final Office Action for U.S. Appl. No. 16/351,416, mailed Sep. 1, 2021.
Office Action for U.S. Appl. No. 15/671,133, mailed Sep. 2, 2021.
Notice of Allowance for U.S. Appl. No. 16/794,212, mailed Sep. 3, 2021.
Office Action for U.S. Appl. No. 17/020,761, mailed Sep. 9, 2021.
Office Action for U.S. Appl. No. 16/916,001, mailed Sep. 17, 2021.
Finnegan, Amanda, "Casinos Connecting with Customers via iPhone Apps", May 27, 2010, Las Vegas Sun, Las Vegas, NV.
Yancey, Kitty Bean, "Navigate Around Vegas with New iPhone Apps", USA Today, Jun. 3, 2010.
Office Action for U.S. Appl. No. 16/993,154, mailed Jul. 28, 2021.
Green, Marian, "Testing Texting Casino Journal", Mar. 2, 2009.
U.S. Appl. No. 12/945,889, filed Nov. 14, 2010.
U.S. Appl. No. 12/797,616, filed Jun. 10, 2010.
Office Action for U.S. Appl. No. 12/945,888 dated Apr. 10, 2012.
Office Action for U.S. Appl. No. 12/581,115 dated Dec. 20, 2011.
Office Action for U.S. Appl. No. 12/619,672 dated Mar. 7, 2013.
Office Action for U.S. Appl. No. 13/632,828, mailed Apr. 10, 2015.

* cited by examiner

METHOD AND SYSTEM FOR LOCALIZED MOBILE GAMING

CROSS-REFERENCE TO OTHER APPLICATIONS

This application claims priority to, and is a continuation of, U.S. Non Provisional patent application Ser. No. 17/337,393, filed Jun. 2, 2021, entitled "METHOD AND SYSTEM FOR LOCALIZED MOBILE GAMING," which is a continuation of U.S. Non-Provisional patent application Ser. No. 14/017,150 (now U.S. Pat. No. 11,030,851), filed Sep. 3, 2013, and entitled "METHOD AND SYSTEM FOR LOCALIZED MOBILE GAMING," and which in turn claims priority to, and the benefit of, U.S. Provisional Patent Application No. 61/799,862, filed Mar. 15, 2013, and entitled "ADAPTIVE MOBILE DEVICE GAMING SYSTEM," all of which are hereby incorporated by reference herein.

BACKGROUND OF THE INVENTION

Portable electronic devices represent an alternative means to desktop computers to allow users to more conveniently interact with a variety of multimedia services. For example, many portable electronic devices may be configured to allow for the user to interact with multimedia services, messaging services, internet browsing services, telephone services, and the like. Furthermore, the software of portable electronic device may be configured to be updated so as allow for the presentation of additional multimedia services or applications. Portable electronic devices may also be configured to have wireless transmission and receiving capabilities so as to permit communication with one or more other sources.

Utilizing the portable electronic device to permit playing of games of chance may increase revenue for a gaming establishment. However, gaming establishments may only want players to play games of change on their portable electronic devices within specific areas of the establishment. Moreover, it would be beneficial if the gaming establishments were able to relocate the gaming areas to where the portable electronic devices are able to play the games of chance.

OVERVIEW

The present disclosure relates generally to games of chance. More particularly, the present disclosure relates generally to playing games of chance on a mobile or portable gaming device. In one embodiment, games of chance can be played on a mobile or portable gaming device when proximate to a portable reconfigurable and repositionable game zone.

A system and method for facilitating play of games of chance on a portable gaming device (PGD) or mobile gaming device (MGD) is provided. The MGD may be authorized to play games of chance when proximate to or within a game zone. The game zone may have at least one portable transceiver such that the game zone may be reconfigurable to any size and shape and may be repositionable to any location within the gaming establishment. The game zone is proportionately smaller in size than the gaming establishment such that there may be a plurality of game zones within the gaming establishment.

In one embodiment, a system to facilitate playing games of chance in a game zone for a mobile gaming device (MGD) comprises a game zone, having at least one portable transceiver configured to: i) detect presence of the MGD; ii) obtain MGD data from the MGD; and iii) periodically re-detect presence of the MGD within the game zone, the at least one portable transceiver repositionable to form the game zone. The system may also have a portable controller configured to receive MGD data from each of the at least one portable transceiver as well as a gaming server configured to: i) receive the MGD data from the portable controller; ii) determine if the MGD is authorized to place a monetary wager to play games of chance based on the MGD data; iii) periodically receive detection confirmation from the portable controller if the MGD is present in the game zone; and iv) transmit and/or receive game of chance data to/from the MGD if the MGD is authorized to play games of chance and detection confirmation is received, wherein the game zone is repositionable to any desired location at a gaming establishment and wherein the game zone is configurable to form an arbitrary size or shape.

In one embodiment, a method for facilitating game of chance play on a mobile gaming device may include forming a game zone at a gaming establishment, the game zone formed by at least one repositionable wireless zone portable controller; detecting, using the wireless zone portable controller, presence of the MGD in the game zone; receiving MGD data from the MGD; transmitting, by the wireless zone portable controller, the MGD data to a gaming server to determine if the MGD is authorized to play games of chance; periodically re-detecting, by the at least one portable transceiver, presence of the MGD within the game zone; and transmitting presence data to the gaming server if the MGD is re-detected by the portable transceiver, wherein the MGD is permitted to place monetary wagers to play games of chance within the game zone if the MGD is authorized to play games of chance and while the MGD is re-detected within the game zone.

In one embodiment, a program storage device readable by a machine tangibly embodying a program of instructions executable by the machine to perform a method for facilitating game of chance play on a mobile gaming device, the method comprises forming a game zone at a gaming establishment, the game zone formed by at least one repositionable wireless zone portable controller; detecting, using the wireless zone portable controller, presence of the MGD in the game zone; receiving MGD data from the MGD; transmitting, by the wireless zone portable controller, the MGD data to a gaming server to determine if the MGD is authorized to play games of chance; periodically re-detecting, by the at least one portable transceiver, presence of the MGD within the game zone; and transmitting presence data to the gaming server if the MGD is re-detected by the portable transceiver, wherein the MGD is permitted to place monetary wagers to play games of chance within the game zone if the MGD is authorized to play games of chance and while the MGD is re-detected within the game zone.

In another embodiment, a system to facilitate playing games of chance on a MGD comprises a wireless zone portable controller configured to provide a game zone proximate to a gaming establishment, the wireless zone portable controller being configured to at least: i) detect presence of the MGD; ii) obtain MGD data from the MGD; and iii) periodically re-detect presence of the MGD within the game zone. The system further includes a gaming server configured to: receive the MGD data from the wireless zone portable controller; determine if the MGD is authorized to place monetary wagers to play games of chance based on the MGD data; periodically receive detection confirmation from the wireless zone portable controller if presence of the MGD is within the game zone; and transmit and/or receive game of chance data to/from the MGD if the MGD is authorized to place monetary wagers to play games of chance and detection confirmation is received.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Embodiments are described herein in the context of a method and system for localized mobile gaming. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the various embodiments, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A system and method for facilitating play of games of chance on a portable gaming device (PGD) or mobile gaming device (MGD) is provided. The MGD may be authorized to play games of chance when proximate to or within a game zone. The game zone may have at least one portable transceiver such that the game zone may be reconfigurable to any size and shape and may be repositionable to any location within the gaming establishment. The game zone is proportionately smaller in size than the gaming establishment such that there may be a plurality of game zones within the gaming establishment.

Figure 1:
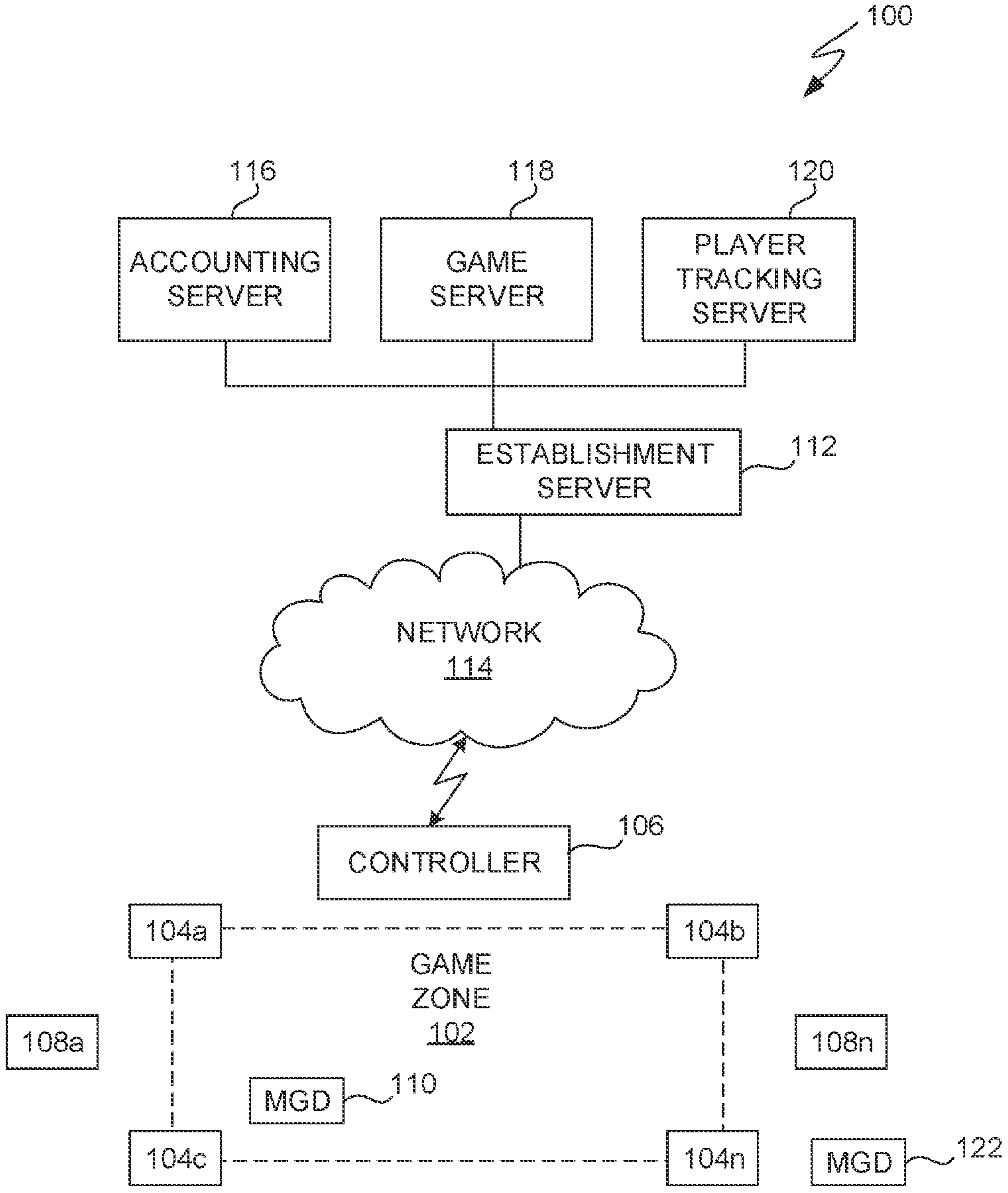
FIG. 1 illustrates a block diagram of an exemplary system to facilitate playing games of chance on a mobile gaming device.

FIG. 1 illustrates a block diagram of an exemplary system to facilitate playing games of chance on a mobile gaming device. The system 100 includes at least one reconfigurable and repositionable game zone 102 having at least one portable transceiver 104*a-n* and at least one portable controller 106. The reconfigurable and repositionable game zone 102 may also have at least one camera 108*a-n*. The reconfigurable and repositionable game zone 102 may be located or positioned proximate a gaming establishment, such as a casino, supermarket, bar, cruise ship, airplane, or any other establishment where games of chance may be played. The reconfigurable and repositionable game zone 102 has at least one portable transceiver 104*a-n*. The portable transceiver may be any portable transceiver designed to receive and transmit RF (radio frequency) data signals. The portable transceiver may be, for example a free standing antenna, kiosk, or any other device configured to receive and transmit RF data. In one implementation, the portable transceiver wirelessly communicates with an RFID tag or an NFC tag that's in a player's pocket, purse, or in any other location on the player, or attached to the player's MGD. In another embodiment, the portable transceiver may be positioned within a gaming device, such as a slot machine, table game, or any other gaming device, and communicates with any nearby RFID/NFC tags within its communication range. The portable transceiver may be powered by plugging into a typical power outlet. When using a power outlet, communication to the backend servers can be implemented using the power line communication standards such as IEEE 1901, HomePlug AV, ITU-T G.hn, and the like. The portable transceiver may also operate on battery to improve its portability, continuity, and redundancy. In one embodiment, the portable transceiver plugs into a power outlet for power and communication, but also uses a battery for back up power so that it can continue to operate even during power interruptions.

Positioning of each of the portable transceivers 104*a-n* may form the area or shape of the reconfigurable and repositionable game zone 102. For example, as illustrated in FIG. 1, the reconfigurable and repositionable game zone 102 is in the shape of a square. As discussed in detail below with reference to FIG. 2B, strategic positioning of the portable transceivers to form the reconfigurable and repositionable game zone 102 may result in various shaped reconfigurable and repositionable game zones. When presence of an RFID/NFC tag associated with a PGD/MGD 110, is detected proximate to or within the reconfigurable and repositionable game zone 102, the PGD/MGD may be permitted to play games of chance. PGDs/MGDs may be any portable electronic device configured to play games of chance, such as a mobile telephone, portable media player, personal digital assistant, tablet, net book, or any other similar portable electronic device.

When located outside the reconfigurable and repositionable game zone 102 and undetectable by the portable transceivers 104*a-n*, the MGD 110 may not be permitted to play games of chance with monetary wagers. In one embodiment, if the MGD 110 was previously authorized to play games of chance and the user stepped away from the reconfigurable and repositionable game zone 102 (e.g. to go to the bathroom, play at a table game, play a slot machine, or any other reason), an indication that the required location must be reestablished to continue the game of chance play may be displayed on a display of the MGD 110.

In another embodiment, the MGD 122 may be permitted to play games of chance if the MGD 122 was previously authorized to play games of chance and is already or still wirelessly interacting with a gaming server. In yet another embodiment, the MGD 122 may be permitted to play games of chance with non-monetary wagers (such as loyalty points, virtual currencies, and nay other non-monetary wagers) when presence of the MGD and/or its associated RFID/NFC tag is not detected within the game zone. In one example, if presence of the MGD and/or its associated RFID/NFC tag is no longer detected within the game zone, a conversion notification may be transmitted to the MGD. The conversion notification may request whether the player would like to continue play of the games of chance using non-monetary wagers, such as points (e.g. player tracking points).

The MGD 110 may be detected based on a zone specific location. In other words, the MGD 110 is considered proximate to or within the reconfigurable and repositionable game zone 102 as long as at least one of the portable transceivers 104*a-n* detects presence of the MGD 110 and/or its associated RFID/NFC tag. Thus, use of global positioning system, RF fingerprinting, RF triangulation, or any other complicated location detection methods is not necessary to detect presence of the MGD, or a RFID/NFC tag associated with the MGD, or both the MGD and a RFID/NFC tag associated with it, proximate to or within the reconfigurable and repositionable game zone 102. As such, this method of detection is more cost efficient and simpler to deploy than traditional location systems.

The reconfigurable and repositionable game zone 102 may have at least one camera 108*a-n* for security, audit, or authorization purposes. Although illustrated as separate from the portable transceivers 104*a-n*, in one embodiment, the camera 108*a-n* may be positioned within the portable transceiver 104*a-n*. In still another embodiment, the camera 108*a-n* may be positioned within other gaming devices, such as a slot machine, table game, kiosk, or the like. The camera 108*a-n* may be used for security purposes to ensure no illegal activities occur. In one embodiment, the camera 108*a-n* records the activities in the gaming zone (e.g. in at least a portion of the gaming zone and/or the entire gaming zone area). The recorded activities and information may then be stored in a mass storage device (hard drive, tape, cloud storage, and the like). Additionally, the camera 108*a-n* may be used for audit purposes. For example, if a player objects to a payout, the battery on the MGD dies during a game session, power outage occurs at the venue, or any other malfunction happens, the camera may be used to record game play, user actions, and the like to replay the game play. Moreover, the camera 108*a-n* may be used to authenticate the player (e.g. via facial recognition methods) and/or associate the player with the MGD.

The portable transceivers 104*a-n* may be configured to receive data from the MGD 110. The portable transceivers 104*a-n* may receive data from the MGD via any known method. In one embodiment, the MGDs may have a passive or active tag (e.g. radio frequency identification (RFID) tag, near field communication (NFC) tag) that may be read or detected by the portable transceiver. In another embodiment, the portable transceiver 104*a-n* may actively receive data from the MGD using any wireless method such as WiFi, Bluetooth, radio frequency, or any other communication methods. In another embodiment, the portable transceiver 104*a-n* may also communicate with the MGD 110 via any wired methods as well. In a hybrid implementation, the portable RF transceiver 104*a-n* may detect the presence of a RFID/NFC tag such as a player identification card (or any other type of car such as a player loyalty card, credit card, and the like) carried in the player's pocket, that will act as a trigger for the portable RF transceiver 104*a-n* to establish a wireless communication (i.e., BlueTooth, short range WiFi, and the like) with the MGD. For instance, if the antenna design on both the RFID tag and the BlueTooth transceivers were designed to have a similar ranges (e.g., 20 feet), and the RF transceiver 104*a-n* can detect both devices, it can be reasoned that both the player carrying the player RFID card and the associated MGD are in the gaming zone. The fact that RFID transceivers and Bluetooth transceivers normally operate on different frequencies makes this location-verification even more secure as it takes two forms of ID's (the RFID player card and the MGD's ID) on two separate communication standards to completely verify the eligibility of the MGD. The player experience is uncomplicated by the complexities of the underlying technologies—he just needs to carry his player card in his pocket, and have his MGD on hand.

In one embodiment, the portable transceivers 104*a-n* may transmit the MGD data to an establishment server 112 via network 114. In another embodiment, the portable transceivers 104*a-n* may transmit the MGD data to a centralized portable controller 106 of the reconfigurable and repositionable game zone 102. The portable controller 106 may then transmit the MGD data to the establishment server 112 via network 114. MGD data may include data such as the MGD identification, player information, digital signature of the application software, battery level, the MGD's relative proximity (within communication range) to a trusted and known portable RF transceiver, and any other desired information. The network 114 can include one or more private networks or public networks, including wired and/or wireless networks.

The establishment server 112 may be configured to communicate with an accounting server 116, game server 118, and a player tracking server 120. Although illustrated with only three servers, the establishment server 112 may be configured to communicate with any other servers such as a live table game server (broadcasting live table game actions), a mobile game server (for mobile game devices), a tournament game server (conducts slots and table game tournaments), a hotel reservation server, food and beverage server, prize server, advertisement server, and any others desired servers. The player tracking server 120 may store player tracking information such as name, password, user identification, player preferences, loyalty points, games of chance played, whether the player is authorized to play games of chance on a MGD, associated MGDs, and any other desired player information.

When the establishment server 112 receives the MGD data, the establishment server 112 may determine whether games of chance may be played on the MGD 110 by retrieving information from the player tracking server 120. For example, the MGD 110 may be associated with a player that is authorized to play games of chance. In another example, if the MGD 110 is not associated with a player account and/or the player is not authorized to play games of chance, the establishment server 112 may not permit games of chance to be played on the MGD 110. If the MGD 100 is authorized to play games of chance, the establishment server 112 may communicate directly with the MGD 110 to transmit gaming data directly to the MGD 100 to facilitate play of the games of chance.

In yet another example, the MGD 110 may be associated with a player that is authorized to place monetary wagers to play games of chance. If the MGD 110 is not authorized to place monetary wagers to play games of chance, the establishment server 112 may not receive a wager amount to play the games of chance.

In another example, the player may also not be permitted to play games of chance on the MGD 110 if there are insufficient funds in the player account based on information stored in the accounting server 116. If games of chance are permitted to be played on the MGD 110, but the player has no funds to play the games of chance, the player will not be permitted to play the games of chance. In one embodiment, the player may be given the option to play with non-monetary wagers (e.g. loyalty points, player tracking points, virtual currencies, and any other non-monetary wagers). In another embodiment, the player may be given the option to covert the non-monetary wager to a monetary wager. For example, 500 loyalty points may be converted to $50.00 that the player may use the play the games of chance.

In still another embodiment, the portable transceiver 104*a-n* may periodically determine whether presence of the MGD 100, and/or its associated RFID/NFC tag, is proximate to or within the reconfigurable and repositionable game zone 102. The portable transceiver 104*a-n* may make the determination at predetermined time intervals such as between about one second to 60 seconds, between about 2 seconds to 100 seconds, or any other predetermined desired time interval. If at least one portable transceiver 104*a-n* continues to detect presence off the MGD 110 and/or its associated RFID/NFC tag proximate to or within the reconfigurable and repositionable game zone 102, the MGD 110 may continue to be permitted to play games of chance. However, in one embodiment, if the MGD 110 and/or its associated RFID/NFC tag is not re-detected proximate to or within the reconfigurable and repositionable game zone 102, a non-detect notification may be transmitted to the establishment server 112 and the MGD 110 may no longer be permitted or is therefore disallowed to play games of chance.

Figure 2A:
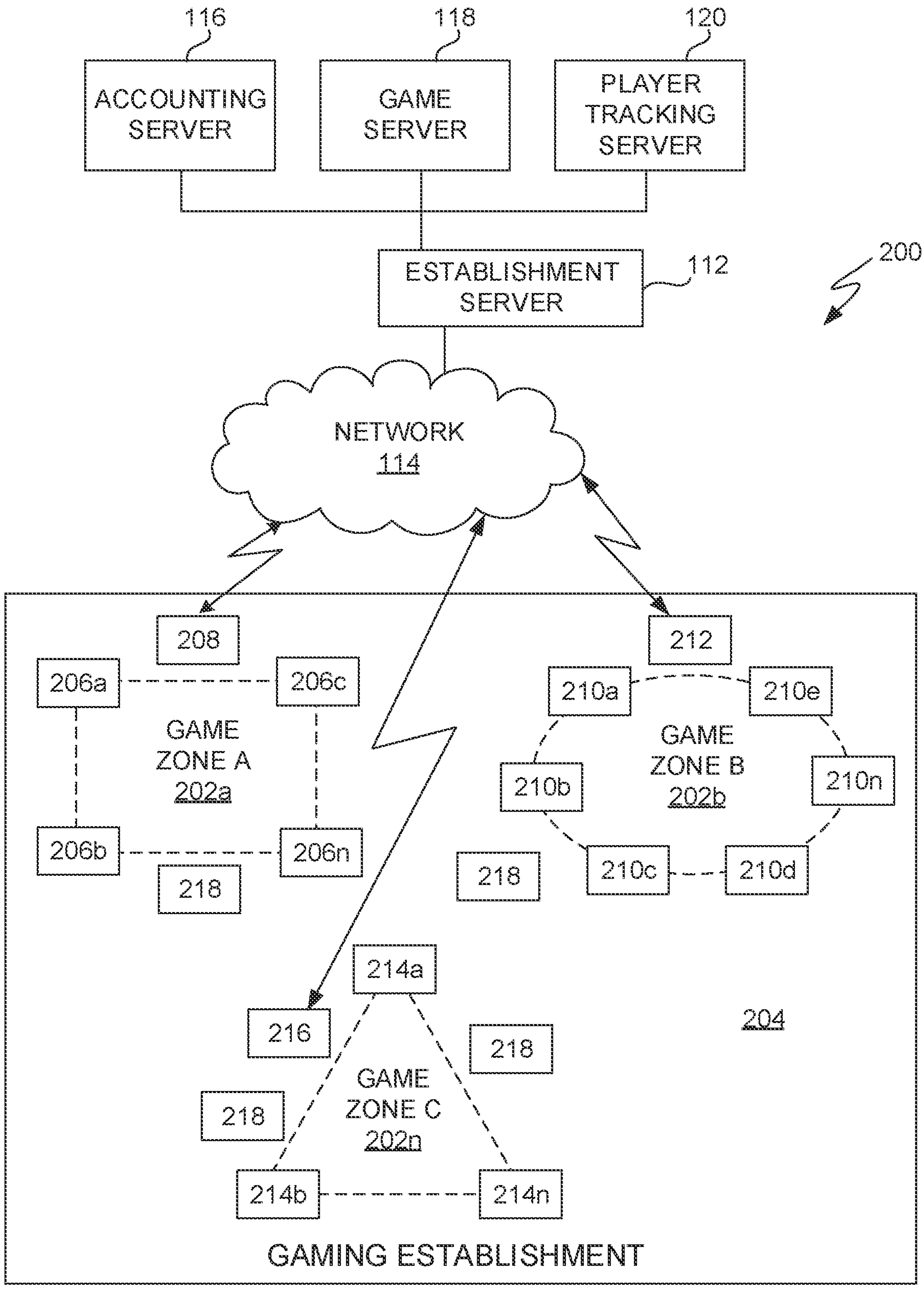
FIGS. 2A-2B illustrate a block diagram of another exemplary system to facilitate playing games of chance on a mobile gaming device.
Figure 2B:
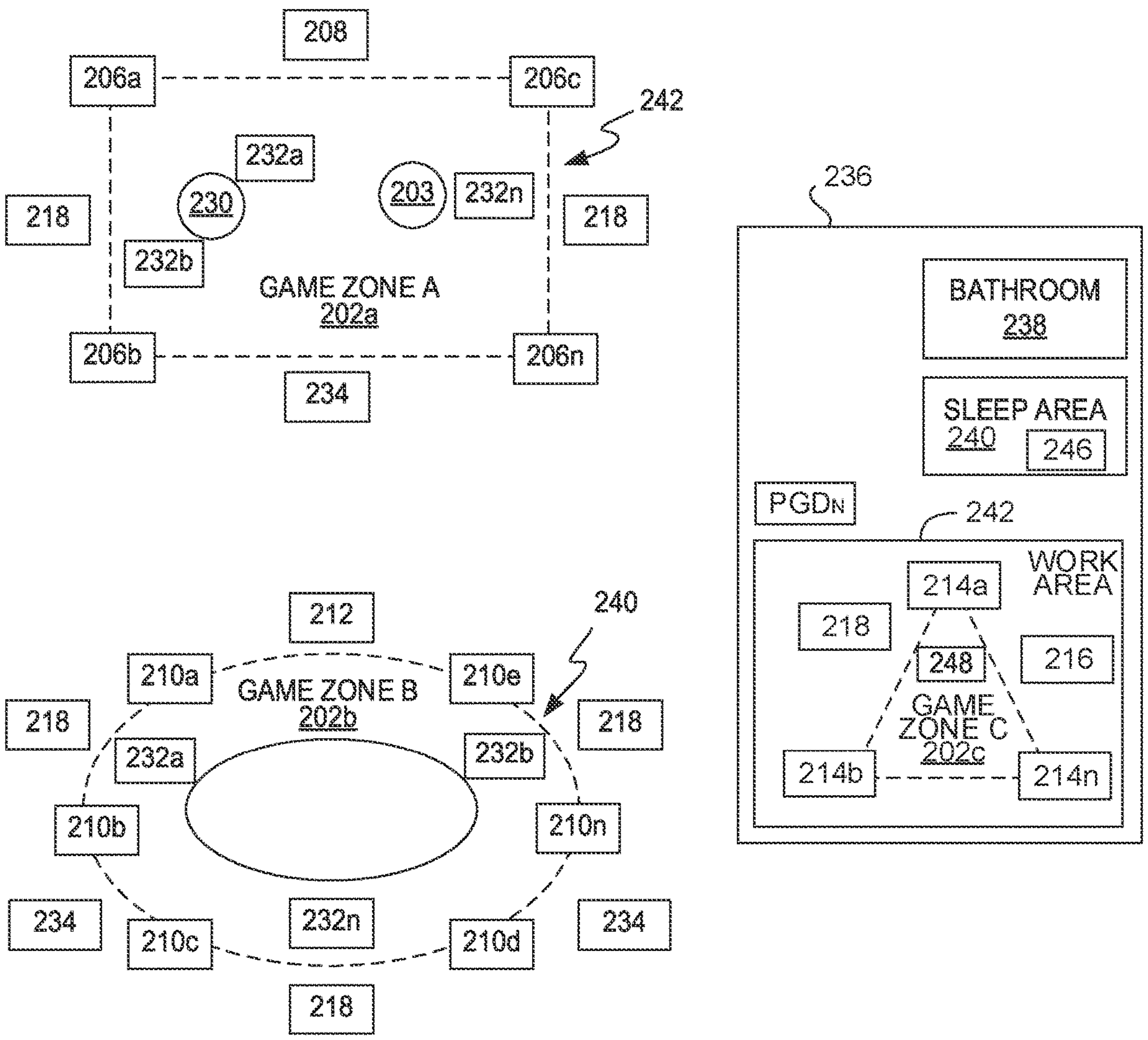

FIGS. 2A-2B illustrate a block diagram of another exemplary system to facilitate playing games of chance on a mobile gaming device. FIG. 2A illustrates an example system 200 to facilitate game of chance play on a MGD 200. FIG. 2A is similar to FIG. 1, but illustrates several reconfigurable and repositionable game zones 202*a-n* within a gaming establishment 204. Reconfigurable and repositionable game zone A 202*a* includes a plurality of portable transceivers 206*a-n*. The portable transceivers are positioned at corners of a square shape thereby forming a reconfigurable and repositionable game zone having a square shape. Reconfigurable and repositionable game zone A 202*a*, may also include a portable controller 208 configured to communicate with the portable transceivers 206*a-n* and an establishment server 112.

Reconfigurable and repositionable game zone B 202*b* may have a plurality of portable transceivers 210*a-n* strategically positioned in the shape of a circle or oval. Each of the portable transceivers may be configured to communicate with a portable controller 212. Reconfigurable and repositionable game zone C 202*n* may have a plurality of portable transceivers 214*a-n* strategically positioned in the shape of a triangle. Portable controller 216 may be configured to communicate with each of the portable transceivers 214*a-n* and the establishment server 112.

Each reconfigurable and repositionable game zone 202*a-n* may have at least one camera 218 for security, audit, and/or authorization purposes. Although illustrated as separate from the portable transceivers 208*a-n*, 210*a-n*, 212*a-n*, in one embodiment, the camera 218 may be positioned within the portable transceiver 208*a-n*, 210*a-n*, 212*a-n* and/or portable controller 208, 212, 216. In still another embodiment, the camera 218 may be positioned within other gaming devices, such as a slot machine, table game, kiosk, or the like positioned proximate the reconfigurable and repositionable game zone 202*a-n*, 210*a-n*, 212*a-n*. The camera 218 may be used for security purposes to ensure no illegal activities occur. In one embodiment, the camera 218 records the activities in a gaming zone (e.g. in at least a portion of the gaming zone and/or the entire gaming zone area). The recorded activity and information may then be stored in a mass storage device (hard drive, tape, cloud storage, and the like). Additionally, the camera 218 may be used for audit purposes. For example, if a player objects to a payout, the battery on the MGD dies during a game session, power outage occurs at the gaming venue, or any other malfunction happens, the camera may be used to record game play, user actions, and the like to replay the game play. Moreover, the camera 108*a-n* may be used to authenticate the player (e.g. via facial recognition methods) and/or associate the player with the MGD.

Each reconfigurable and repositionable game zone 202*a-n* may be substantially smaller in area and size than the gaming establishment 204 thereby forming a plurality of intra-establishment mobile game zones. In other words, each reconfigurable and repositionable game zone 202*a-n* is localized internal to a gaming establishment such that more than one reconfigurable and repositionable game zone may be formed internal the gaming establishment. Each reconfigurable and repositionable game zone may be configured and reconfigured to form of any desired shape (e.g. square, circle, triangle, star, or any random shape desired) and size. For example, in a casino, each reconfigurable and repositionable game zone 202*a-n* may be an intra-casino mobile game zone where MGDs may be permitted to play games of chance. The size of the mobile game zone can be flexible depending on the needs of the casino operator. In one example, each of the reconfigurable and repositionable game zones may have an area that is between about 50%-75% the area of the gaming establishment. In another example, each of the reconfigurable and repositionable game zones may have an area that is between about 5%-25% the area of the gaming establishment. In still another example, each of the reconfigurable and repositionable game zones may have an area that is between about 25%-50% the area of the gaming establishment.

In one example, a mobile game zone maybe established at or near a table game or gaming device to allow back betting. Back betting permits players (back bettors), who are not physically sitting at a table game or gaming device, to participate in the table game by betting on another player's hand. The another player would generally be physically sitting and/or otherwise participating in play of the game of chance. In other words, the another play would be physically sitting at the table game or slot machine. The back bettor has no right, say, or decision as to how the hand is played. Although games of chance generally have transaction limits—such as minimum and maximum betting limits (e.g. $25 minimum bet and $250 maximum bet, or any other betting limits)—in this embodiment, the back bettors may bet any amount desired without regard to the transaction limits. For example, if the table has a minimum bet amount of $25, the back bettor may bet $5. If the table has a maximum bet amount of $250, the back bettor may bet $300.

The transaction limits may be based on any desired criteria. Such criteria may be based on location (e.g. the table game and/or gaming device may be situated within a high roller area in the gaming establishment), player tracking association (e.g. platinum players have higher limits than silver players) or credit rating (e.g. AAA, BB, C, and the like), time (e.g. players may place bets outside the transaction limits between a predefined time period such as from 8 pm to 2 am), or a player's history (e.g. average bet size over the last six months).

The repositionable game zone may be formed for any desired game play. In one example, a game zone maybe established for a tournament where any player nearby can participate. In another example, the game zone may be established for VIP members or high rollers. In still another example, the game zone may be established to allow one single player to play game of chance. In yet another example, the game zone may be established specifically for back bettors to participate in specific table games.

FIG. 2B illustrates example reconfigurable and repositionable game zones within a gaming establishment. Reconfigurable and repositionable game zone A 202*a*, may be, for example, at least a section of or in an area of a bar 242 located at the gaming establishment. Reconfigurable and repositionable game zone A 202*a* may have a plurality of tables 230 where players may congregate to watch a sports game on the television, socialize, trade information, perform back betting, or conduct any other business. To increase revenue, the gaming establishment may permit players to play games of chance on their MGDs 232*a-n* in the bar 242 as long as presence of the MGDs 232*a-n* and/or their associated RFID/NFC tags are detected proximate to or within reconfigurable and repositionable game zone A 202*a*. If presence of the MGD, such as MGD 234, and/or a RFID/NFC tag associated with MGD 234, is not detected proximate to or within the reconfigurable and repositionable game zone A 202*a* and/or it is not subsequently wirelessly interacting with the establishment server after being authorized to play games of chance, the MGD 234 may not be permitted to play games of chance.

Reconfigurable and repositionable game zone B 202*b* may be, for example, located in at least a portion of a pool area 240. People, while lounging around the pool area 240, may want to play games of chance. If the presence of the MGDs 232*a-n* and/or their associated RFID/NFC tags are detected proximate to or within reconfigurable and repositionable game zone B 202*b*, MGDs 232*a-n* may be permitted to play games of chance. If presence of the MGD 234 and/or its associated RFID/NFC tag is not detected proximate or within reconfigurable and repositionable game zone B 202*a* and/or it is not wirelessly interacting with the establishment server after being authorized to play games of chance, the MGD 234 may not be permitted to play games of chance.

Reconfigurable and repositionable game zone C 202*c* may be, for example, a hotel room 236 at the gaming establishment. The hotel room 236 may have a bathroom 238, sleeping area 240, and a work area 242. Reconfigurable and repositionable game zone C 202*c* is illustrated positioned in at least a portion of the work area 242. However this is not intended to be limiting as the reconfigurable and repositionable game zone may be positioned at any desired area in the hotel room 236, such as the sleeping area 240. When presence of the MGD 248 and/or its associated RFID/NFC tag is detected proximate to or within the reconfigurable and repositionable game zone C 202*c*, the MGD 248 may be permitted to play games of chance. However, if presence of the MGD and/or its associated RFID/NFC tag is not detected proximate the reconfigurable and repositionable game zone 202*c*, such as MGD 246, MGD 246 may not be permitted to play games of chance.

In each of the configurable and repositionable game zones, in one embodiment, if presence of the MGD and/or its associated RFID/NFC tag is detected in the game zones, the player may be given the option to play with non-monetary wagers (e.g. loyalty points, player tracking points, and the like). In another embodiment, the player may be given the option to covert a non-monetary wager to a monetary wager. For example, 500 loyalty points may be converted to $50.00 that the player may use to play the games of chance.

In another embodiment, if the MGD exits the game zone, a non-monetary wager notification may be transmitted to the MGD. The player may then be given the option to continue play of the games of chance using non-monetary wagers, such as points (e.g. loyalty points, player tracking points, and the like).

The reconfigurable and repositionable game zones 202*a-n* are substantially smaller in area than the gaming establishment thereby creating an intra-establishment mobile game zone. Since the reconfigurable and repositionable game zones are smaller in size than the gaming establishment, there may be a plurality of intra-establishment mobile game zones within the gaming establishment. In one example, each of the reconfigurable and repositionable game zones 202*a-n* may have an area that is between about 50%-75% the area of the gaming establishment. In another example, each of the reconfigurable and repositionable game zones may have an area that is between about 5%-25% the area of the gaming establishment. In still another example, each of the reconfigurable and repositionable game zones may have an area that is between about 25%-50% the area of the gaming establishment.

In one example, a mobile game zone maybe established at or near a table game or gaming device to allow back betting. Back betting permits players (back bettors), who are not physically sitting at a table game or gaming device, to participate in the table game by betting on another player's hand. The another player would generally be physically sitting and/or otherwise participating in play of the game of chance. In other words, the another play would be physically sitting at the table game or slot machine. The back bettor has no right, say, or decision as to how the hand is played. Although games of chance generally have transaction limits—such as minimum and maximum betting limits (e.g. $25 minimum bet and $250 maximum bet, or any other betting limits)—in this embodiment, the back bettors may bet any amount desired without regard to the transaction limits. For example, if the table has a minimum bet amount of $25, the back bettor may bet $5. If the table has a maximum bet amount of $250, the back bettor may bet $300.

The transaction limits may be based on any desired criteria. Such criteria may be based on location (e.g. the table game and/or gaming device may be situated within a high roller area in the gaming establishment), player tracking association (e.g. platinum players have higher limits than silver players) or credit rating (e.g. AAA, BB, C, and the like), time (e.g. players may place bets outside the transaction limits between a predefined time period such as from 8 pm to 2 am), or a player's history (e.g. average bet size over the last six months).

The repositionable game zone may be formed for any desired game play. In one example, a game zone maybe established for a tournament where any player nearby can participate. In another example, the game zone may be established for VIP members or high rollers. In still another example, the game zone may be established to allow one single player to play game of chance. In yet another example, the game zone may be established specifically for back bettors to participate in specific table games.

Figure 3A:
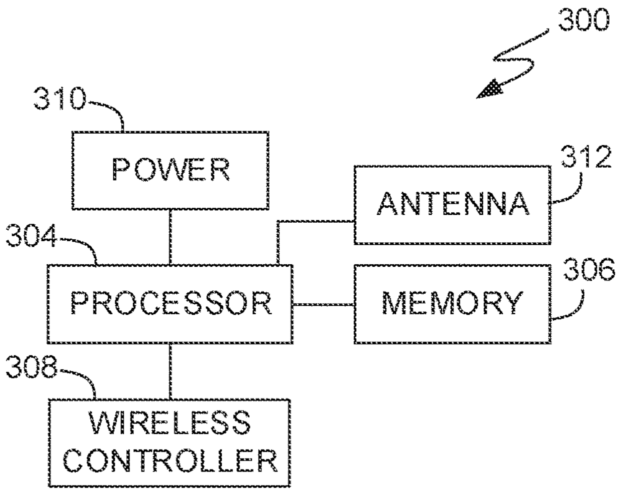
FIGS. 3A and 3B illustrate a block diagram of example wireless portable transceivers.
Figure 3B:
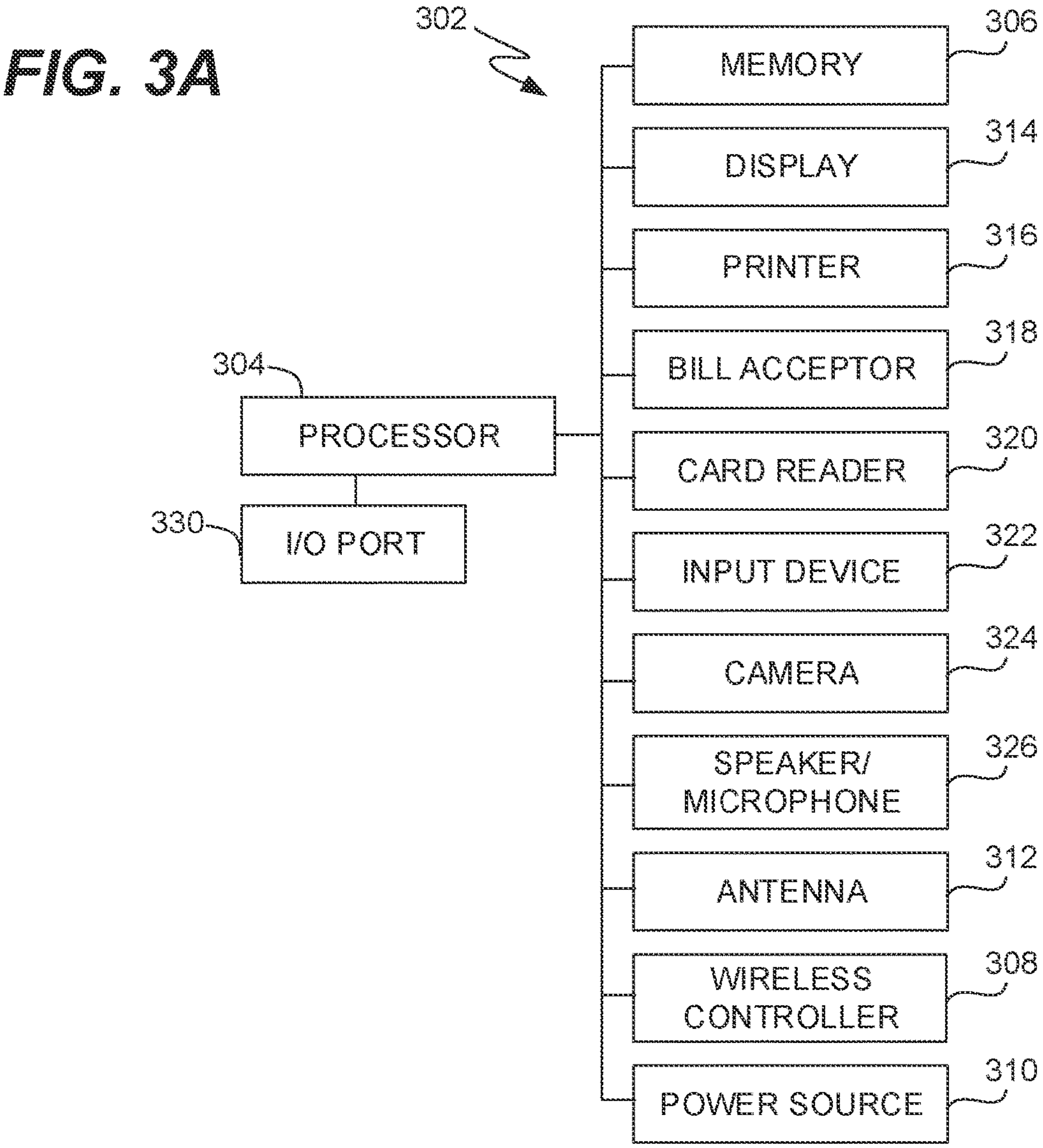

FIGS. 3A and 3B illustrate a block diagram of example wireless portable transceivers. FIG. 3A illustrates a block diagram of an example portable wireless portable transceiver 300. The portable transceiver 300 may be, for example, any known portable transceiver, such as the Speedway® xPortal™ made by Impinj, that is able to receive and transmit RF data. The portable transceiver 300 may have a processor 304, memory 306, antenna 308, power source 310, and a wireless portable controller 308. Processor 304 may be configured to detect presence of a MGD and/or its associated RFID/NFC tag and read or obtain MGD data from the MGD using antenna 312. Subsequently, processor may be configured to periodically re-detect presence of the MGD and/or its associated RFID/NFC tag to ensure the MGD and/or its associated RFID/NFC tag is proximate to or within a reconfigurable and repositionable game zone created by the portable transceiver. MGD data may include data such as the MGD identification, player information, digital signature of the application software, battery level, the MGD's relative proximity (within communication range) to a trusted and known portable RF transceiver, and any other desired information.

The portable transceivers 300 may receive data from the MGD via any known method. In one embodiment, the MGDs may have a passive or active (battery powered) tag (e.g. radio frequency identification (RFID) tag, near field communication (NFC tag) that may be read or detected by the portable transceivers 300. In another embodiment, the portable transceiver 300 may actively receive data from the MGD using any wireless method such as WiFi, Bluetooth, radio frequency, or any other communication methods. In another embodiment, the portable transceiver 300 may also communicate with the MGD 110 via any wired methods, such as power line communication, as well. The MGD data may then be transmitted to an establishment server via wireless portable controller 308.

FIG. 3B illustrates another example of a portable transceiver. The portable transceiver 302 is similar to the portable transceiver 300 illustrated in FIG. 3A, however portable transceiver 302 has additional peripherals and may be a stationary portable transceiver. In one embodiment, the portable transceiver 302 may be a kiosk. In another embodiment, the portable transceiver 302 may be gaming device such as a slot machine or a peripheral management device as described in Ser. No. 12/945,888, filed Nov. 14, 2010, entitled "Peripheral Management Device for Virtual Game Interaction" which is hereby incorporated by reference in its entirety for all purposes. In addition to a processor 304, memory 306, antenna 308, power source 310, and a wireless portable controller 308, portable transceiver 302 may also include a plurality of peripheral devices such as a display 314, printer 316, bill acceptor 318, card reader 320, input device 322, camera 324, and speaker/microphone 326.

Display 314 may be any kind of display, such as an LCD, LED, e-ink and maybe equipped with touch screen or gesture interface capabilities, configured to present gaming information or data to a player. The gaming information or data may be player tracking information, advertisements, or any information the gaming establishment desires to present to the player. Printer 316 may be configured to print out any gaming information such as remaining credits, advertisements, coupons (i.e. free buffet coupon), show tickets, player tracking information, credit voucher, or any other information.

Bill acceptor 318 may be configured to accept any monetary amount, both paper-based currencies and digital currencies (electronic funds from the MGD, for instance). A player may input money or the credit voucher into the bill acceptor. The amount of money or the amount of the voucher may be recorded and stored in an accounting server, such as accounting server 116 illustrated in FIG. 1 for the player to use to play games of chance. For example, when the establishment server (e.g. establishment server 112 illustrated in FIG. 1) makes a determination of whether the MGD is authorized or permitted to play games of chance, the establishment server may look to whether the player has sufficient amount in his account to play the games of chance. If the player does not have sufficient amount in his account, an insufficient fund notification may be transmitted to the MGD that allows the user to add money to his account via the bill acceptor 318. Other examples for the facilitation of money to a player account are also described in application Ser. No. 13/632,743, filed Oct. 1, 2013, entitled "Electronic Fund Transfer for Mobile Gaming" which is hereby incorporated by reference in its entirety for all purposes. For example, the player may utilize physical contact with the bill acceptor to facilitate the transfer of funds to the player account.

Card reader 320 may be configured to read any type of card, such as a player tracking card, credit card, debit card, and the like. The card type can be a magnetic stripe card, a smart card, a RFID card, a NFC card, or even a virtual/digital card. In one embodiment, the card reader 320 may read the player tracking card to allow the player to create an account and register an associated MGD via display 314 or input device 322. Once the player card is paired with the MGD at registration, both components are normally required for real money gaming or other sensitive transactions (e.g., funds transfer) within the portable, repositionable gaming zone. Input device 322 may be any device such as a keyboard, joystick, or any other similar input device. Once registered, gaming application programs may be transmitted to the MGD to allow the player to play games of chance on the MGD. For example, once the MGD is authorized to play games of chance, the establishment server (e.g. establishment server 112 illustrated in FIG. 1) may determine whether the MGD is capable of playing the games of chance based on whether the gaming application program had been previously transmitted to the MGD.

As discussed above, portable transceiver 302 may have a camera 324 for security, audit, and authorization purposes. The camera 324 may be used for security purposes to ensure no illegal activities occur. In one embodiment, the camera 324 records the activities in a gaming zone (e.g. in at least a portion of the gaming zone and/or the entire gaming zone area). The recorded activities and information may be stored in a mass storage device (hard drive, tape, cloud storage, and the like). Additionally, the camera 324 may be used for audit purposes. For example, if a player objects to a payout, the battery on the MGD dies during a game session, power outage occurs at the gaming venue, or any other malfunction happens, the camera may be used to record game play, user actions, and the like to replay the game play. Moreover, the camera 324 may also be used for authentication purposes, such as to authenticate the player using facial recognition.

Figure 4:
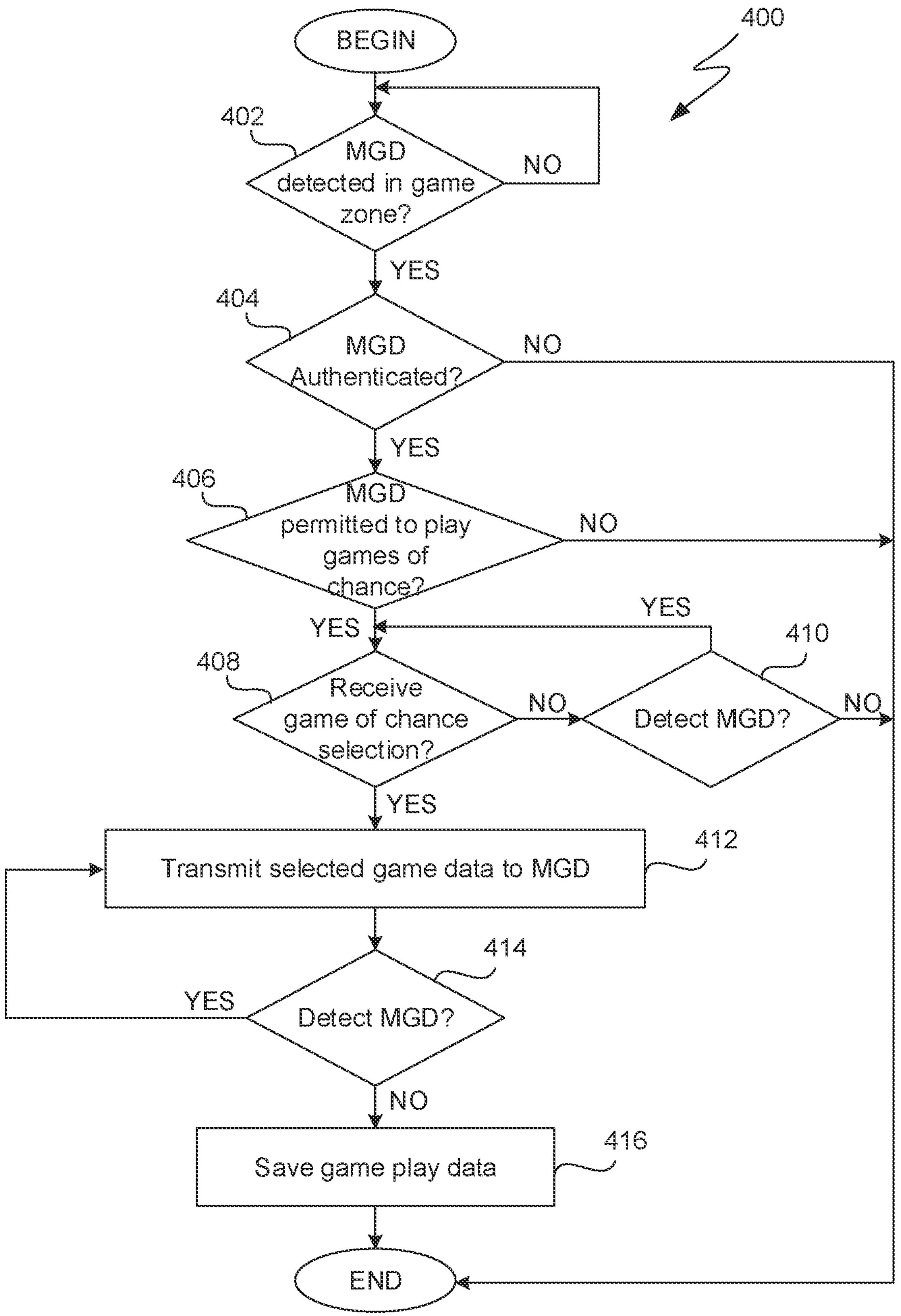
FIG. 4 illustrates a flow diagram of an exemplary method for facilitating playing games of chance on a mobile gaming device.

FIG. 4 illustrates a flow diagram of an exemplary method for facilitating playing games of chance on a mobile gaming device. The method 400 begins with determining whether presence of an MGD and/or its associated RFID/NFC tag is detected proximate to or within the reconfigurable and repositionable game zone at 402. The reconfigurable and repositionable game zone may be located or positioned proximate a gaming establishment, such as a casino, supermarket, bar, cruise ship, airplane, or any other establishment where games of chance may be played. The reconfigurable and repositionable game zone may have at least one portable transceiver configured to detect presence of the MGDs and/or its associated RFID/NFC tag proximate to or within the reconfigurable and repositionable game zone. The portable transceiver may also be designed to receive and transmit data. The portable transceiver may be, for example a free standing antenna, kiosk, or any other device configured to receive and transmit data. In one implementation, the portable transceiver wirelessly communicates with an RFID tag or an NFC tag that's in a player's pocket, purse, or in any other location on the player, or attached to the player's MGD. In another embodiment, the portable transceiver may be positioned within a gaming device, such as a slot machine, table game, any other gaming device, or a peripheral management device as described in Ser. No. 12/945,888, filed Nov. 14, 2010, entitled "Peripheral Management Device for Virtual Game Interaction" which is hereby incorporated by reference in its entirety for all purposes. The embedded portable RF transceiver, while mounted inside the gaming device, communicates with any nearby RFID/NFC tags within its communication range. The portable transceiver may be powered by plugging into a typical power outlet. When using a power outlet, communication to the backend servers can be implemented using the power line communication standards such as IEEE 1901, HomePlug AV, ITU-T G.hn, and the like. The portable transceiver may also operate on battery to improve its portability, continuity, and redundancy. In one embodiment, the portable transceiver plugs into a power outlet for power and communication, but also uses a battery for back up power so that it can continue to operate even during power interruptions.

When presence of the MGD and/or its associated RFID/NFC tag is detected proximate to or within the reconfigurable and repositionable game zone, the MGD may be permitted to play games of chance. MGDs may be any portable electronic device configured to play games of chance, such as a mobile telephone, portable media player, personal digital assistant, tablet, net book, or any other similar portable electronic device.

When located outside the reconfigurable and repositionable game zone and undetected by the portable transceivers, the MGD may not be permitted to play games of chance. In one embodiment, if the MGD was previously authorized to play games of chance and the user stepped away from the reconfigurable and repositionable game zone (e.g. to go to the bathroom, play at a table game, play a slot machine, or any other reason), an indication that location must be reestablished to continue game of chance play may be displayed on a display of the MGD.

In another embodiment, the MGD may be permitted to continue play of the games of chance if the MGD was previously authorized to play games of chance and is already or still wirelessly interacting with a gaming server. In another embodiment, a non-monetary wager notification may be transmitted to the MGD. The player may then be given the option to play games of chance using non-monetary wagers, such as points (e.g. loyalty points, player tracking points, and the like).

The MGD may be detected based on a zone specific location. In other words, the MGD is considered proximate to or within the reconfigurable and repositionable game zone as long as at least one of the portable transceivers detects the MGD and/or its associated RFID tag. Thus, use of global positioning system, RF fingerprinting, RF triangulation, or any other complicated location detection methods is not necessary to detect presence the MGD proximate to or within the reconfigurable and repositionable game zone. As such, this method of detection is more cost efficient and simpler than traditional location systems.

The portable transceivers may be configured to receive data from the MGD. The portable transceivers may receive data from the MGD via any known method. In one embodiment, the MGDs may have a passive or active tag (e.g. RFID tag, NFC tag) that may be read or detected by the portable transceivers. In another embodiment, the portable transceiver may actively receive data from the MGD using any wireless method such as WiFi, Bluetooth, radio frequency, or any other communication methods. In another embodiment, the portable transceiver may also communicate with the MGD via any wired methods as well.

The MGD data may be transmitted to the establishment server via a network to determine whether the MGD is authenticated at 404. MGD data may include data such as the MGD identification, player information, digital signature of the application software, battery level, the MGD's relative proximity (within communication range) to a trusted and known portable RF transceiver, and any other desired information. An establishment server may use the MGD data to authenticate the player and/or the MGD. In one embodiment, a determination of whether the MGD identification is associated with the player may be made to determine authentication of the device. In another embodiment, a determination of whether the MGD is associated with the player information may be made to authenticate the MGD. In still another embodiment, the establishment server may request that the player input authentication information such as a user name, password, or any other authentication information such as biometric inputs (i.e., voice, facial recognition, retinal imprint, fingerprint, and the like).

If the player and/or MGD is not authenticated at 404, the method 400 can end. However, if the player and/or MGD and/or its associated RFID/NFC tag is authenticated at 404, the establishment server may determine whether the MGD is permitted to play games of chance at 406. The establishment server may determine whether the player created a mobile game account, has sufficient funds to play the games of chance, authorized to make a monetary wager, the proper application program is operating on the MGD, or any other game establishment desired determination is satisfied.

If the MGD is not permitted to play games of chance at 406, the method 400 may end. If the MGD is permitted to play games of chance at 406, a determination of whether a game of chance selected is received may be made at 408. The player may select a game of chance and wager amount to be played, which may be transmitted to the establishment server. For example, the player may select to play any slot machine game, table card game, roulette, keno, bingo, or any other games of chance. The player may also select a wager amount to bet. In one embodiment, the wager amount is a monetary wager amount. In another embodiment, the wager amount is a non-monetary amount (e.g. loyalty points, virtual currencies, player tracking points, and the like). In still another embodiment, the player may be given the option to convert a non-monetary wager (e.g. loyalty points, player tracking points, and the like) to a monetary wager. For example, 500 loyalty points may be converted to $50.00 that the player may use the play the games of chance.

Once a wager amount is received, the selected game data may be transmitted to the MGD at 412 to allow the player to play the game of chance.

If no game of chance selection is received at 408, a determination of whether presence of the MGD and/or its associated RFID/NFC tag is detected within the reconfigurable and repositionable game zone at 410. The portable transceivers in the reconfigurable and repositionable game zone may periodically determine whether presence of the MGD and/or its associated RFID/NFC tag is still detected proximate to or within the reconfigurable and repositionable game zone. The portable transceiver may make the determination at predetermined time intervals such as between about one second to 60 seconds, between about 2 seconds to 100 seconds, or any other predetermined desired time interval. If at least one portable transceiver continues to detect the MGD proximate to or within the reconfigurable and repositionable game zone at 410, the method 400 may repeat at 408. However, if presence of the MGD and/or its associated RFID/NFC tag is not re-detected proximate to or within the reconfigurable and repositionable game zone, in one embodiment, a non-detect notification may be transmitted to the establishment server and the MGD may no longer be permitted or is therefore disallowed to play games of chance and the method 400 ends. In another embodiment, a conversion notification may be transmitted to the MGD. The conversion notification may request whether the player would like to continue play of the games of chance using non-monetary wagers, such as points (e.g. player tracking points).

Once game data is transmitted to the MGD at 412, a determination of whether presence of the MGD and/or its associated RFID/NFC tag is detected at 414. The portable transceivers in the reconfigurable and repositionable game zone may periodically determine whether presence of the MGD and/or its associated RFID/NFC tag is still detected proximate to or within the reconfigurable and repositionable game zone. The portable transceiver may make the determination at predetermined time intervals such as between about one second to 60 seconds, between about 2 seconds to 100 seconds, or any other predetermined desired time interval. If at least one portable transceiver continues to detect the MGD proximate to or within the reconfigurable and repositionable game zone at 414, the establishment server may continue to transmit game data to the MGD at 412 to allow games of chance to be played. However, if presence of the MGD and/or its associated RFID/NFC tag is not re-detected proximate to or within the reconfigurable and repositionable game zone, the game play data may be saved at 416. The game play data may also be saved periodically at predetermined time intervals while the player is playing the game of chance, such as between about 10 seconds to 60 seconds, or at any other desired predetermined time interval. The establishment server or the MGD may save the game play data. In one embodiment, the establishment server may also transmit a notification on a display of the MGD that location of the MGD must be reestablished at a reconfigurable and repositionable game zone to continue playing the game of chance. In another embodiment, a conversion notification may be transmitted and presented on a display of the MGD. The conversion notification may request whether the player would like to continue play of the games of chance using non-monetary wagers, such as points (e.g. player tracking points).

Figure 5:
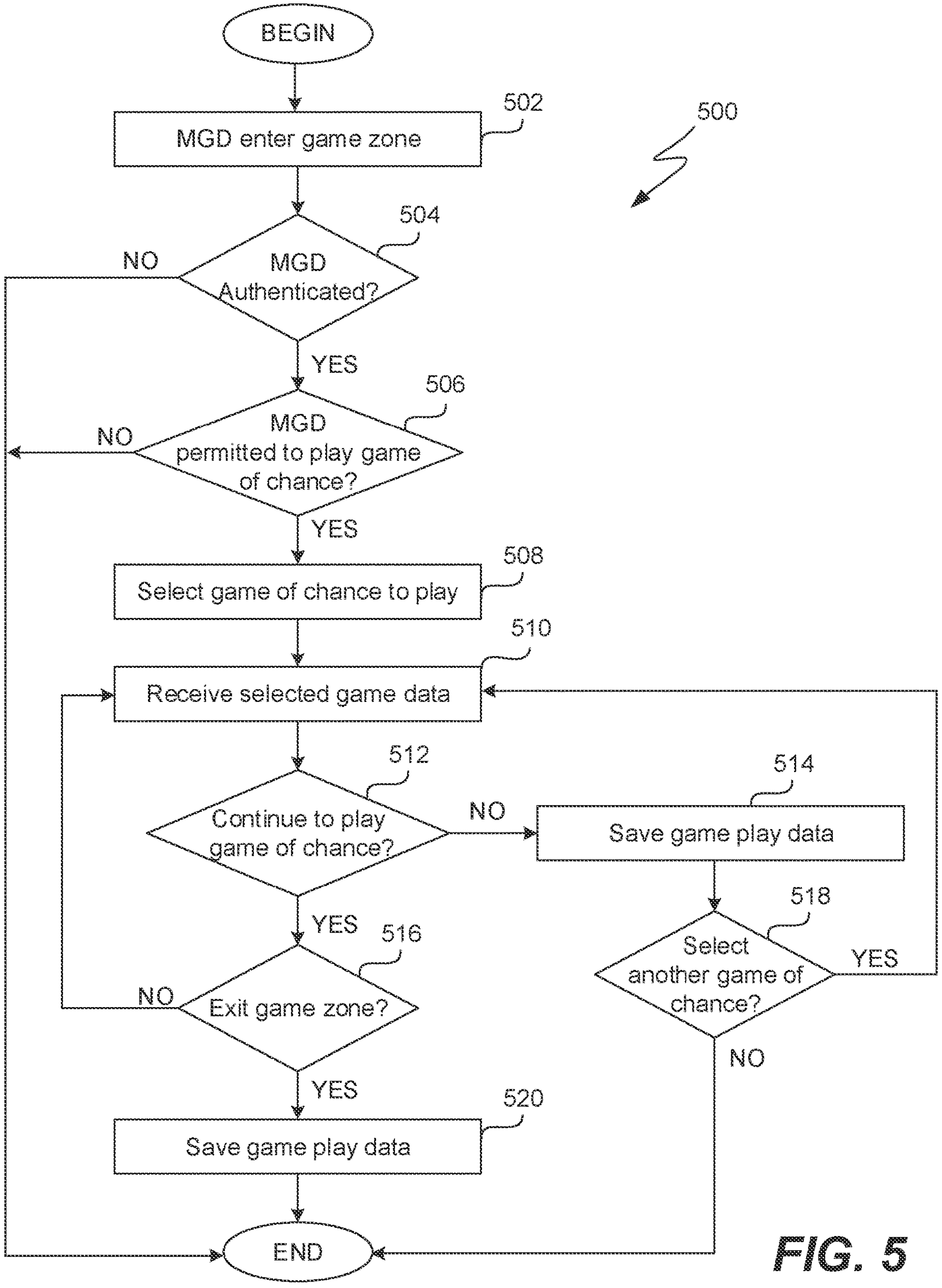
FIG. 5 illustrates a flow diagram of another exemplary method for facilitating game of chance play on a mobile gaming device.

FIG. 5 illustrates a flow diagram of another exemplary method for facilitating game of chance play on a mobile gaming device. The method 500 begins with a MGD and/or its associated RFID/NFC tag entering a reconfigurable and repositionable game zone at 502. The MGD may be any portable electronic device configured to play games of chance, such as a mobile telephone, portable media player, personal digital assistant, tablet, net book, or any other similar portable electronic device. The reconfigurable and repositionable game zone may be located or positioned proximate a gaming establishment, such as a casino, supermarket, bar, cruise ship, airplane, or any other establishment where games of chance may be played. The reconfigurable and repositionable game zone may have at least one portable transceiver configured to detect presence of the MGD and/or its associated RFID/NFC tag once it is proximate to or enters the reconfigurable and repositionable game zone. The portable transceiver may also be designed to receive and transmit data. The portable transceiver may be, for example a free standing antenna, kiosk, or any other device configured to receive and transmit data. In one implementation, the portable transceiver wirelessly communicates with an RFID tag or an NFC tag that's in a player's pocket, purse, or in any other location on the player, or attached to the player's MGD. In another embodiment, the portable transceiver may be positioned within a gaming device, such as a slot machine, table game, any other gaming device, or a peripheral management device as described in Ser. No. 12/945,888, filed Nov. 14, 2010, entitled "Peripheral Management Device for Virtual Game Interaction" which is hereby incorporated by reference in its entirety for all purposes. The embedded portable RF transceiver, while mounted inside the gaming device, communicates with any nearby RFID/NFC tags within its communication range. The portable transceiver may be powered by plugging into a typical power outlet. When using a power outlet, communication to the backend servers can be implemented using the power line communication standards such as IEEE 1901, HomePlug AV, ITU-T G.hn, and the like. The portable transceiver may also operate on battery to improve its portability, continuity, and redundancy. In one embodiment, the portable transceiver plugs into a power outlet for power and communication, but also uses a battery for back up power so that it can continue to operate even during power interruptions.

When the MGD and/or its associated RFID/NFC tag enters the reconfigurable and repositionable game zone and it presence is detected by at least one portable transceiver, a determination of whether the MGD is authenticated is made at 504. The MGD may be detected based on a zone specific location. In other words, the MGD is considered proximate to or within the reconfigurable and repositionable game zone as long as at least one of the portable transceivers detects the MGD and/or its associated RFID/NFC tag. Thus, use of global positioning system, RF fingerprinting, RF triangulation, or any other complicated location detection methods is not necessary to detect presence the MGD proximate to or within the reconfigurable and repositionable game zone. As such, this method of detection is more cost efficient and simpler than traditional location systems. Once detected and verified, the player is automatically logged into the portable gaming zone and allowed to perform sensitive activities (e.g., real money gaming, funds transfers, and the like). All these registration of the player, authenticating the MGD and its software, the verifications of ID's and location, are performed automatically when the player enters the mobile gaming zone. From the player's perspective, she walks into the gaming zone, and she can start playing. The complexity of the gaming registration and verification are completely hidden from the player as they are performed in the background.

The portable transceivers may be configured to receive data from the MGD. The portable transceivers may receive data from the MGD via any known method. The portable transceivers may receive data from the MGD via any known method. In one embodiment, the MGDs may have a passive or active tag (e.g. RFID tag, NFC tag) that may be read or detected by the portable transceivers. In another embodiment, the portable transceiver may actively receive data from the MGD using any wireless method such as WiFi, Bluetooth, radio frequency, or any other communication methods. In another embodiment, the portable transceiver may also communicate with the MGD via any wired methods as well.

The MGD data may be transmitted to an establishment server via a network to determine whether the MGD is authenticated at 504. MGD data may include data such as the MGD identification, player information, digital signature of the application software, battery level, the MGD's relative proximity (within communication range) to a trusted and known portable RF transceiver, and any other desired information. An establishment server may use the MGD data to authenticate the player and/or the MGD. In one embodiment, a determination of whether the MGD identification is associated with the player may be made to determine authentication of the device. In another embodiment, a determination of whether the MGD is associated with the player information may be made to authenticate the MGD. In still another embodiment, the establishment server may request that the player input authentication information such as a user name, password, or any other authentication information such as biometric inputs (i.e., voice, facial recognition, retinal imprint, fingerprint, and the like).

If the player and/or MGD and/or its associated RFID/NFC tag is not authenticated at 504, the method 500 can end. However, if the player and/or MGD and/or its associated RFID/NFC tag is authenticated at 504, the establishment server may determine whether the MGD is permitted to play games of chance at 506. The establishment server may determine whether the player created a mobile game account, has sufficient funds to play the games of chance, authorized to make a monetary wager to play the games of chance, the proper application program is operating on the MGD, or any other game establishment desired determination is satisfied.

If the MGD is not permitted to play games of chance at 506, the method 500 may end. If the MGD is permitted to play games of chance at 506, the user may select a game of chance to play at 508. The player may select a game of chance and wager amount to be played, which may be transmitted to the establishment server. For example, the player may select to play any slot machine game, table card game, roulette, keno, bingo, or any other games of chance. The player may also select a wager amount to bet. In one embodiment, the wager amount is a monetary wager amount. In another embodiment, the wager amount is a non-monetary amount (e.g. loyalty points, player tracking points, and the like). In still another embodiment, the player may be given the option to covert a non-monetary wager (e.g. loyalty points, player tracking points, and the like) to a monetary wager. For example, 500 loyalty points may be converted to $50.00 that the player may use the play the games of chance.

Once the wager amount is received, the selected game data may be transmitted from the establishment server and received by the MGD at 510 to allow the player to play the selected game of chance.

A determination may be made whether to continue playing the game of chance at 512. The player may decide to select another game of chance to play, not play anymore and cash out, or continue to play the game of chance. If the player decides to continue to play the game of chance at 512, a determination of whether the MGD has exited the reconfigurable and repositionable game zone may be made at 516. The portable transceivers in the reconfigurable and repositionable game zone may periodically determine whether presence of the MGD and/or its associated RFID/NFC tag is still detected proximate to or within the reconfigurable and repositionable game zone. The portable transceiver may make the determination at predetermined time intervals such as between about one second to 60 seconds, between about 2 seconds to 100 seconds, or any other predetermined desired time interval. If at least one portable transceiver continues to detect presence of the MGD and/or its associated RFID/NFC tag proximate to or within the reconfigurable and repositionable game zone at 516, the method 500 may repeat at 510. However, if presence of the MGD and/or its associated RFID/NFC tag is not re-detected proximate to or within the reconfigurable and repositionable game zone, a non-detect notification may be transmitted to the establishment server and the MGD may no longer be permitted or is therefore disallowed to play games of chance using monetary wager amounts. The game play data may be saved at 520. The game play data may also be saved periodically at predetermined time intervals while the player is playing the game of chance, such as between about 10 seconds to 60 seconds, or at any other desired predetermined time interval. The game play data may be saved at the establishment server and/or the MGD.

If the player decides to not continue playing the game of chance at 512, the game play data may be saved at 514. The game play data may also be saved periodically at predetermined time intervals while the player is playing the game of chance, such as between about 10 seconds to 60 seconds, or at any other desired predetermined time interval. Once saved, a determination may be made as to whether the player selected another game of chance to play at 518. If the player selected another game of chance to play at 518, the method 500 may repeat at 510. If the player did not select another game of chance to play at 518, the method 500 may end. The game play data may be saved at the establishment server and/or the MGD.

Once located outside the reconfigurable and repositionable game zone and its presence is undetectable by the portable transceivers, the MGD may not be permitted to play games of chance. In one embodiment, if the MGD was previously authorized to play games of chance and the user stepped away from the reconfigurable and repositionable game zone (e.g. to go to the bathroom, play at a table game, play a slot machine, or any other reason), an indication that location must be reestablished at the reconfigurable and repositionable game zone to continue game of chance play may be displayed on a display of the MGD.

In another embodiment, the MGD may be permitted to play games of chance if the MGD was previously authorized to play games of chance and is already or still wirelessly interacting with a gaming server. In still another embodiment, a non-monetary wager notification may be transmitted to the MGD. The player may then be given the option to play games of chance using non-monetary wagers, such as points (e.g. loyalty points, player tracking points, and the like).

Figure 6A:
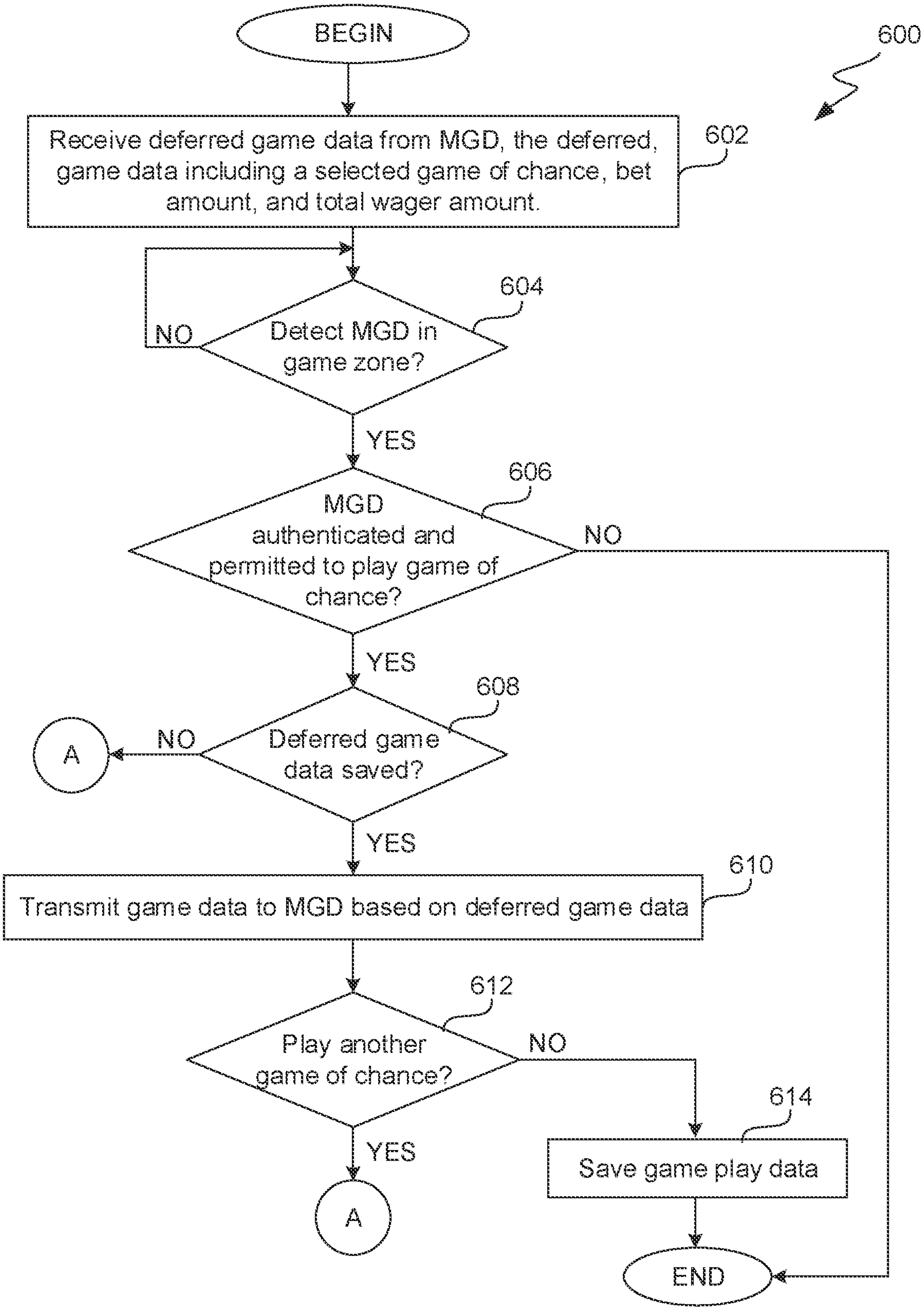
FIGS. 6A and 6B illustrate a flow diagram of yet another exemplary method for facilitating playing games of chance on a mobile gaming device.
Figure 6B:
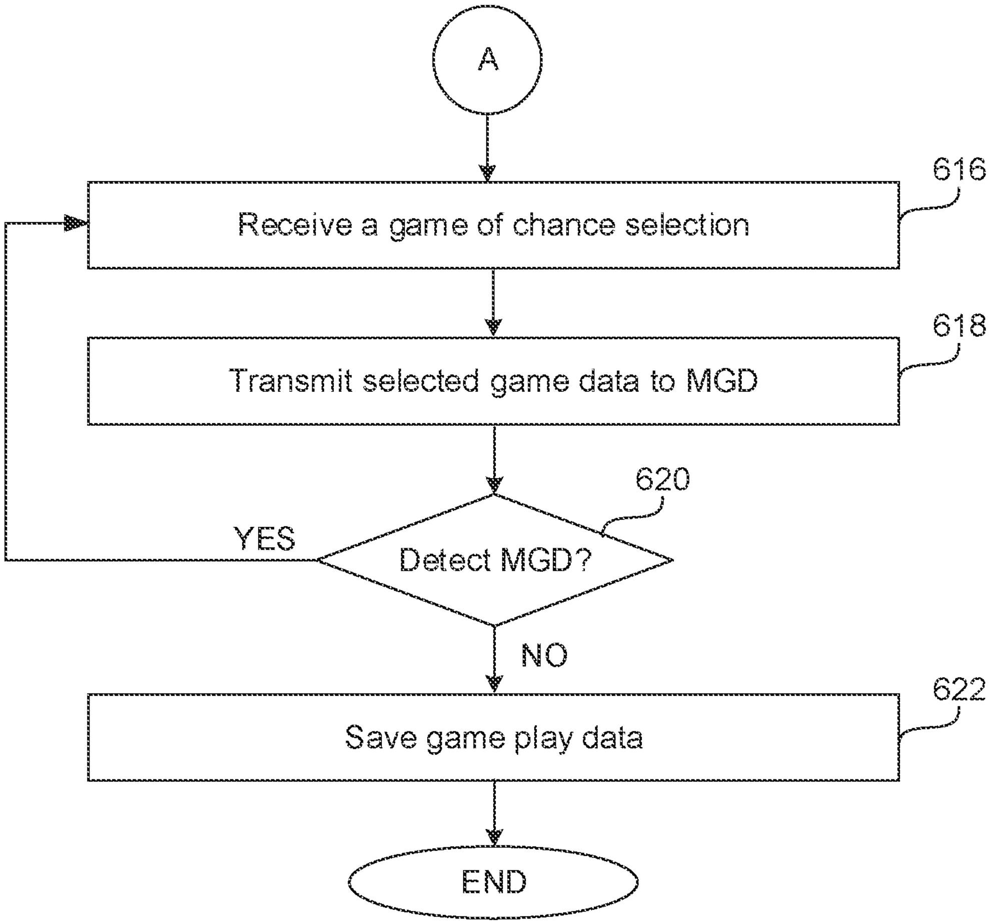

FIGS. 6A and 6B illustrate a flow diagram of yet another exemplary method for facilitating games of chance play on a mobile gaming device. The method 600 begins with receiving deferred game data from an MGD, the deferred game data may include at least a selected game of chance, a bet amount, a total wager amount, and any other desired information to automatically play a game of chance without user interaction. A determination of whether presence of an MGD and/or its associated RFID/NFC tag is detected in the reconfigurable and repositionable game zone is made at 604. The reconfigurable and repositionable game zone may be located or positioned proximate a gaming establishment, such as a casino, supermarket, bar, cruise ship, airplane, or any other establishment where games of chance may be played. The reconfigurable and repositionable game zone may have at least one portable transceiver configured to detect MGDs proximate to or within the reconfigurable and repositionable game zone. The portable transceiver may also be designed to receive and transmit data. The portable transceiver may be, for example, a free standing antenna, kiosk, or any other device configured to receive and transmit data. In one implementation, the portable transceiver wirelessly communicates with an RFID tag or an NFC tag that's in a player's pocket, purse, or in any other location on the player, or attached to the player's MGD. In another embodiment, the portable transceiver may be positioned within a gaming device, such as a slot machine, table game, any other gaming device, or a peripheral management device as described in Ser. No. 12/945,888, filed Nov. 14, 2010, entitled "Peripheral Management Device for Virtual Game Interaction" which is hereby incorporated by reference in its entirety for all purposes.

When the MGD is detected proximate to or within the reconfigurable and repositionable game zone, the MGD may be permitted to play games of chance using monetary wager amounts. MGDs may be any portable electronic device configured to play games of chance, such as a mobile telephone, portable media player, personal digital assistant, tablet, net book, or any other similar portable electronic device.

When located outside the reconfigurable and repositionable game zone and undetectable by the portable transceivers, the MGD may not be permitted to play games of chance using monetary wager amounts. In one embodiment, if the MGD was previously authorized to play games of chance and the user stepped away from the reconfigurable and repositionable game zone (e.g. to go to the bathroom, play at a table game, play a slot machine, or any other reason), an indication that location must be reestablished to continue game of chance play may be displayed on a display of the MGD.

In another embodiment, the MGD may be permitted to play games of chance if the MGD was previously authorized to play games of chance and is already or still wirelessly interacting with a gaming server. In yet another embodiment, a conversion notification may be transmitted to the MGD. The conversion notification may request whether the player would like to continue play of the games of chance using non-monetary wagers, such as points (e.g. player tracking points).

Presence of the MGD and/or its associated RFID/NFC tag may be detected based on a zone specific location. In other words, the MGD is considered proximate to or within the reconfigurable and repositionable game zone as long as at least one of the portable transceivers detects the MGD. Thus, use of global positioning system, RF fingerprinting, RF triangulation, or any other complicated location detection methods is not necessary to detect presence the MGD proximate to or within the reconfigurable and repositionable game zone. As such, this method of detection is more cost efficient and simpler than traditional location systems.

The portable transceivers may be configured to receive data from the MGD. The portable transceivers may receive data from the MGD via any known method. The portable transceivers may receive data from the MGD via any known method. In one embodiment, the MGDs may have a passive or active tag (e.g. RFID tag, NFC tag) that may be read or detected by the portable transceivers. In another embodiment, the portable transceiver may actively receive data from the MGD using any wireless method such as WiFi, Bluetooth, radio frequency, or any other communication methods. In another embodiment, the portable transceiver may also communicate with the MGD via any wired methods as well.

The MGD data may be transmitted to the establishment server via a network to determine whether the MGD and/or its associated RFID/NFC tag is authenticated and permitted to play games of chance at 606. MGD data may include data such as the MGD identification, player information, digital signature of the application software, battery level, the MGD's relative proximity (within communication range) to a trusted and known portable RF transceiver, and any other desired information. An establishment server may use the MGD data and/or its associated RFID/NFC tag data to authenticate the player and/or the MGD. In one embodiment, a determination of whether the MGD identification is associated with the player may be made to determine authentication of the device. In another embodiment, a determination of whether the MGD is associated with the player information may be made to authenticate the MGD and/or its associated RFID/NFC tag. In still another embodiment, the establishment server may request that the player input authentication information such as a user name, password, or any other authentication information such as biometric inputs (i.e., voice, facial recognition, retinal imprint, fingerprint, and the like).

If the player and/or MGD and/or its associated RFID/NFC tag is authenticated, the establishment server may determine whether the MGD is permitted to play games of chance. The establishment server may determine whether the player created a mobile game account, has sufficient funds to play the games of chance, authorized to make monetary wager amounts, the proper application program is operating on the MGD, or any other game establishment desired determination is satisfied.

If the MGD and/or its associated RFID/NFC tag is not authenticated or permitted to play games of chance at 606, the method 600 may end. If the MGD is authenticated and permitted to play games of chance at 606, a determination of whether deferred game data was saved is made at 608. The deferred game data may be saved in the player tracking account server or any other desired location. If it is determined that deferred game data was saved at 608, game data may be transmitted to the MGD based on the deferred game data at 610. For example, deferred game data may be to play a game of 777 with a bet amount of $0.25 each play and a total wager amount of $20. Thus, game data for 777 having a bet amount of $0.25 will be played until the total wager amount of $20 is played. This allows the user to automatically play the game of chance of 777 without user interaction.

Once automatic play of the game of chance is completed, a determination of whether the player would like to play another game of chance is made at 612. If no game selection is received at 612 within a predetermined period of time (i.e. after one minute, or any other predetermined time period), the game play data may be saved at 614 and the method 600 may end.

If it is determined that no deferred game data was saved at 608 or if it is determined that the user desires to play another game of chance at 612, a game of chance selection may be received at 616 as illustrated in FIG. 6B. The player may select a game of chance and wager amount to be played, which may be transmitted to the establishment server. For example, the player may select to play any slot machine game, table card game, roulette, keno, bingo, or any other games of chance. The player may also select a wager amount to bet. In one embodiment, the wager amount is a monetary wager amount. In another embodiment, the wager amount is a non-monetary amount (e.g. loyalty points, player tracking points, and the like). In still another embodiment, the player may be given the option to covert a non-monetary wager (e.g. loyalty points, player tracking points, virtual currencies, and the like) to a monetary wager. For example, 500 loyalty points may be converted to $50.00 that the player may use the play the games of chance.

Once the wager amount is received, the selected game data may be transmitted to the MGD at 618 to allow the player to play the game of chance.

A determination of whether presence of the MGD and/or its associated RFID/NFC tag is detected within the reconfigurable and repositionable game zone at 620. The portable transceivers in the reconfigurable and repositionable game zone may periodically determine whether presence of the MGD and/or its associated RFID/NFC tag is still detected proximate to or within the reconfigurable and repositionable game zone. The portable transceiver may make the determination at predetermined time intervals such as between about one second to 60 seconds, between about 2 seconds to 100 seconds, or any other predetermined desired time interval. If at least one portable transceiver continues to detect presence of the MGD and/or its associated RFID/NFC tag proximate to or within the reconfigurable and repositionable game zone at 620, the method 600 may repeat at 616. However, if presence of the MGD and/or its associated RFID/NFC tag is not re-detected proximate to or within the reconfigurable and repositionable game zone, a non-detect notification may be transmitted to the establishment server and the MGD may no longer be permitted or is therefore disallowed to play games of chance with monetary wager amounts.

The game play data may be saved at 622. The game play data may also be saved periodically at predetermined time intervals while the player is playing the game of chance, such as between about 10 seconds to 60 seconds, or at any other desired predetermined time interval. The game play data may be saved by the establishment server or the MGD. In one embodiment, the establishment server may also transmit a notification presented on a display of the MGD that location of the MGD must be reestablished at a reconfigurable and repositionable game zone to continue playing the game of chance with monetary wager amounts. In another embodiment, a non-monetary wager notification may be transmitted to the MGD. The player may then be given the option to play games of chance using non-monetary wagers, such as points (e.g. loyalty points, player tracking points, and the like).

Figure 7A:
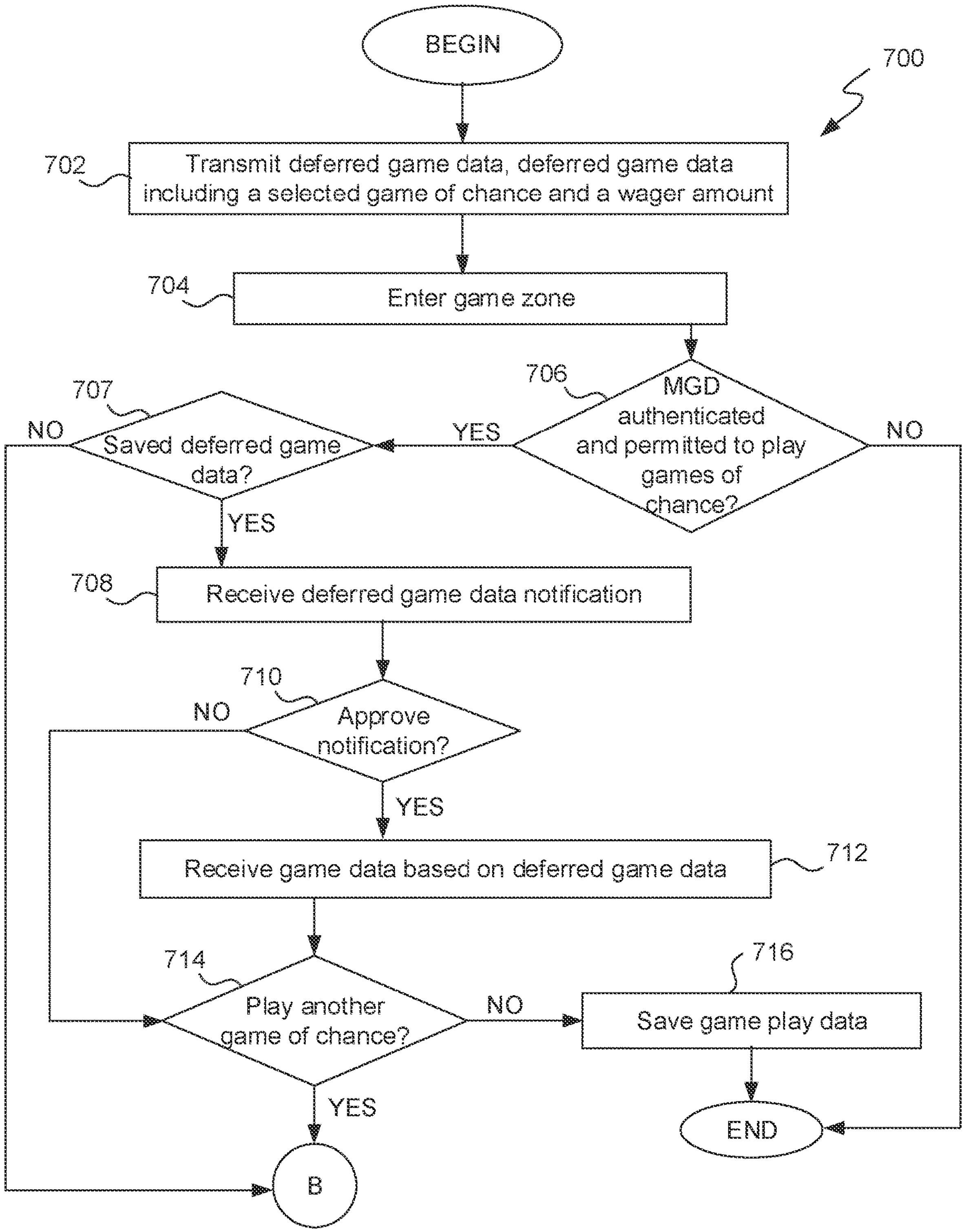
FIGS. 7A and 7B illustrate a flow diagram of still another exemplary method for facilitating playing games of chance on a mobile gaming device.
Figure 7B:
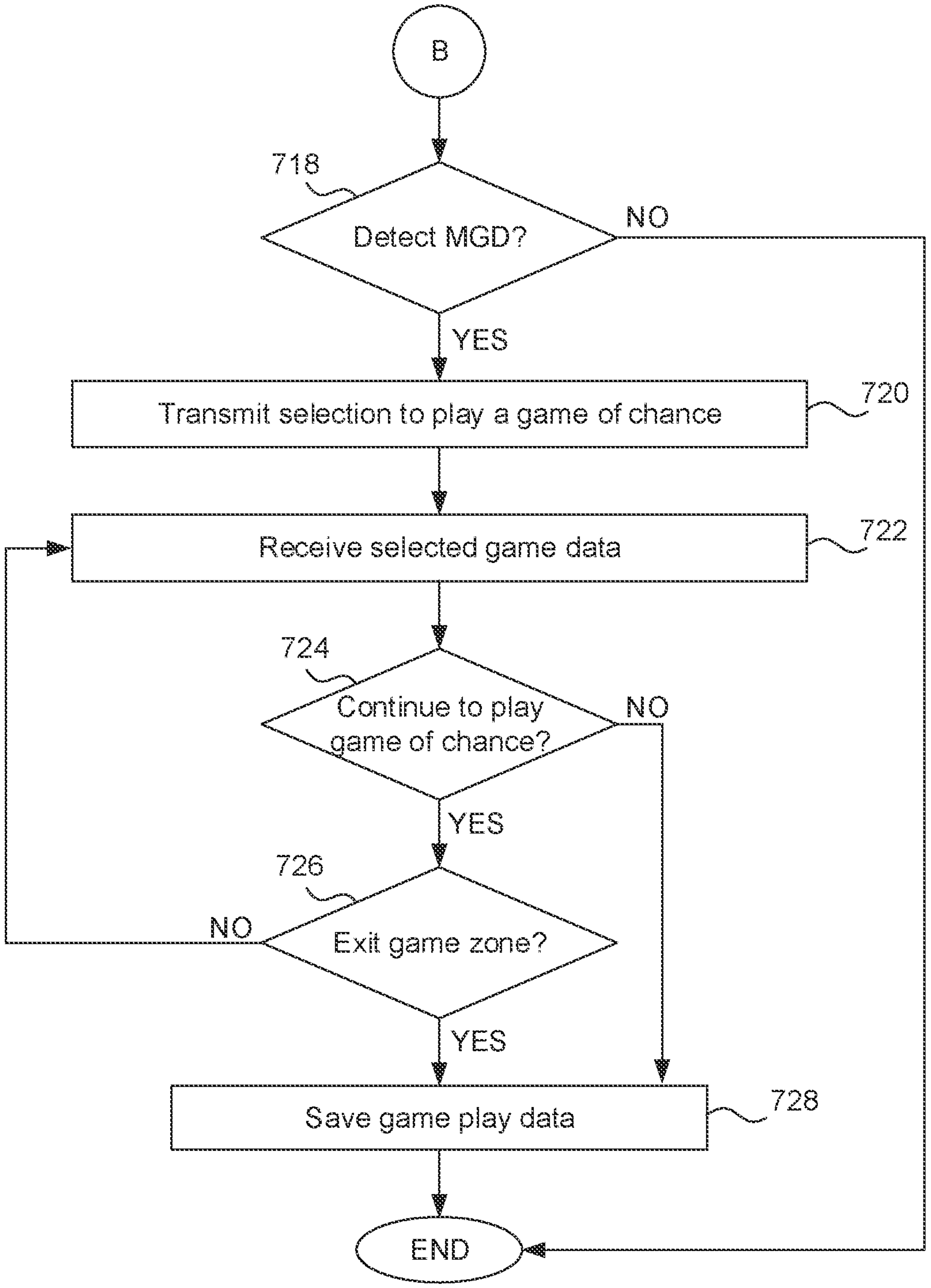

FIGS. 7A and 7B illustrate a flow diagram of still another exemplary method for facilitating playing games of chance on a mobile gaming device. Referring to FIG. 7A, the method 700 begins with transmitting deferred game data to an establishment server at 702. The deferred game data may include at least a selected game of chance, a bet amount, a total wager amount, and any other desired information to automatically play a game of chance without user interaction. The MGD may enter an reconfigurable and repositionable game zone at 704. The MGD may be any portable electronic device configured to play games of chance, such as a mobile telephone, portable media player, personal digital assistant, tablet, net book, or any other similar portable electronic device. The reconfigurable and repositionable game zone may be located or positioned proximate a gaming establishment, such as a casino, supermarket, bar, cruise ship, airplane, or any other establishment where games of chance may be played. The reconfigurable and repositionable game zone may have at least one portable transceiver configured to detect the presence of the MGD and/or its associated RFID/NFC tag once it is proximate to or enters the reconfigurable and repositionable game zone. The portable transceiver may also be designed to receive and transmit data. The portable transceiver may be, for example a free standing antenna, kiosk, or any other device configured to receive and transmit data. In one implementation, the portable transceiver wirelessly communicates with an RFID tag or an NFC tag that's in a player's pocket, purse, or in any other location on the player, or attached to the player's MGD. In another embodiment, the portable transceiver may be positioned within a gaming device, such as a slot machine, table game, any other gaming device, or a peripheral management device as described in Ser. No. 12/945,888, filed Nov. 14, 2010, entitled "Peripheral Management Device for Virtual Game Interaction" which is hereby incorporated by reference in its entirety for all purposes. The embedded portable RF transceiver, while mounted inside the gaming device, communicates with any nearby RFID/NFC tags within its communication range. The portable transceiver may be powered by plugging into a typical power outlet. When using a power outlet, communication to the backend servers can be implemented using the power line communication standards such as IEEE 1901, HomePlug AV, ITU-T G.hn, and the like. The portable transceiver may also operate on battery to improve its portability, continuity, and redundancy. In one embodiment, the portable transceiver plugs into a power outlet for power and communication, but also uses a battery for back up power so that it can continue to operate even during power interruptions.

When the MGD enters the reconfigurable and repositionable game zone and its presence is detected by at least one portable transceiver, a determination of whether the MGD is authenticated is made at 706. The MGD may be detected based on a zone specific location. In other words, the MGD is considered proximate to or within the reconfigurable and repositionable game zone as long as at least one of the portable transceivers detects the MGD. Thus, use of global positioning system, RF fingerprinting, RF triangulation, or any other complicated location detection methods is not necessary to detect presence the MGD proximate to or within the reconfigurable and repositionable game zone. As such, this method of detection is more cost efficient and simpler than traditional location systems.

The portable transceivers may be configured to receive data from the MGD. The portable transceivers may receive data from the MGD via any known method. The portable transceivers may receive data from the MGD via any known method. In one embodiment, the MGDs may have a passive or active tag (e.g. RFID tag, NFC tag) that may be read or detected by the portable transceivers. In another embodiment, the portable transceiver may actively receive data from the MGD using any wireless method such as WiFi, Bluetooth, radio frequency, or any other communication methods. In another embodiment, the portable transceiver may also communicate with the MGD via any wired methods as well.

The MGD data may be transmitted to an establishment server via a network to determine whether the MGD is authenticated and permitted to play games of chance at 706. MGD data may include data such as the MGD identification, player information, digital signature of the application software, battery level, the MGD's relative proximity (within communication range) to a trusted and known portable RF transceiver, and any other desired information. An establishment server may use the MGD data to authenticate the player and/or the MGD. In one embodiment, a determination of whether the MGD identification is associated with the player may be made to determine authentication of the device. In another embodiment, a determination of whether the MGD is associated with the player information may be made to authenticate the MGD. In still another embodiment, the establishment server may request that the player input authentication information such as a user name, password, or any other authentication information such as biometric inputs (i.e., voice, facial recognition, retinal imprint, fingerprint, and the like).

If the MGD is authenticated a determination of whether the MGD is permitted to play games of chance is made. The determination may be made by determining if the player has sufficient funds to play the games of chance, authorized to make monetary wager amounts, the proper application program is operating on the MGD, or any other game establishment desired determination is satisfied to play games of chance on the MGD.

If the MGD is authenticated and permitted to play games of chance, a determination as to whether there is any saved deferred game data is made at 707. If there is saved deferred game data at 707, the MGD may receive a deferred game data notification at 708. The notification may inquire as to whether the player would like to begin playing the game of chance using the deferred game data. The notification may include a "No" and "Yes" indicator or any other indicator to determine whether the player would like to start automatic play of the game of chance based on the saved deferred game data. If the notification is approved at 710, the MGD may receive game data based on the saved deferred game data at 712.

Once automatic play of the game of chance is completed, a determination of whether the player would like to play another game of chance is made at 714. If no game selection is received at 714 within a predetermined period of time (i.e. after one minute, or any other predetermined time period), the game play data may be saved at 716 and the method 700 may end.

If it is determined that the player would like to play another game of chance at 714 or if there was no saved deferred game data at 707, a determination of whether the MGD is detected within the reconfigurable and repositionable game zone at 718 as illustrated in FIG. 7B. The portable transceivers in the reconfigurable and repositionable game zone may periodically determine whether presence of the MGD and/or its associated RFID/NFC tag is still detected proximate to or within the reconfigurable and repositionable game zone. The portable transceiver may make the determination at predetermined time intervals such as between about one second to 60 seconds, between about 2 seconds to 100 seconds, or any other predetermined desired time interval. If at least one portable transceiver continues to detect presence of the MGD and/or its associated RFID/NFC tag proximate to or within the reconfigurable and repositionable game zone at 718, the selected game of chance data may transmitted at 720 to the establishment server. The MGD may then receive the selected game of chance data at 722 to allow the player to play the selected game of chance using the MGD.

A determination of whether to continue play of the game of chance may be made at 724. If the game of chance ends and no player input is detected within a predetermined period of time (i.e. within between about five seconds to 2 minutes, or any other desired predetermined period of time), the player cashes out, the player has no more funds to play the games of chance, or the MGD is no longer detected within the reconfigurable and repositionable game zone, it may be determined that the player does not want to continue game play at 724. The game play data may be saved at 728. The game play data may also be saved periodically at predetermined time intervals while the player is playing the game of chance, such as between about 10 seconds to 60 seconds, or at any other desired predetermined time interval. The game play data may be saved by the establishment server or the MGD.

If it is determined that the player would like to continue playing games of chance at 724, the establishment server may receive an input from the player to continue play of the same game of chance or a different game of chance. A determination of whether the MGD exited the reconfigurable and repositionable game zone may be made at 726. If presence of the MGD and/or its associated RFID/NFC tag is detected in the reconfigurable and repositionable game zone at 726, the method 700 may repeat at 722. However, if presence of the MGD and/or its associated RFID/NFC tag is not re-detected proximate to or within the reconfigurable and repositionable game zone, a non-detect notification may be transmitted to the establishment server and the MGD may no longer be permitted or is therefore disallowed to play games of chance using monetary wager amounts.

The game play data may be saved at 728. The game play data may also be saved periodically at predetermined time intervals while the player is playing the game of chance, such as between about 10 seconds to 60 seconds, or at any other desired predetermined time interval. The game play data may be saved by the establishment server or the MGD. In one embodiment, the establishment server may also transmit a notification on a display of the MGD that location of the MGD must be reestablished at a reconfigurable and repositionable game zone to continue playing the game of chance using monetary wager amounts. In another embodiment, a non-monetary wager notification may be transmitted to the MGD. The player may then be given the option to play games of chance using non-monetary wagers, such as points (e.g. loyalty points, player tracking points, and the like).

Figure 8A:
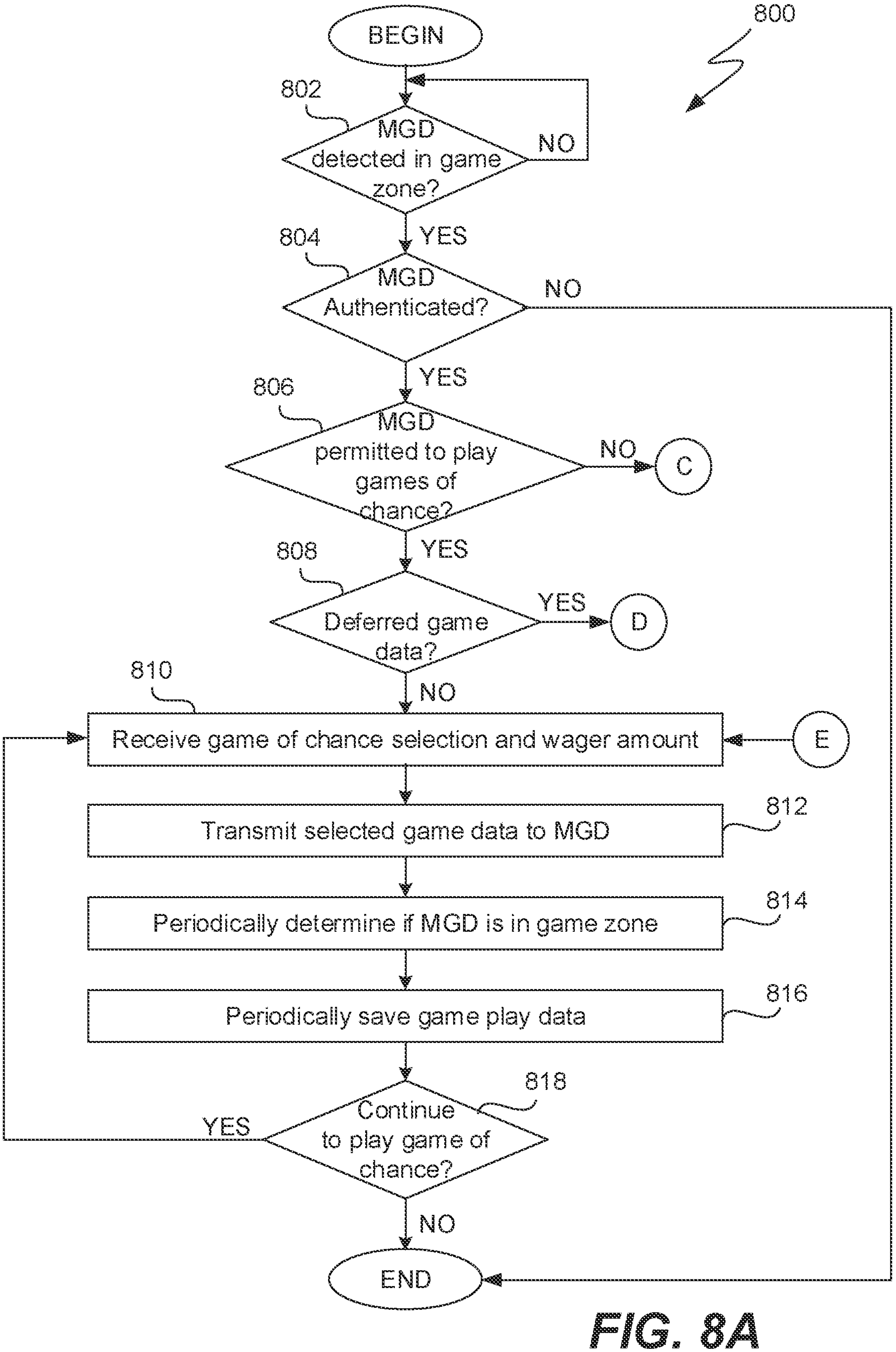
FIG. 8A-8C illustrate a flow diagram of another exemplary method for facilitating playing games of chance on a mobile gaming device.
Figure 8B:
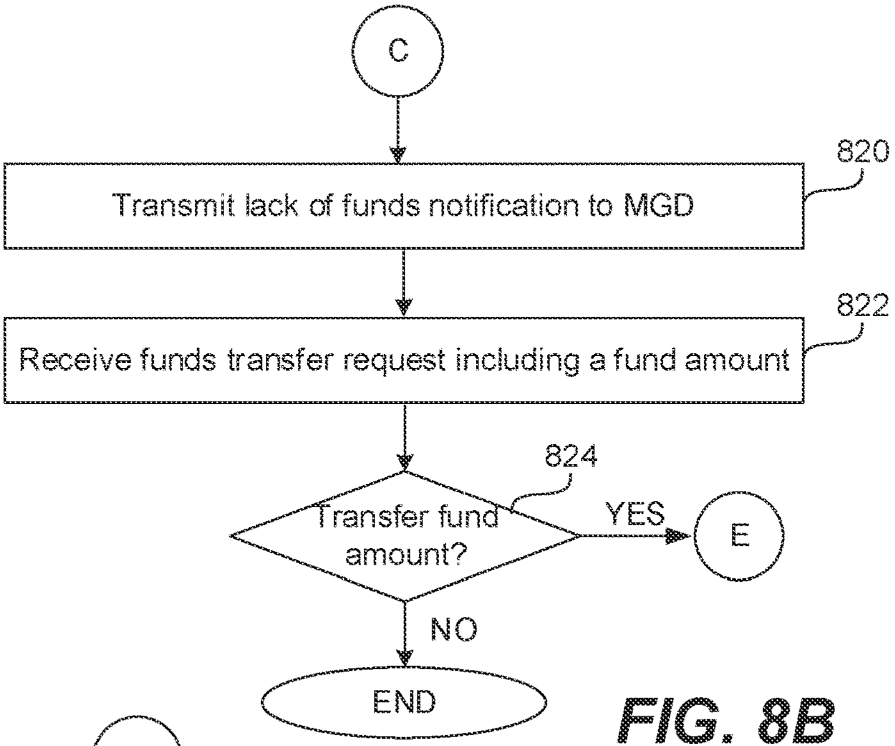
Figure 8C:
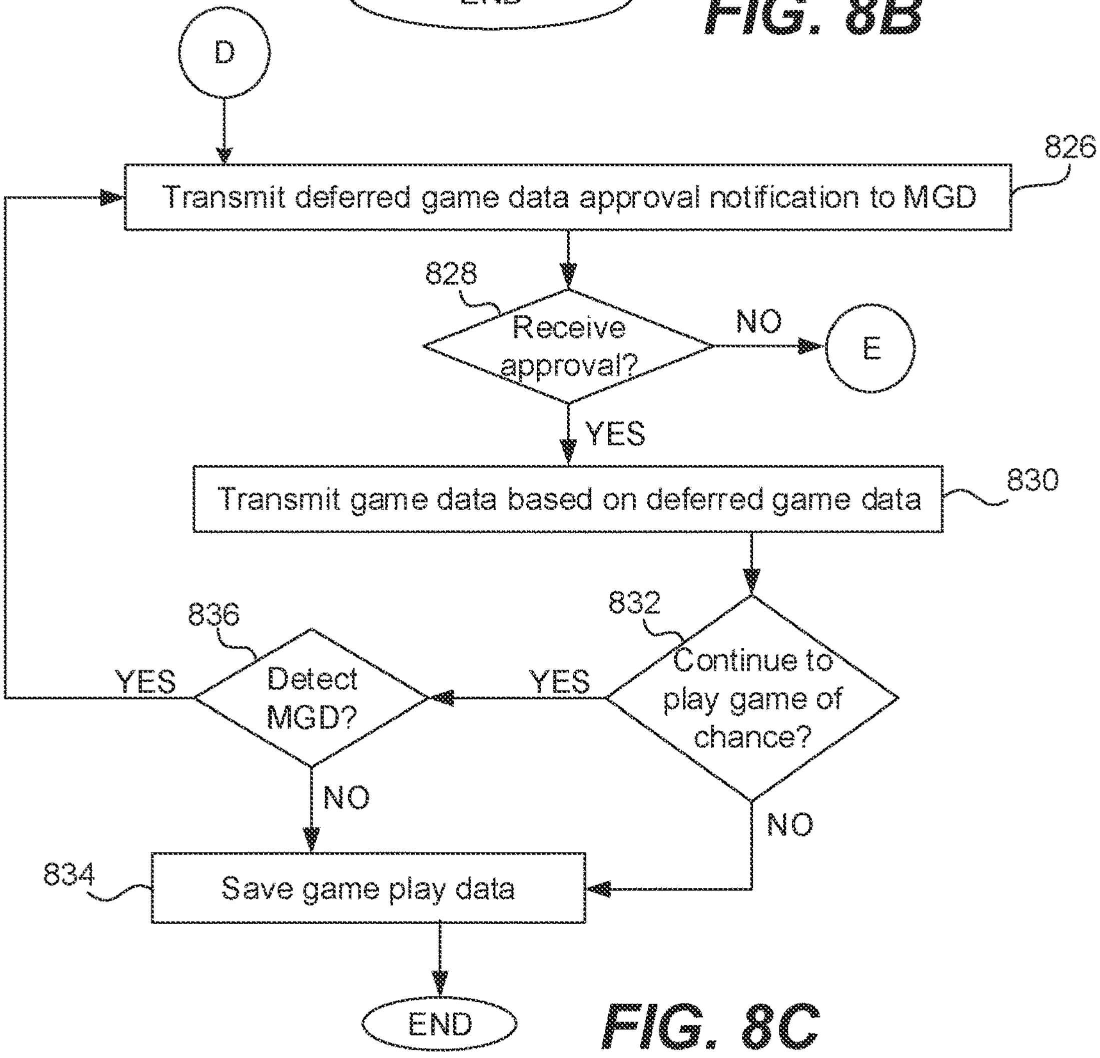

FIG. 8A-8C illustrate a flow diagram of another exemplary method for facilitating playing games of chance on a mobile gaming device. The method 800 begins with determining whether presence of an MGD is detected in the reconfigurable and repositionable game zone at 802. The reconfigurable and repositionable game zone may be located or positioned proximate a gaming establishment, such as a casino, supermarket, bar, cruise ship, airplane, or any other establishment where games of chance may be played. The reconfigurable and repositionable game zone may have at least one portable transceiver configured to detect presence of MGDs proximate to or within the reconfigurable and repositionable game zone. The portable transceiver may also be designed to receive and transmit data. The portable transceiver may be, for example a free standing antenna, kiosk, or any other device configured to receive and transmit data. In one implementation, the portable transceiver wirelessly communicates with an RFID tag or an NFC tag that's in a player's pocket, purse, or in any other location on the player, or attached to the player's MGD. In another embodiment, the portable transceiver may be positioned within a gaming device, such as a slot machine, table game, any other gaming device, or a peripheral management device as described in Ser. No. 12/945,888, filed Nov. 14, 2010, entitled "Peripheral Management Device for Virtual Game Interaction" which is hereby incorporated by reference in its entirety for all purposes. The embedded portable RF transceiver, while mounted inside the gaming device, communicates with any nearby RFID/NFC tags within its communication range. The portable transceiver may be powered by plugging into a typical power outlet. When using a power outlet, communication to the backend servers can be implemented using the power line communication standards such as IEEE 1901, HomePlug AV, ITU-T G.hn, and the like. The portable transceiver may also operate on battery to improve its portability, continuity, and redundancy. In one embodiment, the portable transceiver plugs into a power outlet for power and communication, but also uses a battery for back up power so that it can continue to operate even during power interruptions.

When the MGD is detected proximate to or within the reconfigurable and repositionable game zone, the MGD may be permitted to play games of chance using monetary wager amounts. MGDs may be any portable electronic device configured to play games of chance, such as a mobile telephone, portable media player, personal digital assistant, tablet, net book, or any other similar portable electronic device.

When located outside the reconfigurable and repositionable game zone and undetectable by the portable transceivers, the MGD may not be permitted to play games of chance using monetary wager amounts. In one embodiment, if the MGD was previously authorized to play games of chance and the user stepped away from the reconfigurable and repositionable game zone (e.g. to go to the bathroom, play at a table game, play a slot machine, or any other reason), an indication that location must be reestablished to continue game of chance play may be displayed on a display of the MGD.

In another embodiment, the MGD may be permitted to play games of chance if the MGD was previously authorized to play games of chance and is already or still wirelessly interacting with a gaming server. In yet another embodiment, a non-monetary wager notification may be transmitted to the MGD. The player may then be given the option to play games of chance using non-monetary wagers, such as points (e.g. loyalty points, player tracking points, and the like).

The MGD may be detected based on a zone specific location. In other words, the MGD is considered proximate to or within the reconfigurable and repositionable game zone as long as at least one of the portable transceivers detects the MGD. Thus, use of global positioning system, RF fingerprinting, RF triangulation, or any other complicated location detection methods is not necessary to detect presence the MGD proximate to or within the reconfigurable and repositionable game zone. As such, this method of detection is more cost efficient and simpler than traditional location systems.

The portable transceivers may be configured to receive data from the MGD. The portable transceivers may receive data from the MGD via any known method. The portable transceivers may receive data from the MGD via any known method. In one embodiment, the MGDs may have a passive or active tag (e.g. RFID tag, NFC tag) that may be read or detected by the portable transceivers. In another embodiment, the portable transceiver may actively receive data from the MGD using any wireless method such as WiFi, Bluetooth, radio frequency, or any other communication methods. In another embodiment, the portable transceiver may also communicate with the MGD via any wired methods as well.

The MGD data may be transmitted to the establishment server via a network to determine whether the MGD is authenticated at 804. MGD data may include data such as the MGD identification, player information, digital signature of the application software, battery level, the MGD's relative proximity (within communication range) to a trusted and known portable RF transceiver, and any other desired information. An establishment server may use the MGD data to authenticate the player and/or the MGD and/or its associated RFID/NFC tag. In one embodiment, a determination of whether the MGD identification is associated with the player may be made to determine authentication of the device. In another embodiment, a determination of whether the MGD is associated with the player information may be made to authenticate the MGD. In still another embodiment, the establishment server may request that the player input authentication information such as a user name, password, or any other authentication information such as biometric inputs (i.e., voice, facial recognition, retinal imprint, fingerprint, and the like).

If the player and/or MGD and/or its associated RFID/NFC tag is not authenticated at 804, the method 800 can end. However, if the player and/or MGD is authenticated at 804, the establishment server may determine whether the MGD is permitted to play games of chance at 806. The establishment server may determine whether the player created a mobile game account, has sufficient funds to play the games of chance, authorized to make monetary wager amounts, the proper application program is operating on the MGD, or any other game establishment desired determination is satisfied.

If the MGD is not permitted to play games of chance at 806, a notification as to why the player is not permitted to play the game of chances may be transmitted to the MGD. For example, perhaps the player has insufficient funds in the player account and is thus unable to continue playing the game of chance. Referring now to FIG. 8B, a lack of funds notification may be transmitted to the MGD at 820 to inform the player that he is unable to continue playing the game of chance until additional funds are deposited into the player's account. In one embodiment, the player may be given the option to play with non-monetary wagers (e.g. loyalty points, player tracking points). In another embodiment, the player may be given the option to covert the non-monetary wager to a monetary wager. For example, 500 loyalty points may be converted to $50.00 that the player may use the play the games of chance.

A transfer funds request, including a fund amount, may be received at the establishment server. The transfer of funds may be transmitted to the MGD via use of a bill acceptor (e.g. such as bill acceptor 318 illustrated in FIG. 3B). Other examples for the facilitation of money to a player account are also described in application Ser. No. 13/632,743, filed Oct. 1, 2013, entitled "Electronic Fund Transfer for Mobile Gaming" which is hereby incorporated by reference in its entirety for all purposes. For example, the player may utilize physical contact with the bill acceptor to facilitate the transfer of funds to the player account.

A determination of whether the fund amount was transferred is made at 824. In other words, the gaming establishment may determine whether the fund amount was posted to the player's account. If no funds were received at 824, the method 800 may end. If the fund amount was transferred at 824, the method may continue at 810 illustrated in FIG. 8A.

If the MGD is permitted to play games of chance at 806 in FIG. 8A, a determination is made as to whether there is deferred game data at 808. Deferred game data includes at least a selected game of chance, a bet amount, a total wager amount, and any other desired information to automatically play a game of chance without user interaction. If it is determined that there is deferred game data saved at 808, a deferred game data approval notification may be transmitted to the MGD at 826 as illustrated in FIG. 8C.

The notification may inquire as to whether the player would like to begin playing games of chance based on the deferred game data. The notification may include a "No" and "Yes" indicator or any other indicator to determine whether the player would like to start automatic play of the game of chance based on the saved deferred game data. If the notification is approved at 828, game data based on the saved deferred game data may be transmitted to the MGD at 830.

For example, deferred game data may be to play a game of blackjack with a bet amount of $0.25 each hand and a total wager amount of $20. Thus, game data for black jack having a bet amount of $0.25 will be played until the total wager amount of $20 is played. This allows the user to automatically play the game of chance without user interaction. The determination of whether to hit, stand, double down, and apply any other black jack rules may be automatically played by a computing device, such as gaming server 118 illustrated in FIG. 1.

Once automatic play of the game of chance is completed, a determination of whether the player would like to play another game of chance is made at 832. If no game selection is received at 832 within a predetermined period of time (i.e. after one minute, or any other predetermined time period), the game play data may be saved at 834 and the method 800 may end.

If it is determined that the player would like to play another game of chance at 832, a determination of whether presence of the MGD and/or its associated RFID/NFC tag is detected within the reconfigurable and repositionable game zone is made at 836. The portable transceivers in the reconfigurable and repositionable game zone may periodically determine whether presence of the MGD and/or its associated RFID/NFC tag is still detected proximate to or within the reconfigurable and repositionable game zone. The portable transceiver may make the determination at predetermined time intervals such as between about one second to 60 seconds, between about 2 seconds to 100 seconds, or any other predetermined desired time interval. If at least one portable transceiver continues to detect presence of the MGD and/or its associated RFID/NFC tag proximate to or within the reconfigurable and repositionable game zone at 836, the method may continue at 826. If presence of the MGD and/or its associated RFID/NFC tag is not detected within the reconfigurable and repositionable game zone at 836, the game play data may be saved at 834 and the method 800 may end.

The game play data may also be saved periodically at predetermined time intervals while the player is playing the game of chance, such as between about 10 seconds to 60 seconds, or at any other desired predetermined time interval. The game play data may be saved by the establishment server or the MGD.

If it is determined that player approval to play the deferred game data is not received at 826, a game of chance selection and wager amount may be received from the MGD at 810 illustrated in FIG. 8A. For example, the player may select to play any slot machine game, table card game, roulette, keno, bingo, or any other games of chance. The player may also select a wager amount to bet. Once received, the selected game data may be transmitted to the MGD at 812 to allow the player to play the game of chance.

A periodic determination of whether presence of the MGD and/or its associated RFID/NFC tag is in the reconfigurable and repositionable game zone is made at 814. If at least one portable transceiver continues to detect presence of the MGD and/or its associated RFID/NFC tag proximate to or within the reconfigurable and repositionable game zone at 814, the MGD may continue to play game of chance. If presence of the MGD and/or its associated RFID/NFC tag is not detected within the reconfigurable and repositionable game zone at 814, MGD may no longer be permitted to play games of chance using monetary wager amounts. In one embodiment, the establishment server may also transmit a notification on a display of the MGD that location of the MGD must be reestablished at a reconfigurable and repositionable game zone to continue playing the game of chance. In another embodiment, although presence of the MGD and/or its associated RFID/NFC tag is not detected within the reconfigurable and repositionable game zone at 814, the MGD may still continue to play games of chance as long as the MGD is in continual communication with the establishment server. In one embodiment, the player may be given the option to play with non-monetary wagers (e.g. loyalty points, player tracking points).

Game play data may be periodically saved at 816. The game play data may be saved periodically at predetermined time intervals while the player is playing the game of chance, such as between about 10 seconds to 60 seconds, or at any other desired predetermined time interval. The game play data may be saved by the establishment server or the MGD.

Once play of the game of chance is completed, a determination of whether the player would like to continue playing the game of chance may be made at 818. The player may continue to bet a wager amount or select another game of chance. Thus, if a wager amount or another game of chance selected is received at 818, the method may continue at 810. If no player input is detected within a predetermined period of time (e.g. between about two seconds to two minutes, or any other desired predetermined time interval) at 818, the method 800 may end.

Figure 9:
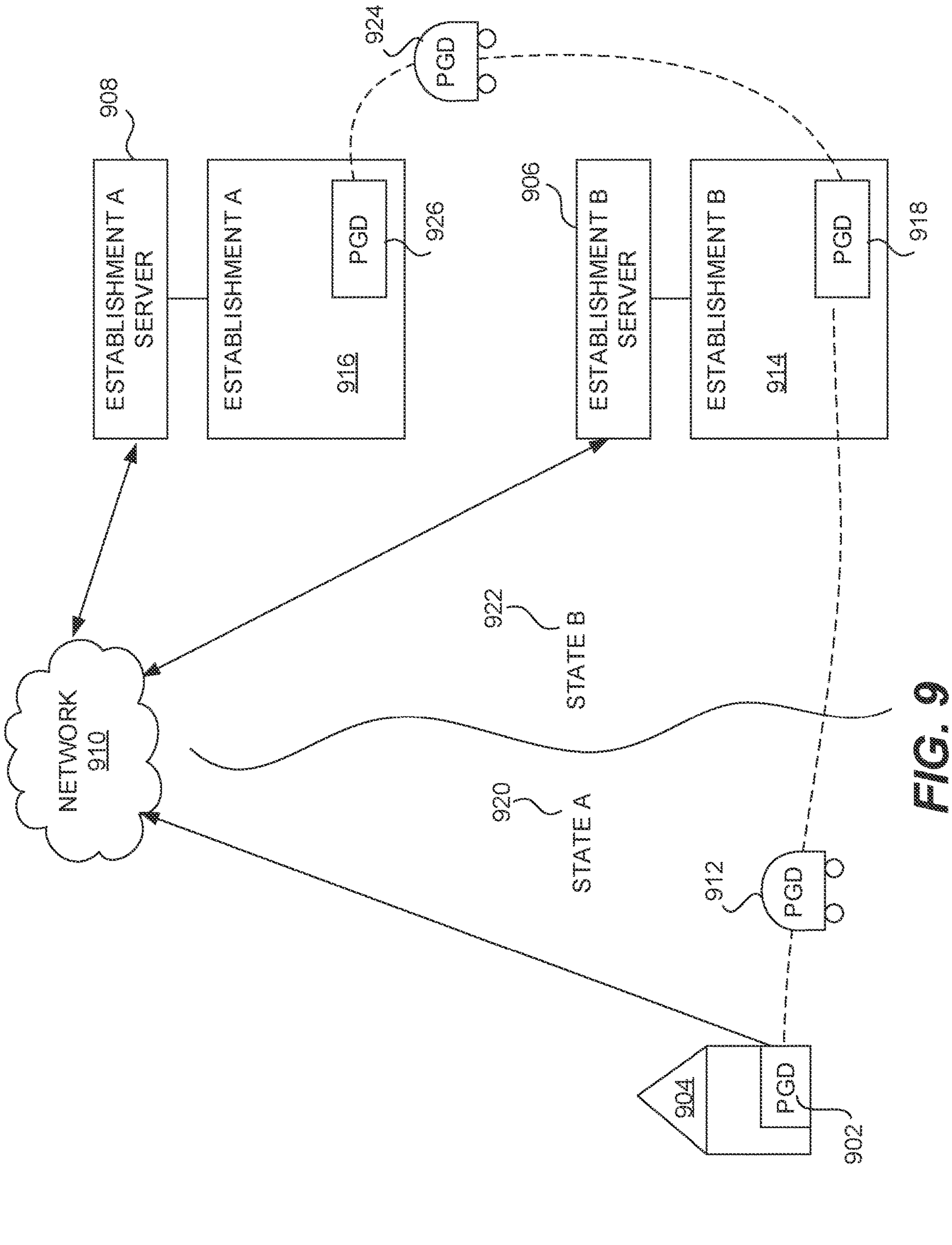
FIG. 9 illustrates an example of a user playing games of chance on a mobile gaming device.

FIG. 9 illustrates an example of a user playing games of chance on a mobile gaming device. The player associated with the portable gaming device (PGD/MGD) 902 may reside in State A. State A 920 may be a state which does not permit gambling and/or there is no gaming establishment nearby. While at home 904, the player may connect to establishment server B 906 via network 910 where he has a player tracking account. The player may transmit deferred game data to establishment server B 906 to be saved and associated with the player's tracking account. The deferred game data may include at least a selected game of chance, a bet amount, a total wager amount, and any other desired information to automatically play a game of chance without user interaction. For example, the deferred game data may be to play a game of 777 with a bet amount of $0.25 each play and a total wager amount of $20. Thus, game data for 777 having a bet amount of $0.25 will be played until the total wager amount of $20 is played. This allows the user to automatically play the game of chance of 777 without user interaction.

The player may also connect to establishment server A 908 via network 910 where he also has a player tracking account. The player may transmit deferred game data to establishment server A 908 to be saved and associated with the player's tracking account. The deferred game data may include at least a selected game of chance, a bet amount, a total wager amount, and any other desired information to automatically play a game of chance without user interaction. For example, deferred game data may be to play a game of black jack with a bet amount of $0.25 each hand and a total wager amount of $20. Thus, game data for black jack having a bet amount of $0.25 will be played until the total wager amount of $20 is played. This allows the user to automatically play the game of chance without user interaction. The determination of whether to hit, stand, double down, and apply any other black jack rules may be automatically played or determined by a computing device, such as establishment server A 908.

The player may then drive 912 to State B 922 where gaming is allowed and/or is the closest gaming establishment to the player location 904. The player may first stop at establishment B 914 for something to drink and/or eat. While at the restaurant, the player may enter a reconfigurable and repositionable game zone positioned in an area of the restaurant so that the PGD/MGD 918 may be detected. The reconfigurable and repositionable game zone may have at least one portable transceiver configured to detect the presence of PGD/MGDs proximate to or within the reconfigurable and repositionable game zone. The portable transceiver may also be designed to receive and transmit data. The portable transceiver may be, for example a free standing antenna, kiosk, or any other device configured to receive and transmit data. In one implementation, the portable transceiver wirelessly communicates with an RFID tag or an NFC tag that's in a player's pocket, purse, or in any other location on the player, or attached to the player's MGD. In another embodiment, the portable transceiver may be positioned within a gaming device, such as a slot machine, table game, any other gaming device, or a peripheral management device as described in Ser. No. 12/945,888, filed Nov. 14, 2010, entitled "Peripheral Management Device for Virtual Game Interaction" which is hereby incorporated by reference in its entirety for all purposes. The embedded portable RF transceiver, while mounted inside the gaming device, communicates with any nearby RFID/NFC tags within its communication range. The portable transceiver may be powered by plugging into a typical power outlet. When using a power outlet, communication to the backend servers can be implemented using the power line communication standards such as IEEE 1901, HomePlug AV, ITU-T G.hn, and the like. The portable transceiver may also operate on battery to improve its portability, continuity, and redundancy. In one embodiment, the portable transceiver plugs into a power outlet for power and communication, but also uses a battery for back up power so that it can continue to operate even during power interruptions.

When presence of the PGD/MGD 918 is detected proximate to or within the reconfigurable and repositionable game zone, the PGD/MGD 918 may be permitted to play games of chance using monetary wager amounts. PGD/MGDs may be any portable electronic device configured to play games of chance, such as a mobile telephone, portable media player, personal digital assistant, tablet, net book, or any other similar portable electronic device.

Presence of the PGD/MGD 918 may be detected based on a zone specific location. In other words, the PGD/MGD 918 is considered proximate to or within the reconfigurable and repositionable game zone as long as at least one of the portable transceivers detects presence of the PGD/MGD 918. Thus, use of global positioning system, RF fingerprinting, RF triangulation, or any other complicated location detection methods is not necessary to detect the PGD/MGD proximate to or within the reconfigurable and repositionable game zone.

The portable transceivers may be configured to receive data from the PGD/MGD 918. The portable transceivers may receive data from the PGD/MGD 918 via any known method. In one embodiment, the PGD/MGD 918 may have a passive or active tag (e.g. RFID tag, NFC tag) that may be read or detected by the portable transceivers. In another embodiment, the portable transceiver may receive the PGD/MGD data using any wireless method such as WiFi, Bluetooth, radio frequency, or any other communication methods. In another embodiment, the portable transceiver may also communicate with the PGD/MGD 918 via any wired methods as well. For example, a kiosk at the reconfigurable and repositionable game zone may permit the PGD/MGD 918 to be wired to the kiosk to receive and transmit data.

The PGD/MGD data may be transmitted to establishment server B 906 to authenticate the PGD/MGD. PGD/MGD data may include data such as the PGD/MGD identification, player information, and any other desired information. An establishment server may use the PGD/MGD data to authenticate the player and/or the PGD/MGD 918. In one embodiment, a determination of whether the PGD/MGD identification is associated with the player may be made to determine authentication of the device. In another embodiment, a determination of whether the PGD/MGD 918 is associated with the player information may be made to authenticate the PGD/MGD. In still another embodiment, the establishment server may request that the player input authentication information such as a user name, password, or any other authentication information such as biometric inputs (i.e., voice, facial recognition, retinal imprint, fingerprint, and the like).

Once authenticated establishment server B 906 may determine whether the PGD/MGD 918 is permitted to play games of chance. The establishment server may determine whether the player created a mobile game account, has sufficient funds to play the games of chance, authorized to make monetary wager amounts, the proper application program is operating on the PGD/MGD 918, or any other game establishment desired determination is satisfied.

If the PGD/MGD 918 is permitted to play games of chance and deferred game data associated with the player is found, a deferred game data approval notification may be transmitted to the PGD/MGD 918. The notification may inquire as to whether the player would like to begin playing games of chance using the deferred game data. The notification may include a "No" and "Yes" indicator or any other indicator to determine whether the player would like to start automatic play of the game of chance based on the saved deferred game data.

The player may approve play of the deferred game data while he is eating and relaxing at the restaurant. Thus, play of the 777 may continue until the credit (e.g. total wager amount of $20) is zero. Once the player has completed eating, he may then leave establishment B 914 and drive 924 to establishment A 916 to watch a movie. Thus, once the PGD/MGD 918 is no longer detected within the reconfigurable and repositionable game zone at establishment B 914, games of chance are no longer permitted to be played on the PGD/MGD 918 using monetary wager amounts.

Upon arrival at establishment A 916, the player may enter the movie theatre and the PGD/MGD 926 enter a reconfigurable and repositionable game zone in an area of the theatre. This allows the player to automatically play games of chance and not be distracted while watching a movie.

The reconfigurable and repositionable game zone may have at least one portable transceiver configured to detect presence of PGD/MGDs proximate to or within the reconfigurable and repositionable game zone. The portable transceiver may also be designed to receive and transmit data.

When presence of the PGD/MGD is detected proximate to or within the reconfigurable and repositionable game zone, the PGD/MGD may be permitted to play games of chance. The PGD/MGD data may be transmitted to establishment server A 908 to authenticate the PGD/MGD. PGD/MGD data may include data such as the PGD/MGD identification, player information, and any other desired information. An establishment server may use the PGD/MGD data to authenticate the player and/or the PGD/MGD 926.

Once authenticated establishment server A 908 may determine whether the PGD/MGD 926 is permitted to play games of chance. If the PGD/MGD 926 is permitted to play games of chance and deferred game data associated with the player is found, a deferred game data approval notification may be transmitted to the PGD/MGD 926. The notification may inquire as to whether the player would like to begin playing the deferred game of chance. The notification may include a "No" and "Yes" indicator or any other indicator to determine whether the player would like to start automatic play of the game of chance based on the saved deferred game data.

The player may approve play of the deferred game data while he is watching a movie. Thus, play of black jack may continue until the credit (e.g. total wager amount of $20) is zero. Once the movie is over, the player may then leave establishment A 908 and drive back home 904 in State A 920. Thus, once the PGD/MGD 926 is no longer detected within the reconfigurable and repositionable game zone at establishment A 908, games of chance are no longer permitted to be played on the PGD/MGD 926.

Figure 10:
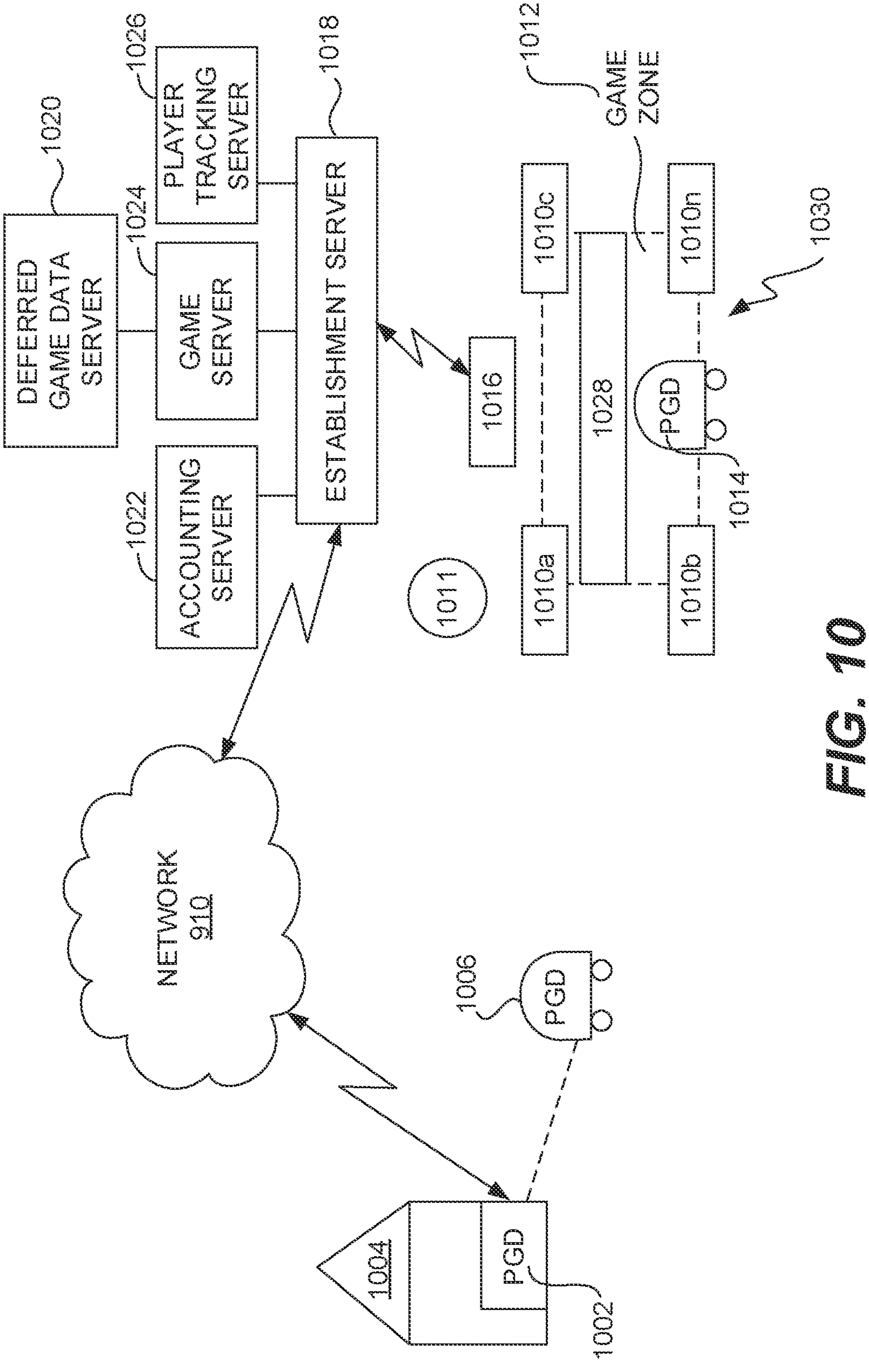
FIG. 10 illustrates another example of a user playing games of chance on a mobile gaming device.

FIG. 10 illustrates another example of a user playing games of chance on a mobile gaming device. While at home 1004, the PGD/MGD 1002 may transmit deferred game data to a gaming establishment server 1018 via network 1008. As illustrated, gaming establishment 1030 may be a gas station. The deferred game data may include at least a selected game of chance, a bet amount, a total wager amount, and any other desired information to automatically play a game of chance without user interaction. For example, the deferred game data may be to play a game of 777 with a bet amount of $0.25 each play and a total wager amount of $20. Thus, game data for 777 having a bet amount of $0.25 will be played until the total wager amount of $20 is played. This allows the user to automatically play the game of chance of 777 without user interaction.

The establishment server 1018 may be configured to communicate with an accounting server 1022, game server 1024, and a player tracking server 1026. Accounting server 1022 is similar to accounting server 116 illustrated in FIG. 1, game server 1024 is similar to game server 118 illustrated in FIG. 1, and player tracking server 1026 is similar to player tracking server 120 of FIG. 1. Game server 1025 may have a deferred game data server 1020 where the player's deferred game data may be stored and associated with the player. However, this is not intended to be limiting as the deferred game data may be stored in the player tracking server 1026 or any other desired location.

The player 1006 may then drive to a gas station 1030 to fill up the car with gas. While at the gas station 1030, the PGD/MGD 1014 may enter the reconfigurable and repositionable game zone 1012. The reconfigurable and repositionable game zone 1012 may have at least one portable transceiver 1010*a-n* and at least one portable controller 1016. The reconfigurable and repositionable game zone 1012 may also have at least one camera 1011. The reconfigurable and repositionable game zone 1012 may be located or positioned proximate or near the pumps 1028 where gas may be obtained.

When presence of the PGD/MGD 1014 is detected proximate to or within the reconfigurable and repositionable game zone 1012, the PGD/MGD 1014 may be permitted to play games of chance using monetary wager amounts. When located outside the reconfigurable and repositionable game zone 1012 and undetectable by the portable transceivers 1010*a-n*, the PGD/MGD 1014 may not be permitted to play games of chance with monetary wager amounts.

The reconfigurable and repositionable game zone 1012 may have at least one camera 1011 for security, audit, or authorization purposes. Although illustrated as separate from the portable transceivers 1010*a-n*, in one embodiment, the camera 1011 may be positioned within the portable transceiver 1010*a-n*. The camera 1011 may be used for security purposes to ensure no illegal activities occur. In one embodiment, the camera 111 records the activities in a gaming zone (e.g. in at least a portion of the gaming zone and/or the entire gaming zone area). The recorded activities and information may then be stored in a mass storage device (hard drive, tape, cloud storage, and the like). Additionally, the camera 111 may be used for audit purposes. For example, if a player objects to a payout, the battery of the MGD device dies during a game session, power outage occurs at the gaming venue, or any other malfunction happens, the camera may be used to record game play, user actions, and the like to replay the game play. Moreover, the camera 1011 may be used to authenticate the player (e.g. via facial recognition methods) and/or associate the player with the PGD/MGD.

While the player is obtaining gas at the pump 1028, the PGD/MGD 1014 may be authenticated and the establishment server 1018 may determine whether games of chance may be played on the PGD/MGD 1014.

If the PGD/MGD 1014 is permitted to play games of chance and deferred game data associated with the player is found, a deferred game data approval notification may be transmitted to the PGD/MGD 1014. The notification may inquire as to whether the player would like to begin playing games of chance based on the deferred game data. The notification may include a "No" and "Yes" indicator or any other indicator to determine whether the player would like to start automatic play of the game of chance based on the saved deferred game data.

The player may approve play of the deferred game data while he pumping gas into the car. Thus, play of 777 may continue until the credit (e.g. total wager amount of $20) is zero. Once all the gas is pumped into the car, the player may then exit the reconfigurable and repositionable game zone 1012 and drive back home 1004. Thus, once the PGD/MGD 1014 is no longer detected within the reconfigurable and repositionable game zone 1012, games of chance are no longer permitted to be played on the PGD/MGD 1006 using monetary wager amounts and the game ends.

Figure 11:
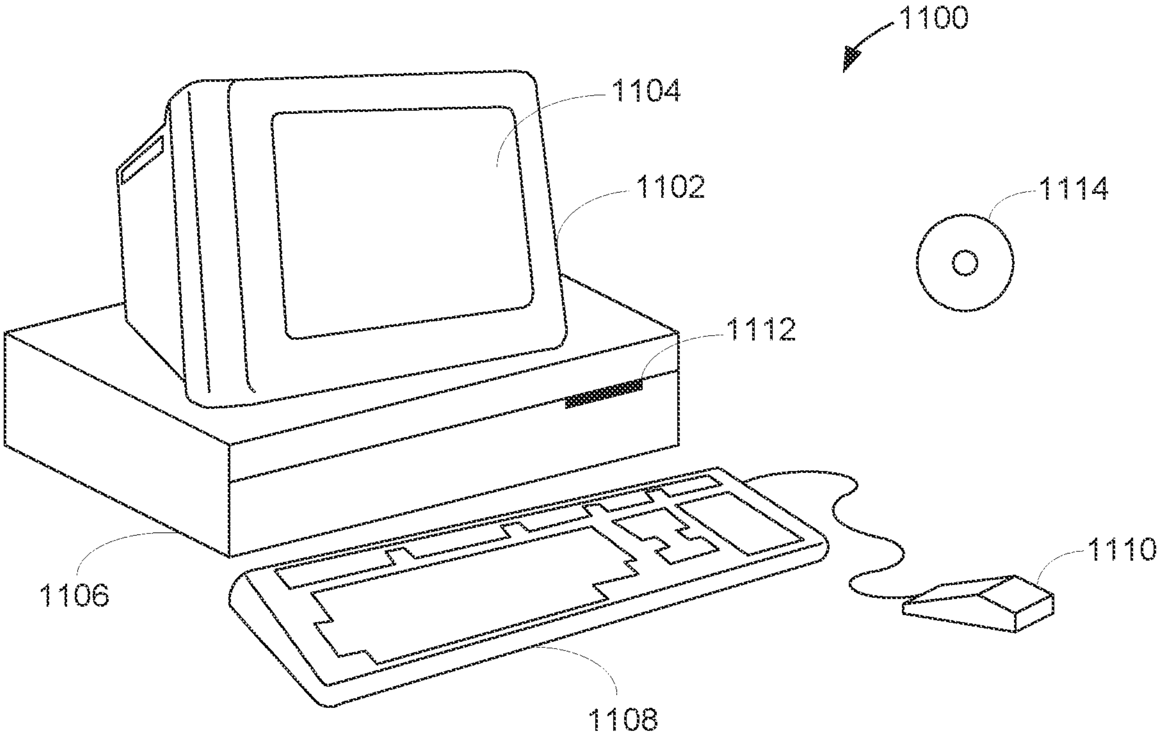
FIG. 11 illustrates an exemplary computer device suitable for use with at least one embodiment of the invention.

FIG. 11 illustrates an exemplary computer device 1100 suitable for use with at least one embodiment of the invention. The methods, processes and/or graphical user interfaces discussed above can be provided by a computer device. Although the computing device 1100 is depicted as a desktop computer, the computer device 1100 can represent computing device of different form factors, such as a server machine or a portable electronic device. The computer device 1100 can includes a display monitor 1102 having a single or multi-screen display 1104 (or multiple displays), a housing 1106, a keyboard 1108, and a mouse 1110. The mouse 1110 is representative of one type of pointing device. The housing 1106 can house a processing unit (or processor), system memory and a hard drive (not shown). The housing 1106 can also house a drive 1112, such as a DVD, CD-ROM or floppy drive. The drive 1112 can also be a removable hard drive, a Flash or EEPROM device, etc. Regardless, the drive 1112 may be utilized to store and retrieve software programs incorporating computer code that implements some or all aspects of the invention, data for use with the invention, and the like. Although CD-ROM 1114 is shown as an exemplary computer readable storage medium, other computer readable storage media including floppy disk, tape, Flash or EEPROM memory, memory card, system memory, and hard drive may be utilized. In one implementation, a software program for the computer system 1100 is provided in the system memory, the hard drive, the drive 1112, the CD-ROM 1114 or other computer readable storage medium and serves to incorporate the computer code that implements some or all aspects of the invention.

Figure 12:
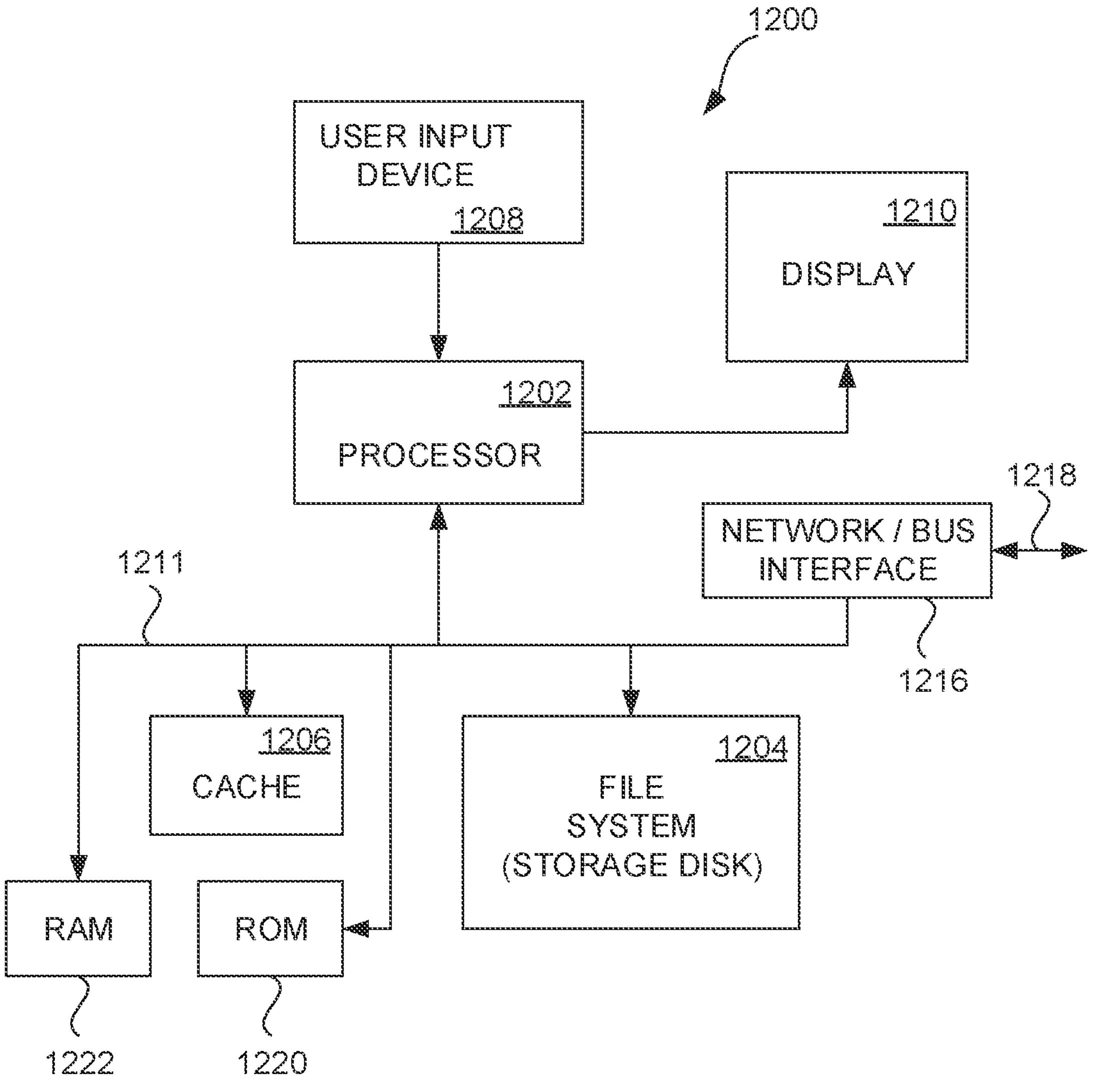
FIG. 12 is a block diagram of an example computing device.

FIG. 12 is a block diagram of an example computing device 1200. The computing device 1200 can be the gaming server 112, gaming machine 104, mobile gaming device 108, analysis server 118, player tracking server 126, advertising server 114 illustrated in FIG. 1, or any other server or computing device used to carry out the various embodiments disclosed herein. The computing device 1200 can include a processor 1202 that pertains to a microprocessor or portable controller for controlling the overall operation of the computing device 1200. The computing device 1200 can store any type of data and information as discussed above in a file system 1204 and a cache 1206. The file system 1204 is, typically, a storage disk or a plurality of disks. The file system 1204 typically provides high capacity storage capability for the computing device 1200. However, since the access time to the file system 1204 is relatively slow, the computing device 1200 can also include a cache 1206. The cache 1206 is, for example, Random-Access Memory (RAM) provided by semiconductor memory. The relative access time to the cache 1206 is substantially shorter than for the file system 1204. However, the cache 1206 does not have the large storage capacity of the file system 1204. Further, the file system 1204, when active, consumes more power than does the cache 1206. The computing device 1200 also includes a RAM 1220 and a Read-Only Memory (ROM) 1222. The ROM 1222 can store programs, utilities or processes to be executed in a non-volatile manner. The RAM 1220 provides volatile data storage, such as for the cache 1206.

The computing system 1200 also includes a user input device 1208 that allows a user of the computing system 1200 to interact with the computing system 1200. For example, the user input device 1208 can take a variety of forms, such as a button, keypad, touch screen, dial, and the like. Still further, the computing system 1200 includes a display 1210 (screen display) that can be controlled by the processor 1202 to display information to the user. A data bus 1211 can facilitate data transfer between at least the file system 1204, the cache 1206, the processor 1202, and the CODEC 1212.

The computing system 1200 can also include a network/bus interface 1216 that couples to a data link 1218. The data link 1218 allows the computing system 1200 to couple to a host computer or data network, such as the Internet. The data link 1218 can be provided over a wired connection or a wireless connection. In the case of a wireless connection, the network/bus interface 1216 can include a wireless portable transceiver.

While embodiments and applications of this invention have been shown and described, it would be apparent to those skilled in the art having the benefit of this disclosure that many more modifications than mentioned above are possible without departing from the inventive concepts herein.

What is claimed is:

1. A system, comprising:

a plurality of transceivers forming a gaming zone, at least one transceiver of the plurality of transceivers being configured to:

detect whether a player is within the gaming zone using a first communication method, in response to detecting the player is within the gaming zone, detect whether a mobile gaming device is within the gaming zone using a second communication method that is different than the first communication method, and in response to detecting that both the player and the mobile gaming device are within the gaming zone, transmit player data relating to the player or mobile device data relating to the mobile device; and a gaming server configured to:

receive the player data and the mobile device data from the at least one transceiver, and in response to receiving the player data or the mobile device data, transmit game of chance data to, or receive game of chance data from, the mobile gaming device, thereby allowing the player to play a game of chance on the mobile gaming device.

2. The system of claim 1, wherein the at least one transceiver comprises:
- a first communication device configured to use the first communication method, and
- a second communication device configured to use the second communication method.

3. The system of claim 1, wherein the first communication method comprises a near field communication method or a radio frequency identification method, and the second communication method comprises a Bluetooth method or a short range wireless fidelity method.

4. The system of claim 1, wherein the first communication method uses a first frequency, and the second communication method uses a second frequency that is different than the first frequency.

5. The system of claim 1, wherein detecting whether the player is present within the gaming zone comprises attempting to obtain the player data from a player item using the first communication method.

6. The system of claim 1, wherein detecting whether the mobile gaming device is within the gaming zone comprises attempting to obtain the mobile device data from the mobile gaming device using the second communication method.

7. The system of claim 1, wherein the gaming server is configured to transmit the game of chance data to, or receive the game of chance data from, the mobile gaming device in response to: (i) receiving the player data or the mobile device data from the at least one transceiver, (ii) verifying, using the player data or the mobile device data, that the player is associated with the mobile gaming device, and (iii) verifying, using the player data or the mobile device data, that the player is authorized to play the game of chance using the mobile gaming device.

8. A system, comprising:
- a plurality of transceivers forming a gaming zone, each transceiver of the plurality of transceivers being configured to:
  - detect whether a player is within the gaming zone using a first communication method,
  - in response to detecting the player is within the gaming zone, detect whether a mobile gaming device associated with the player is within the gaming zone using a second communication method that is different than the first communication method, and
  - in response to detecting that both the player and the mobile gaming device are within the gaming zone, transmit player data relating to the player or mobile device data relating to the mobile device; and
- a gaming server configured to:
  - receive the player data or the mobile device data from at least one transceiver of the plurality of transceivers, and
  - in response to receiving the player data or the mobile device data, transmit game of chance data to, or receive game of chance data from, the mobile gaming device to allow the player to play a game of chance on the mobile gaming device.

9. The system of claim 8, wherein each transceiver comprises:
- a first communication device configured to use the first communication method, and
- a second communication device configured to use the second communication method.

10. The system of claim 8, wherein the first communication device comprises a near field communication device or a radio frequency identification device, and the second communication device comprises a Bluetooth device or a short range wireless fidelity device.

11. The system of claim 8, wherein the first communication device uses a first frequency, and the second communication method device a second frequency that is different than the first frequency.

12. The system of claim 8, wherein detecting whether the player is present within the gaming zone comprises attempting to obtain the player data from a player card using the first communication method, and detecting whether the mobile gaming device associated with the player is within the gaming zone comprises attempting to obtain the mobile device data from the mobile gaming device using the second communication method.

13. The system of claim 8, wherein the gaming server is configured to transmit the game of chance data to, or receive the game of chance data from, the mobile gaming device in response to: (i) receiving the player data or the mobile device data from the at least one transceiver, (ii) verifying, using the player data or the mobile device data, that the player is associated with the mobile gaming device, and (iii) verifying, using the player data or the mobile device data, that the player is authorized to play the game of chance using the mobile gaming device.

14. The system of claim 13, wherein (i) verifying that the player is associated with the mobile gaming device comprises analyzing camera data from a camera, or (ii) verifying that the player is authorized to play the game of chance using the mobile gaming device comprises verifying that a gaming account associated with the player or the mobile gaming device has sufficient funds to play a game of chance, or verifying that proper gaming software is installed on the mobile gaming device.

15. A method, comprising:
- detecting whether a player is present within a gaming zone using a first communication method of a transceiver, the transceiver being one of a plurality of transceivers forming the gaming zone;
- in response to detecting the player is present within the gaming zone, detecting whether a mobile gaming device associated with the player is within the gaming zone using a second communication method of the transceiver, the second communication method being different than the first communication method;
- in response to detecting that both the player and the mobile gaming device are present within the gaming zone, transmitting player data relating to the player or mobile device data relating to the mobile device from the transceiver to a gaming server; and
- in response to receiving the player data or the mobile device data at the gaming server, allowing the player to play the game of chance on the mobile gaming device by transmitting game of chance data from the gaming server to, or receiving game of chance data at the gaming server from, the mobile gaming device.

16. The method of claim 15, wherein the transceiver comprises a first communication device configured to use the first communication method and a second communication device configured to use the second communication method.

17. The method of claim 15, wherein the first communication method comprises a near field communication method or a radio frequency identification method, and the second communication method comprises a Bluetooth method or a short range wireless fidelity method.

18. The method of claim 17, wherein the first communication method uses a first frequency, and the second communication method uses a second frequency that is different than the first frequency.

19. The method of claim 15, wherein detecting whether the player is present within the gaming zone comprises attempting to obtain the player data from a player card using the first communication method.

20. The method of claim 15, wherein detecting whether the mobile gaming device associated with the player is within the gaming zone comprises attempting to obtain the mobile device data from the mobile gaming device using the second communication method.

* * * * *